(12) United States Patent
Thorson et al.

(10) Patent No.: US 11,898,530 B2
(45) Date of Patent: Feb. 13, 2024

(54) RESERVOIR-REGULATING DIGITAL LOAD CONTROL

(71) Applicant: LONE GULL HOLDINGS, LTD., Portland, OR (US)

(72) Inventors: Ivar Lee Thorson, Portland, OR (US); Garth Alexander Sheldon-Coulson, Portland, OR (US); Brian Lee Moffat, Portland, OR (US); Daniel William Place, Portland, OR (US)

(73) Assignee: LONE GULL HOLDINGS, LTD., Portland, OR (US)

( * ) Notice: Subject to any disclaimer, the term of this patent is extended or adjusted under 35 U.S.C. 154(b) by 0 days.

(21) Appl. No.: 17/642,214

(22) PCT Filed: Oct. 6, 2020

(86) PCT No.: PCT/US2020/054443
§ 371 (c)(1),
(2) Date: Mar. 10, 2022

(87) PCT Pub. No.: WO2021/071863
PCT Pub. Date: Apr. 15, 2021

(65) Prior Publication Data
US 2022/0316437 A1 Oct. 6, 2022

Related U.S. Application Data

(60) Provisional application No. 63/087,387, filed on Oct. 5, 2020, provisional application No. 63/004,299, filed on Apr. 2, 2020, provisional application No. 62/911,932, filed on Oct. 7, 2019.

(51) Int. Cl.
*F03B 13/06* (2006.01)
*H02J 15/00* (2006.01)

(52) U.S. Cl.
CPC ........ *F03B 13/06* (2013.01); *F05B 2220/705* (2020.08); *F05B 2270/335* (2013.01); *H02J 15/003* (2013.01)

(58) Field of Classification Search
CPC .............. F03B 13/06; F05B 2220/705; F05B 2270/335; H02J 15/003
See application file for complete search history.

(56) References Cited

U.S. PATENT DOCUMENTS

| 7,564,143 B1 * | 7/2009 | Weber ................... F03B 13/264 60/398 |
| 2011/0133486 A1 | 6/2011 | Maglaque |
| 2014/0062088 A1 | 3/2014 | Carr |
| 2015/0184679 A1 | 7/2015 | Ivy et al. |

(Continued)

OTHER PUBLICATIONS

Jan. 11, 2021, Int'l Search Report and Written Opinion, PCT/US20/54443.

*Primary Examiner* — Viet P Nguyen
(74) *Attorney, Agent, or Firm* — Fulwider Patton LLP

(57) ABSTRACT

Disclosed is an apparatus that adapts the rate of its computational work to match the availability of energy harvested from a stochastic energy source; and, with respect to some types of energy harvesting, regulates the rate of energy capture, the rate of energy conversion, and the rate of consumption of stored potential energy, through its alteration, regulation, and/or adjustment, of that same computational work load.

10 Claims, 21 Drawing Sheets

(56) References Cited

U.S. PATENT DOCUMENTS

2016/0076509 A1 3/2016 Im et al.
2018/0266383 A1* 9/2018 Barg .................... F03B 13/08
2019/0233060 A1 8/2019 Moffat et al.

* cited by examiner

RESERVOIR-REGULATING DIGITAL LOAD CONTROL

CROSS-REFERENCES TO RELATED APPLICATIONS

This application is based on PCT/US2020/054443, International Filing Date is Oct. 6, 2020, which claims priority to U.S. Provisional Patent Application Nos. 62/911,932, filed Oct. 7, 2019; 63/004,299, filed Apr. 2, 2020; and 63/087,387, filed Oct. 5, 2020, the contents of which are incorporated herein by reference in their entireties.

BACKGROUND

Extracting energy from ocean waves is a difficult endeavor. Complex devices are expensive and tend to be fragile. Simpler devices tend to have fewer potential points of failure and therefore tend to have longer operational lifetimes than do more complex devices. Simpler devices also tend to be less expensive and easier to fabricate and test.

One of the major impediments to the development of a low-cost, long-lived wave energy conversion (WEC) device capable of producing electrical power at a cost low enough to make it competitive with terrestrial sources of electrical power has been the complexity, fragility, and high costs that have typically characterized prior WEC designs. Therefore, the simplification of WEC design, and innovations which tend to allow at least some WEC designs to be simplified, would be expected to have utility and benefit by permitting the development, deployment, operation, and commercialization of WEC devices that are simpler, lower-cost, and longer-lived, and are therefore more likely to produce energy at a competitive cost. Many of the benefits that the present disclosure provides with respect to improved WEC designs would also be expected to improve the design of certain wind turbines (those mounted on land and deployed in the sea) and some solar-powered devices, and the scope of the present disclosure is not limited to any single, particular, and/or specific category of device, nor to any single, particular, and/or specific type of application.

A stochastic source of environmental energy (e.g., wind, waves, or sunlight) may be used to produce a stochastically-varying, and/or inconstant supply of electrical power (e.g., with a wind turbine, wave turbine, or solar panel). If that electrical power is to be used efficiently, especially in the absence of an electrical energy storage devices that might cache, buffer, and/or smooth, portions of that stochastically-varying supply of electrical power (or in combination with a relatively small energy storage device), then the electrical power, or a substantial portion of it, must be consumed as soon as it is generated (or shortly thereafter), and the rate of consumption must vary moment-by-moment in order to match or approximately match the stochastically-varying rate at which it is being supplied.

Some analog electrical components, such as resistors, batteries, capacitors, and incandescent light bulbs, can accept and consume electrical power that exhibits stochastic variation, at least when that electrical power is varying within component-specific bounding upper and lower power levels. However, many digital devices, such as computers, can only function and/or operate correctly when supplied with adequate current, and relatively steady and/or stable device-specific voltages.

Variable, intermittent, inconstant, and/or stochastic sources of energy, such as energy harvested from wind, waves, or sunlight, in the absence of an energy-storage buffer, must typically be transformed into steady, constant, and/or consistent electrical power if they are to be used to energize computers, or other electronic circuits, especially digital circuits. This has made the powering of computers, and related steady-power-dependent devices difficult to directly energize with stochastically-varying electrical power. Such steady-power-dependent devices are often powered by electrical energy storage devices, such as batteries and/or capacitors, which are, in turn, recharged by respective sources of stochastically-varying electrical power that ultimately energizes the complete system.

While energy storage can typically provide adequate buffering of erratic and/or inconstant electrical inputs, such electrical energy storage devices tend to be expensive, and many are characterized by relatively short operational lifetimes, e.g., the average operational lifetime of a lithium-ion battery might be only be two to three years and/or no more than a few hundred charge cycles. Thus, the use of an electrical energy storage devices will typically simplify the utilization of stochastic sources of energy to energize respective devices and systems that require steady electrical power; however, such electrical energy storage devices also tend to raise the costs of the resulting storage-buffered electrical power, while also tending to reduce the operational lifetimes of the respective energy-harvesting-and-utilization devices comprised, at least in part, of such energy storage devices.

Cost, reliability, and length of operational lifetime are three considerations that tend to strongly predict the success or failure of a renewable-energy harvesting device. For this reason, the present disclosure will tend to have utility with respect to at least the design, fabrication, operation, commercialization, and profitability, of many types of renewable energy devices and/or systems.

SUMMARY OF THE INVENTION

The system, device, design, technology, and method, disclosed herein permits a stochastic source of environmental energy, e.g., waves, to be harvested and permits the resulting variable levels of generated electrical power to be used to energize a network of computers, or other devices, components, modules, and/or mechanisms, that tend to typically require steady, constant, and/or consistent electrical power. Conversely, with respect to energy harvested from certain types of environmental sources, e.g., wind and waves, the system, device, module, design, and method, disclosed herein permits the amount of resistance offered by a turbine to its respective fluid flow (e.g., of air or water) to be regulated, controlled, and/or adjusted through concomitant adjustments to the rate at which electrical power is consumed by a respective network or computers, or other circuit of electricity-consuming devices, components, modules, and/or mechanisms.

The system, device, module, design, and method disclosed herein permits circuits nominally requiring steady and/or consistent electrical power to be energized directly by the typically variable output of generators driven by stochastic and/or variable sources of environmental power, e.g., wind and waves. By doing so, the present disclosure permits such systems to omit the inclusion of electrical energy storage devices while still providing steady-power-dependent circuits with appropriate and consistent levels of electrical power, and while still permitting the resistance imparted by the respective turbines to their respective fluid flows to be altered, changed, optimized, adjusted, regulated, and/or controlled, including in the absence of electrical energy storage devices.

The amount of electrical power consumed by the computers, or other steady-power-dependent circuits, of an embodiment of the present disclosure is dynamically adjusted such that it matches, at least to an approximate degree, the amount of fluid power available to a turbine-energized generator, and/or the amount of solar power available to a solar cell or panel. And, reciprocally, the regulation of the magnitude of turbine pressure drop of an embodiment of the present disclosure is controlled, at least to an approximate degree, by the amount of resistive torque imparted by the generator to the turbine in response to alterations, adjustments, and/or changes, in the load imposed upon the generator by the embodiment's computers, or other steady-power-dependent circuits. By changing the magnitude of said turbine pressure drop, the rate of turbine effluent flow can in some cases also be controlled.

An embodiment's electrical load may be adjusted, changed, altered, and/or optimized, so as to maximize the amount of environmental (e.g. wave or wind) power absorbed by the embodiment's turbine.

An embodiment's electrical load may also be adjusted, changed, and/or altered, so as to reduce the amount of environmental (e.g. wave or wind) power absorbed by the embodiment's turbine, and the resultant amount of electrical power generated, to a level that is below or above an optimal rate of energy capture, and/or an optimal rate of energy generation. Such a reduction of energy capture and/or electrical power generation may have utility in order to protect an embodiment's components and/or structure from damage during times when the embodiment is subjected to environmental conditions that may exceed the embodiment's maximum design ratings. Such a reduction of energy capture and/or electrical power generation may also have utility in order to preserve a reservoir of potential energy stored within the embodiment during times when the embodiment is unable to acquire sufficient energy from the ambient environmental conditions, or in order to achieve some other purpose, such as steering a mobile energy-capture system.

The present disclosure is of value with respect to systems, devices, and modules:
  in which energy is both harvested from a stochastic source and a resulting electrical energy is immediately consumed, e.g., in the absence of sufficient, if any, electrical energy storage, by a nominally steady-power-dependent electrical circuit of some kind, e.g., a network of computers;
  in which an energy-harvesting turbine, e.g., wind or wave, benefits from being controlled so as to alter its resistance to the flow of a fluid therethrough (thereby altering the pressure drop across said turbine, e.g. to control the rate of fluid flow therethrough); and/or,
  in which the resistive torque applied to an energy-harvesting turbine must be or is ideally adjusted so as to maximize, optimize, control, and/or alter, the rate at which energy is harvested from the flow of a fluid therethrough.

Each of the above objectives might be accomplished, or at least facilitated, with and/or through the inclusion and use of an electrical energy storage device. However, electrical energy storage devices tend to be expensive, unreliable, and short-lived, which are not desirable attributes to associate with, and/or impart to, a device, apparatus, and/or system, in which environmental energy is captured and converted so as to energize a network of computers or other steady-power-dependent electrical circuits.

When the pressure difference across the turbine of an embodiment of the present disclosure increases (e.g. because of an increase in fluid pressure in an upstream reservoir), and thereby imparts to the turbine the potential to generate an increased amount of mechanical power, then the electrical load imparted to the embodiment's generator by the embodiment's network of computers, and/or other steady-power-dependent electrical circuits, can be increased (e.g., increased by the embodiment's operating system and/or control module). That increase in the electrical load will draw more current from the generator and the generator, in response to the increase in the electrical load, will tend to impart a greater resistive torque to the turbine's rotations. And, the increased pressure difference across the turbine will tend to supply the turbine with the additional torque needed to overcome the increased resistive torque manifested by the turbine. Thus, the turbine tends to be kept rotating despite the increase in the resistive torque applied to it because of the increased torque applied to it by the increased pressure difference manifested by the fluid flowing through it.

When the pressure difference across the turbine of an embodiment of the present disclosure decreases, and thereby imparts to the turbine the potential to generate only a reduced amount of mechanical power, then the electrical load imparted to the embodiment's generator by the embodiment's network of computers, and/or other steady-power-dependent electrical circuits, can be, and indeed should be, decreased (e.g. decreased by the embodiment's operating system and/or control module). Such a decrease in the electrical load will draw less current from the generator and the generator, in response to the decrease in the electrical load, will tend to impart a reduced resistive torque to the turbine's rotations. And, the decreased pressure difference across the turbine will nominally be sufficient to keep the turbine rotating despite a reduced rate of fluid flow and a reduced torque imparted to, and manifested by, the turbine.

An imbalance in the resistive torque applied to the turbine by an operatively-connected generator (in response to a fluid flow characterized by a particular pressure difference across the turbine) can be problematic. If the resistive torque is too high, then the turbine and generator may fail to extract the optimal amount of power available to the turbine with respect to a particular fluid flow, and, if the resistive torque is even higher, then the turbine might stop rotating and the turbine and generator will then fail to extract any energy at all. On the other hand, if the resistive torque is too low, then the turbine's rotations might increase to a point where the turbine enters an overspeed condition, which might result in damage to the turbine and/or other parts of an embodiment.

When attempting to optimize the amount of energy extracted from an environmental source in order to energize a maximal number of steady-power-dependent circuits and/or to maximize the power-limited performance of such steady-power-dependent circuits, it is typically useful to keep the amount of resistive torque imparted to a turbine by its respective generator within a certain range of torques, and to match the current amount of resistive torque to an appropriate amount of resistive torque corresponding to the available amount of pressure energy in the fluid flow.

An embodiment's turbine will tend to extract a certain amount of power from a fluid flow, and that will tend to result in a certain amount of resistance to the flow (and a consequent slowing of the flow). However, if an embodiment determines that the speed of fluid flow should be increased and/or the pressure drop across the turbine reduced, e.g., for some reason other than maximizing electrical power production, then it may reduce the electrical power consumed by (and in particular the current drawn by) the steady-power-dependent circuits connected to the embodiment's generator, thereby causing a consequent reduction in the amount of resistive torque imparted to the turbine by the generator. Alternately, if an embodiment determines that the speed of fluid flow should be decreased and/or the pressure drop across the turbine increased, e.g., for some reason other than maximizing electrical power production, then it may increase the electrical power consumed by (and in particular the current drawn by) the steady-power-dependent circuits connected to the generator, thereby causing a consequent increase in the amount of resistive torque imparted to the turbine by the generator.

Thus, by altering, adjusting, changing, or regulating, the amount of electrical power being consumed by (and in particular the current drawn by) an embodiment's generator-powered electrical circuits, embodiments of the present disclosure can:

maximize the amount of energy that they extract from the environment and use the resulting electrical power to energize computers and other electronic circuits; and, increase or decrease (within limits) the rate at which fluid flows through the embodiment's turbine, and/or the amount of pressure energy remaining in that flow after passing the turbine, sometimes at the expense of reducing the amount of electrical power generated to a suboptimal level given the available fluid flow.

An embodiment of the present disclosure may alter the magnitude of the electrical load connected to its respective generator, and/or the rate at which that electrical load consumes generated electrical power, by actions including, but not limited to:

turning portions and/or subsets of its electrical circuits, components, and/or elements, on and off (however, this tends to be disruptive to computers in the process of executing programs);

altering the frequency and/or clock speed of a portion and/or subset of the embodiment's computers and/or CPUs (which tends to preserve continuity of program execution while altering the pace of program execution and the associated rate at which energy is consumed by those computers and/or CPUs);

altering the CPU "load factor", and/or the percentage of time the CPU spends processing tasks, e.g., at a particular, constant, and/or consistent clock speed, (with the balance of the time spent executing "no operation" commands, freezing the CPU's program counter, and/or manifesting other configurational and/or operational characteristics which cause CPU transistors to switch less frequently, and which therefore tend to cause the CPU to consume less electrical power or more electrical power than is consumed during nominal, normal, and/or regular program execution); and sending a portion of generated electrical power (e.g., a portion above a nominal electrical power level) to a relatively low-capacity electrical energy storage device (e.g., such as an electrical energy storage device capable of storing an amount of electrical energy equivalent to that generated over a 1-minute, 10-minute, and/or 30-minute period and/or interval), and later supplementing the generated electrical power with electrical power (e.g., with an amount and/or level of electrical power no greater than a nominal electrical power level less an amount of electrical power being generated) drawn from the low-capacity electrical energy storage device, thereby allowing the most variable and/or volatile portion of the generated electrical power to be buffered by a relatively low-cost and low-capacity energy storage component instead of sending all of the generated electrical power to a relatively high-capacity electrical energy storage device and fully powering an embodiment's electrical circuits with energy drawn from that relatively high-capacity electrical energy storage device.

A preferred embodiment of the present disclosure is comprised of a hollow buoyant vessel (buoy) and a nominally vertical water tube. The water tube has an inner mouth that is inside the hollow of the buoy, and an outer mouth that is outside the buoy and configured so that when the embodiment is floating at the surface of a body of water, the outer mouth is nominally below the buoy. The cross-sectional area of the inner mouth is less than the cross-sectional area of the outer mouth. As the embodiment moves up and down in response to the passage of waves across the surface of the body of water on which the embodiment floats, water inside the tube tends to oscillate up and down relative to the tube and the buoy. Occasionally, water is ejected from the inner mouth of the water tube and deposited inside the hollow of the buoy, tending to form a reservoir of ejected water therein. Water from this reservoir tends to flow out of the buoy back to the body of water on which the embodiment floats via one or more turbines, which rotate in response to said flow and cause operatively connected generators to generate electricity.

Disclosed is a mechanism, apparatus, system, and method which permits rich, and currently under-utilized, natural and renewable marine energy resources to be efficiently harvested and put to good purpose, offsetting and potentially supplanting a portion of the electrical power generated on land and/or through the burning of fossil fuels.

DETAILED DESCRIPTION OF THE PREFERRED EMBODIMENTS

For a fuller understanding of the nature and objects of the disclosure, reference should be made to the following detailed descriptions, taken in connection with the accompanying drawings. The following figures offer explanatory illustrations, which, like most, if not all, explanations and illustrations, are potentially useful, but inherently incomplete. The following figures, and the illustrations offered therein, and the associated explanations, in no way constitute limitations, neither explicit nor implicit, on the scope of the present invention.

Note that some figures incorporate bold arrows to suggest the flow of air and/or water.

Figure 1:
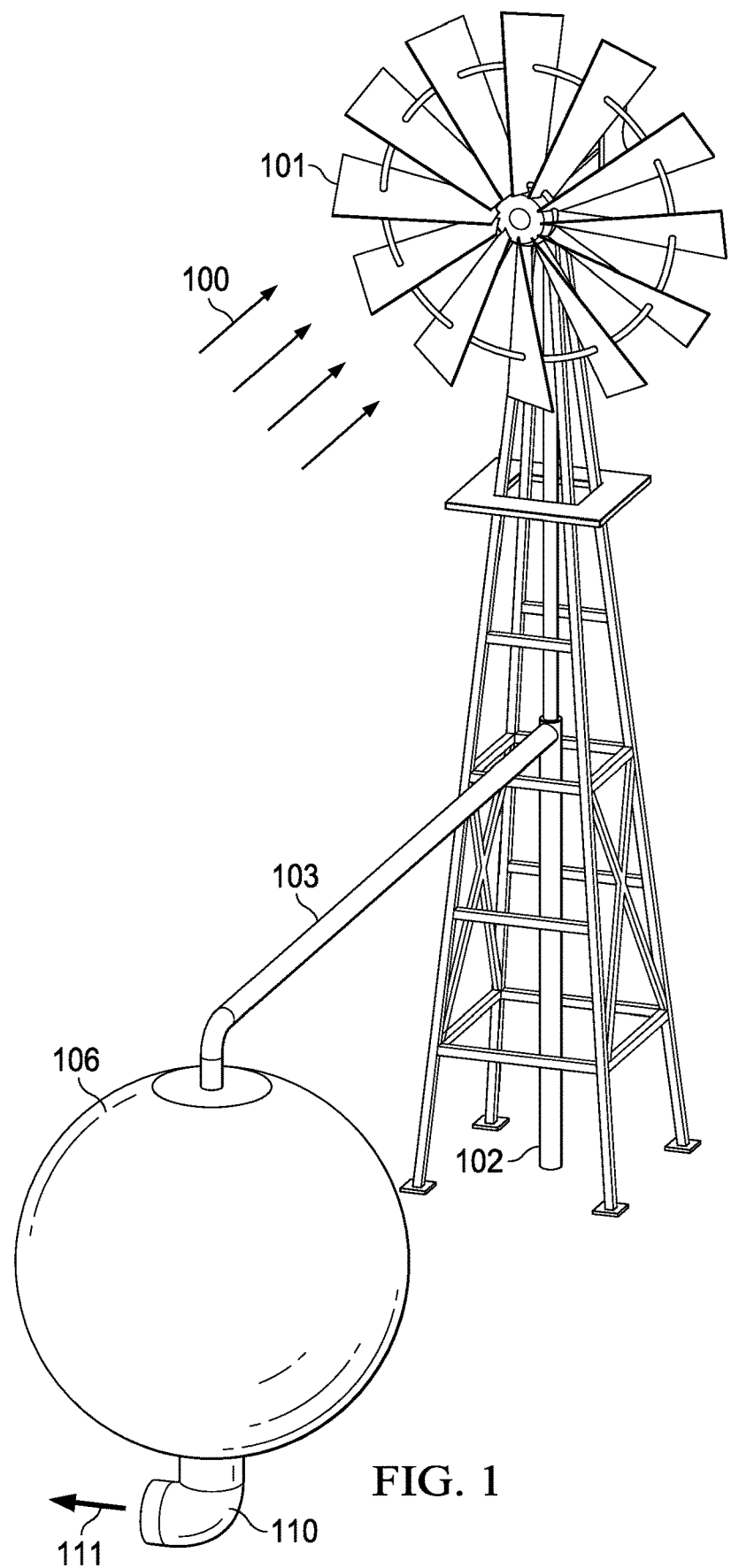
FIG. 1 is a perspective view of a first embodiment of the present invention.

FIG. 1 shows a side perspective view of an embodiment of the present disclosure. Wind 100 imparts energy to a wind turbine 101 in an unsteady, variable, and/or stochastic, manner, and/or at an unsteady, variable, and/or stochastic, rate. Rotations of the wind turbine cause a pump (not shown) to draw water from under the ground and into pipe 102, from where it flows through pipe 103, and is deposited into water reservoir 106. Portions of the water within reservoir 106 flow 111 out through an effluent pipe 110 in which a water turbine (not visible) extracts energy from the outflowing water.

Figure 2:
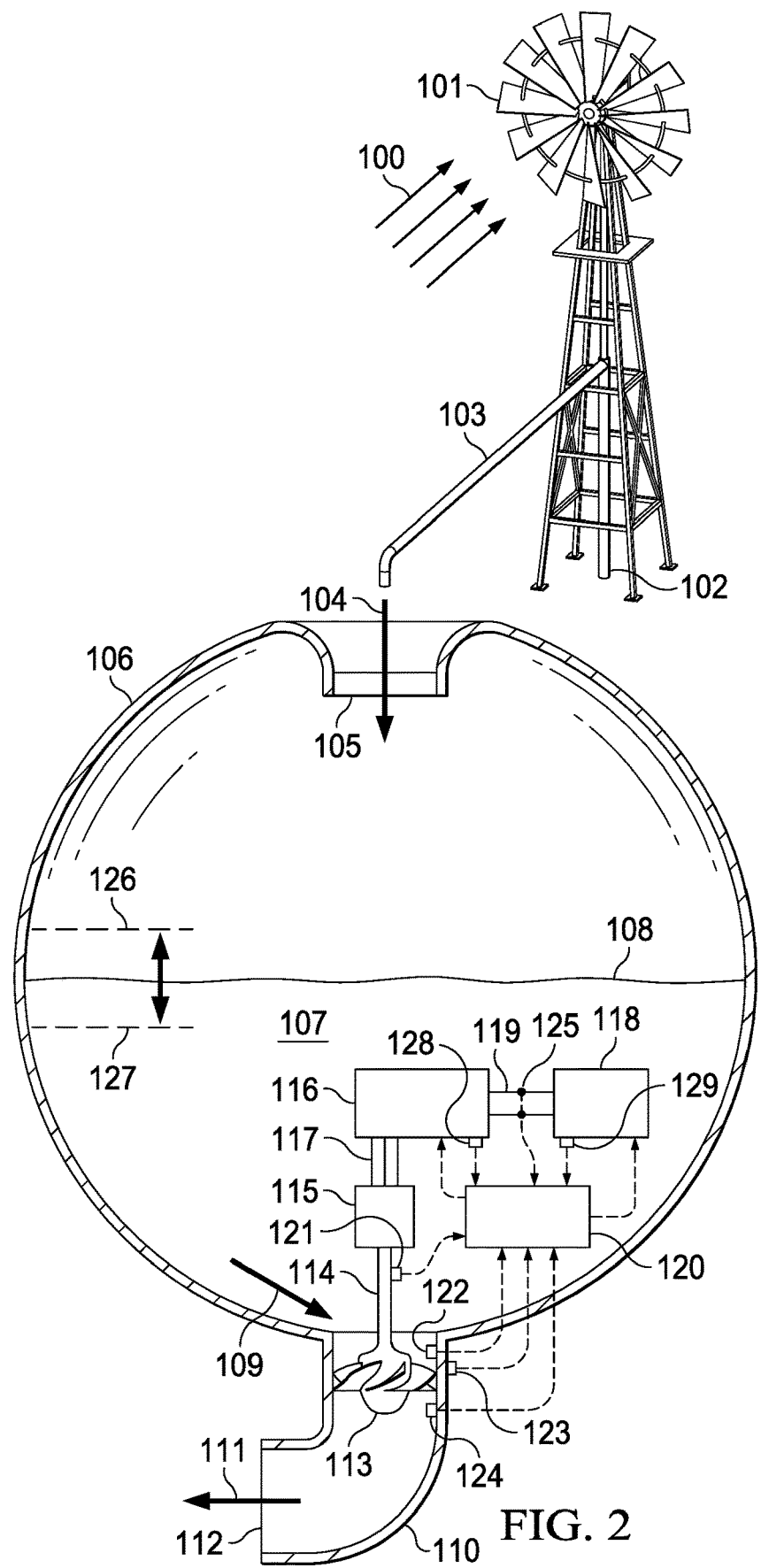
FIG. 2 is a side sectional view of the water tank of the embodiment of FIG. 1.

FIG. 2 shows a schematic view of the same embodiment of the present disclosure that is illustrated in FIG. 1. The embodiment includes a component (wind turbine 101) that captures energy from a stochastic environmental source (wind 100) and uses a portion of that energy to lift water from under the ground (through a pipe 102/103) and deposit that water into a reservoir 106. Because the rate at which energy is captured by the wind turbine is variable, the rate at which water is deposited into the reservoir is also variable. Portions of water 107 from within the reservoir 106 flow under the influence of gravity through a water turbine 113 which causes an operatively-connected generator 115 to generate electrical power. Because the rate at which water is deposited into the reservoir is variable, the rate at which water would need to flow out of the reservoir and through the water turbine in order to maintain an approximately stable water level 108 within the reservoir is variable. Similarly, at when the level of water 107 within the reservoir rises due to an increased inflow rate 104, a greater pressure head is available at the turbine 113 than during average operation; and conversely, when the level of water 107 within the reservoir falls due to a decreased inflow rate 104, a lesser pressure head is available at the turbine 113 than during average operation. Such changes in pressure head will tend to cause changes in the flow rate through the turbine 113, all else being equal.

The rate at which water flows out of the reservoir and through the water turbine, and the power that can be extracted from that flow, are influenced by the degree to which the water turbine 113 resists turning in response to the flow of that water.

By controlling the electrical load, power draw, and/or current draw, on its generator 115, the embodiment controls the degree to which the water turbine 113 resists turning in response to the flow of that water. Thereby, by varying the magnitude of the electrical load imposed upon the generator, i.e., by varying the rate at which the embodiment's electrical load 118 consumes electrical power, the load manager indirectly controls, regulates, adjusts, and/or influences, the consequential magnitude of the water turbine's resistive torque, the pressure drop across said turbine, and the rate of water outflow from the reservoir. And, the magnitude of the resistive torque of the water turbine and the generator, with respect to a rate of water outflow from the reservoir, determines and/or influences the amount of electrical power produced by the generator.

Because the amount of electrical power consumed by the embodiment's electrical load 118 determines, or at least influences, the amount of power extracted from the outflowing water 109/111 by the water turbine 113; and the amount of power produced by the generator 115 cannot exceed the amount of power extracted from the outflowing water 109/111 by the water turbine; and the maximal amount of power that may be extracted from the outflowing water is constantly varying; the load manager 120 continually adjusts the amount of electrical power consumed by the embodiment's electrical load so as to instantaneously control the amount of electrical power that may be consumed by the embodiment's electrical load. The embodiment varies the clock frequencies and core voltages of CPUs included, incorporated, and/or operating within the electrical load 118, and thereby the embodiment may permit its digital circuits to complete serial and/or serialized tasks (e.g., the execution of computer programs) without interruption by allowing variations in the instantaneously available electrical power (and variations in the available driving stochastic energy source, e.g., wind) to be accommodated as variations in the amount of time required to complete those serial and/or serialized tasks (rather than being manifested, for instance, as variations in the degrees to which serial and/or serialized tasks are completed before they fail due to a lack of sufficient electrical power).

A highly-variable and/or relatively stochastic source of natural energy, in this case wind 100, imparts energy to the wind turbine 101 of a windmill. A subterranean water piston (not visible) powered by the windmill pumps ground water to the surface into and through a water pipe 102. The pressurized water within the water pipe 102 flows laterally through water discharge pipe 103 after which it flows 104 out of the water discharge pipe and into an upper aperture 105 of a water reservoir 106 that temporarily stores, caches, buffers, and/or accumulates, such discharged flows 104 of windmill-lifted water 107, said water having an upper surface 108.

Water 107 from the water reservoir 106 flows 109 into an effluent tube 110 and then through the effluent tube. Water flowing through the effluent tube eventually flows 111 out of a distal and/or downstream aperture or mouth 112 of the effluent tube. Water flowing through the effluent tube 110 engages, is obstructed by, and/or imparts energy to, a water turbine 113 positioned therein. Rotations of the water turbine 113 cause an attached turbine shaft 114 to rotate, which, in turn, communicates mechanical energy from the water turbine 113 to an operatively-connected generator 115. Electrical power (e.g., three-phase alternating current) is transmitted from the generator 115 to a power conditioning module (PCM) 116 by and/or through, wires, cables, and/or conductors, 117. PCM 116 can be or include an inverter.

PCM 116 can include a buck converter. PCM 116 can be or include an actively controlled collection of switches (transistors) and other electrical circuit elements configured to convert alternating current of a first peak voltage to direct current of a second voltage.

Power conditioning module 116 transmits electrical power (e.g., direct current) to an electrical load 118 by and/or through, wires, cables, and/or conductors, 119. An embodiment's electrical load 118 is comprised of a plurality of computing devices that use at least a portion of the electrical power provided to them by the power conditioning module to perform computational tasks and generate computational results, e.g., such as tasks obtained from a remote source by satellite and results transmitted to a remote receiver by satellite.

A load manager 120 can receive input signals (e.g. along wires indicated by inbound dashed arrows) from: sensor 121 which measures the rate of rotation (e.g., RPM) of turbine shaft 114; sensor 122 which measures the pressure of the water that flows through the water turbine 113; sensor 123 which measures the pressure of the water (if any) outside the effluent tube 110 and water reservoir 110, into which the effluent discharged from the mouth 112 of the effluent tube 110 will flow (note that sensors 122 and 123 can be separate absolute pressure sensors or an integral relative pressure sensor); sensor 124 which measures the rate at which water flows through the water turbine 113 and effluent tube 110; sensor 125 which measures the magnitudes of the voltage and/or current on the bus between the electrical load 118 and the power conditioning module 116; sensor 128 which measures the temperature of the power conditioning module 116; and sensor 129 which measures the temperature of the electrical load 118. Although not shown in this figure, load manager 120 can also receive an input signal from a sensor (not shown) configured to measure the voltage and/or current in the electrical conductors connecting generator 115 to PCM 116. Load manager 120 need not receive all of the input signals mentioned in this paragraph but can receive only a subset of them as dictated by the use case of a particular embodiment and the degree of control desired.

On the basis of the data that it collects from its various sensors, 121-125 and 128-129, the load manager 120 sends control signals to the power conditioning module 116 and/or the electrical load 118. Those load manager control signals cause the power conditioning module to alter its processing of the electricity it receives from the generator 115 and potentially alter the magnitude and/or character (e.g., voltage and/or current) that it transmits, provides, and/or applies, to the electrical load 118; and/or, they cause the electrical load 118 to alter its rate of consumption of electrical power, e.g., drawn from the power conditioning module 116 and ultimately from the generator 115. In one embodiment, when load manager 120 senses the voltage measured by sensor 125 dropping (e.g. due to a smaller amount of mechanical power available to the generator), it sends a control signal to the digital circuits (CPUs) included within electrical load 118. Said control signal encodes an instruction to reduce the clock frequency of said circuits, so that the electrical load 118 draws less current. This reduction in current drawn by the electrical load can enable PCM 116 to main a constant bus voltage on bus/wires 119, even while the mechanical power available to the system (e.g. to the generator) is falling.

The electrical load 118 comprises, at least in part, a plurality of digital computing circuits such as computer-processing units (CPUs), graphics-processing units (GPUs), application-specific integrated circuits (ASICs), tensor processing units (TPUs), etc., which process digital information in accordance with a certain clock frequency and/or in response to a clocking signal.

The load manager 120 transmits to at least a portion of the digital computing circuits in the electrical load 118 a signal that alters (increases or decreases) the frequency of the clock signal used to time the transitions of the digital elements within those digital computing circuits that allow them to process digital information. Typically, decreasing the clock speed and/or frequency of a digital computing circuit will tend to reduce its consumption of electrical power. Likewise, it is typically the case that increasing the clock speed and/or frequency of a digital computing circuit will tend to increase its consumption of electrical power. (All else being equal.)

The load manager 120 transmits to at least a portion of the digital computing circuits in the electrical load 118 a signal that alters (increases or decreases) the "core voltage" within those digital computing circuits. Typically, decreasing the core voltage of a digital computing circuit will tend to reduce its consumption of electrical power. Likewise, it is typically the case that increasing the core voltage of a digital computing circuit will tend to increase its consumption of electrical power. It is also typically the case that there is a relationship between the clock frequency of a digital computing circuit and its core voltage, a relatively higher core voltage typically being required when a digital computing circuit is driven at a relatively higher clock frequency.

Digital computing circuits, particularly CPUs, can typically be instructed, compelled, and/or caused, to divide, partition, and/or allocate, their time to more than a single task thereby enabling such circuits to process (or appear to process) more than a single task simultaneously. However, if one of those tasks is actually vacuous and does not cause the digital computing circuits to perform a large number of switching operations, for instance by receiving at the digital computing circuit a stream of "no operation" (or "no-op") commands, or similar, then the digital computing circuit will tend to reduce its consumption of electrical energy by approximately the same degree, percentage, division, and/or partition, as the digital computing circuit spends performing no-op operations. Similarly, the operating systems that coordinate the processing executed and/or performed by digital computing circuits can be instructed to periodically execute, for a measured amount of time, a loop in which the program counter of a digital computing circuit (which tells the digital computing circuit which next instruction or command to process) is continually reset to its last active value, thereby causing program execution to pause, and thereby also causing electrical power consumption by the digital computing circuit to be reduced during such pauses. Similarly, the operating systems that coordinate the processing executed and/or performed by digital computing circuits can be instructed to execute the "idle," thread, during which time the central processing unit can be placed into a low-power mode until a hardware interrupt is received. Other means of causing a digital computing circuit to "idle" or "stall" for a period of time, consuming little power during that period, are also possible.

Both the alteration of the clock frequency of a digital computing circuit, and the regular introduction of intervals during which program execution on a digital computing circuit is effectively stalled (e.g., by sending no-op commands to the circuit and/or by pausing the incrementation of the circuit's program counter, or some other means), tend to permit programs being executed on, in, through, and/or with, the digital computing circuit to continue their normal execution pattern, and to arrive at the same conclusion, to produce the same result, and/or to effect the same action or change, albeit while requiring such program execution to proceed at a slower pace and require more time for completion.

The alteration of the clock frequency of a digital computing circuit tends to result in reductions in both the pace at which programs execute on the digital computing circuit, as well as the rate at which electrical energy is consumed by the digital computing circuit. The reductions in the pace of program execution and the rate of energy consumption will typically be related, though not exactly proportional. A program requiring a certain number of digital steps to complete will take longer if fewer steps are executed per unit time, and the rate at which electrical energy is consumed will likewise tend to be reduced.

Likewise, the alteration of the portion or percentage of time that a digital computing circuit spends processing "active" programmatic codes, data, and/or commands, versus the portion or percentage of time that it spends processing no-op commands and/or with a stalled program counter and/or "stalled" by some other mechanism, tends to also result in reductions in both the pace at which programs execute on the digital computing circuit, as well as in the rate at which electrical energy is consumed by the digital computing circuit. And, as tends to be true of the effects of alterations of the clock frequency on a digital computing circuit, alterations of the portion or percentage of time that a digital computing circuit spends processing "active" programmatic codes, data, and/or commands, will tend, at least to an approximate degree, to reduce to a similar degree both the pace of program execution and the rate of energy consumption.

By reducing the clock frequency of one or more digital computing circuits in the electrical load, and/or by reducing the percentage of time that one or more digital computing circuits in the electrical load spend processing active commands, the load manager 120 can typically reduce the total amount of electrical current (e.g. drawn from the power conditioning module 116) that the electrical load consumes. Such a reduction in the rate of electrical power consumption by the electrical load will tend to reduce the amount of resistive torque imparted by the generator to the water turbine 113, which, in turn, can tend to prevent a severe decrease in the RPM of the turbine in conditions when otherwise it might severely decrease.

The load manager 120 increases the clock frequency of one or more digital computing circuits in the electrical load, and/or by increases the percentage of time that one or more digital computing circuits in the electrical load spends processing active commands, and thereby the load manager 120 can increase the total amount of electrical power output by the generator 115 and the power conditioning module 116 that the electrical load consumes. Such an increase in the rate of electrical power consumption by the electrical load will tend to increase the amount of resistive torque imparted by the generator to the water turbine 113, which, in turn, can increase the pressure drop across the turbine and reduce the rate at which water flows out of the effluent tube 110, and/or capture more power when more pressure head is available.

As a consequence of a first level 108 of water within the water reservoir 106, the water turbine will be able to extract hydraulic power (e.g., from head and/or hydraulic pressure potential energy creating a flow) at a first maximal rate, as well as at a variety of lesser rates. The water turbine's rate of hydraulic power extraction will be related to, if not determined by, the torque with which the turbine resists turning, i.e., the turbine's resistive torque.

The resistive torque imparted to the water turbine 113 by the generator 115 (via the intermediating turbine shaft 114) will be a consequence of the amount of electrical current drawn by the power conditioning module 116 and/or the electrical load 118. The greater the amount of electrical current consumed by the power conditioning module 116 and/or the electrical load 118 (note: the amounts of current consumed by the power conditioning module and electrical load may or may not be approximately identical, depending on any transformations of voltage occasioned by the power conditioning module and any losses that may occur in the power conditioning module and elsewhere), the greater the amount of resistive torque manifested by the generator and imparted to the water turbine. The lesser the amount of electrical current drawn by the power conditioning module 116 and/or the electrical load 118, the lesser the amount of resistive torque manifested by the generator and imparted to the water turbine. By dynamically, immediately, and/or quickly, adjusting, changing, altering, and/or controlling, the amount of electrical current consumed by the power conditioning module 116 and/or the electrical load 118, the resistive torque manifested by the generator 115 and imparted to the water turbine 113, via the turbine shaft 114, can be likewise adjusted, changed, altered, and/or controlled.

With respect to a given level 108 of water within the water reservoir 106, an appropriate rate of electrical power consumption by the power conditioning module 116 and/or the electrical load 118 can result in the imposition on the water turbine 113 of a resistive torque that will result in the maximal amount of electrical power being generated (given the current reservoir water level and/or available pressure head).

If the level 108 of the water within the water reservoir 106 were to increase (to a level 126) or decrease (to a level 127), then by causing an appropriate degree of change in the rate of electrical current draw by the power conditioning module 116 and/or the electrical load 118, the load manager 120 can preserve an optimal amount of electrical power generation, e.g. by tuning the level of resistive torque applied to the turbine to match that level of resistive torque optimally suited to recovering power from the currently available pressure head. It is typically the case that the maximal amount of electrical power generation will be higher with respect to a higher water level, e.g., 126, than with respect to a lower water level, e.g., 127. So, an appropriate and/or optimal rate of electrical power consumption by the power conditioning module 116 and/or the electrical load 118 can achieve an amount of electrical power generation equal to, but not exceeding, the maximum possible absolute amount of electrical power that may be generated, which is related to the level, e.g., 108, of the water 107 within the water reservoir 106.

The resistive torque with which an embodiment's water turbine 113 resists the outflow of water through its respective effluent tube 110 will tend to affect the pressure drop across said turbine and the rate at which water flows through and out of the effluent tube 110. An increase in the resistive torque can reduce the rate at which water flows through and out of the effluent tube 110. And, a decrease in the resistive torque can increase the rate at which water flows through and out of the effluent tube.

The load manager 120 of an embodiment of the present disclosure can adjust operational behaviors of the respective power conditioning module 116 and/or the respective electrical load 118 in order to regulate, change, alter, and/or modify, the rate at which water flows through and out of the effluent tube 110, even when the resulting level of electrical power available to the electrical load 118 becomes and/or remains suboptimal.

The load manager 120 of an embodiment of the present disclosure can adjust the rate of energy consumption by its respective electrical load 118 in order to regulate the level of water (or the rate of change of the level of water or the rate of power extraction from a given change in the level of water) 107 within its respective water reservoir 106. If the rate at which water flows 104 into the embodiment's water reservoir tends to be less than the rate at which flows 111 out (e.g., given a degree of water turbine resistive torque that produces an optimal degree of electrical power production) then the level 108 of the water 107 within the water reservoir 106 will tend to decrease (e.g., 127).

It is difficult to predict the future. However, the embodiment's load manager 120 can respond to a trending loss of water 107 from the water reservoir 106 as if the trend is likely to continue. The embodiment is fabricated and/or designed to minimize the likelihood that the amount of water, and the amount of hydraulic potential energy stored therein, will fall to a level where the embodiment's generator 115 and/or power conditioning module 116 will become unable to supply a requisite threshold amount of conditioned electrical power to the electrical load 118.

Therefore, in response to its detection of such a trend, the load manager, if possible, can increase the rate at which the power conditioning module 116 draws current so as to increase the resistive torque of the water turbine 113 and thereby slow the egress 111 of water from the water reservoir. Concomitantly, it may either increase or decrease the rate at which the electrical load 118 consumes power, e.g. by upregulating or downregulating the clock frequency of digital circuits therein, depending on whether the aforementioned increase in resistive torque applied to the water turbine 113 is expected to increase or decrease the power extracted from the fluid flow.

Sometimes, as implied above, it may be useful for the load manager 120 to simultaneously increase the rate at which the power conditioning module draws current and decrease the rate at which the electrical load draws current, or vice versa.

An embodiment of the present disclosure receives weather forecast data via radio signals from a remote computer and transmitter. In response to a weather forecast that indicates that the average wind speed at the location of the windmill 101 is likely to decrease, the embodiment's load manager 120 will, if possible, increase the rate at which electrical power is consumed by the embodiment's electrical load 118. Conversely, in response to a weather forecast that indicates that the average wind speed at the location of the windmill 101 is likely to increase, especially if it is forecast to increase significantly and/or beyond the embodiment's design limits, the embodiment's load manager 120 will, if possible, decrease the rate at which electrical power is consumed by the embodiment's electrical load 118, and thereby increasing the rate at which water 107 from the embodiment's water reservoir 106 is discharged from the embodiment's effluent tube 110.

An embodiment of the present disclosure incorporates a resistor within its electrical-load circuit. Other embodiments similar to the one illustrated in FIGS. 1 and 2, utilize other methods, mechanisms, circuits, designs, and/or control strategies, some in addition to the variation of CPU frequencies and/or core voltages, in order to regulate the rate at which energy is derived from a stochastic source (e.g., wind, waves, tides, sunlight).

One such embodiment floats and extracts energy from waves passing across the surface of the body of water on which it floats and uses at least a portion of the extracted energy to deposit portions of that water into a water reservoir within the embodiment. For example, one such embodiment incorporates a vertical tube containing a constriction near an upper tube mouth. Wave-driven oscillations of water within the vertical tube occasionally cause upward-moving portions of the water within the tube to encounter the constriction and accelerate upward within the tube, occasionally causing portions of water to be ejected from the upper tube mouth and into the embodiment's water reservoir.

One such embodiment is similar to an oscillating water column (OWC) which compresses air in response to wave-driven changes in the level of water within a chamber open to the body of water below the upper surface of that body of water. However, unlike an OWC of the prior art, this embodiment traps portions of the air cyclically compressed by the OWC within a pressurized air chamber and utilizes an air turbine to extract energy from that chamber (or reservoir) of pressurized air.

Other such embodiments incorporate "segregated" electrical loads, e.g., differentiated digital circuits, each of which may be independently powered on or powered off by the embodiment's load manager. An example is a bank of computers each of which may be independently powered on or off by an electrically-controlled switch. A portion of the segregated electrical loads of one such embodiment differ in their ability to tolerate variations in voltage and/or current, and/or differ in the ranges of electrical power, over which they tend to operate in a nominal manner. The load manager of such an embodiment may adjust the amount of power consumed by the collective electrical load by adjusting the clock frequencies and/or core voltages of the CPUs of one segregated electrical load, while simply powering on and powering off another segregated load. Many such segregated, divided, incremental, collective, complex, and/or varied, electrical-power-adjustment schemes, designs, circuits, modules, architectures, and/or systems, may be employed by embodiments of the current disclosure.

Other "direct-extraction" embodiments similar to the one illustrated in FIGS. 1 and 2, omit a reservoir (e.g., of water or pressurized air) and instead extract energy directly from a stochastic energy source. The rate at which energy is extracted, when the extraction is made directly from a stochastic energy source, tends to be more variable, volatile, and/or stochastic, than the rate at which energy is extracted from an intermediate reservoir, making the compensatory adjustments to the electrical loads required to support the electrical power requirements of digital circuits, especially in the absence of an intermediately, smoothing, and/or buffering, electrical energy storage device, operating within such direct-extraction embodiments even more exaggerated, extreme, and/or rapid.

One such direct-extraction embodiment floats and produces jets and/or squirts of water in response to waves passing across the surface of the body of water on which it floats. For example, one such direct-extraction embodiment incorporates a vertical tube containing a constriction near an upper tube mouth. Wave-driven oscillations of water within the vertical tube occasionally encounter the constriction and pressurize a portion of the water within the tube, occasionally causing portions of water to be ejected from the upper tube mouth and onto, into, and/or through, a water turbine, which extracts energy directly from the intermittent jets of water.

One such direct-extraction embodiment floats and incorporates two bodies linked by a joint or hinge. In response to waves passing across the surface of the body of water on which it floats the hinge tends to flex and cause an operatively-connected hydraulic ram to pressurize hydraulic fluid. The embodiment extracts energy directly from the pressurized hydraulic fluid.

One such direct-extraction embodiment incorporates a wind turbine that tends to rotate in response to wind. Rotations of the wind turbine energize the embodiment's generator (e.g., 115). One such direct-extraction embodiment incorporates a solar panel that tends to serve as the embodiment's sunlight-driven generator (e.g., the equivalent of a combination of water turbine 113 and generator 115). The output of the solar panel is transmitted to the embodiment's power conditioning module (e.g., 116).

Other "reservoir-managing" embodiments similar to the one illustrated in FIGS. 1 and 2, incorporate load managers that adjust the collective load not only to optimize and/or maximize the amount of electrical power produced by the generator, but also to regulate, alter, adjust, and/or maintain, a nominal level of water within its respective reservoir. Under certain circumstance, and/or in response to certain types of information (such as weather forecasts received from a remote location and/or inferred from its own external weather sensors (wind, temperature, barometric pressure, etc.) the load managers of some embodiments may alter, and/or adjust, the electrical load so as to regulate the effect of the water turbine on the rate at which fluid (e.g., water or air) flows out of the reservoir.

If a reservoir-managing embodiment's load manager determines that the embodiment's driving source of energy (e.g., wind, waves, sunlight) may soon be reduced, then it may alter, and/or adjust, the electrical load so as to reduce the rate at which fluid (e.g., water or air) flows out of the reservoir thereby conserving the potential energy stored in the reservoir and thereby potentially suffering a current reduction in the amount of electrical power output by the embodiment's generator in order to minimize the risk of suffering a much greater reduction in the amount of electrical power output by the embodiment's generator in the future.

Similarly, if a reservoir-managing embodiment's load manager determines that the embodiment's driving source of energy (e.g., wind, waves, sunlight) may soon become excessive, then it may alter, and/or adjust, the electrical load so as to increase the rate at which fluid (e.g., water or air) flows out of the reservoir thereby increasing the amount fluid that may be added to the reservoir in the future. Such an alteration may well result in an amount of electrical power output that is less than the maximal that might otherwise be generated. However, this might also reduce the risk of having the capacity of the embodiment's reservoir exceeded (e.g., overfilled and/or over pressurized) in the future.

One such reservoir-managing embodiment incorporates a pump which, when the load manager executes a reservoir-conservation protocol, pumps fluid (e.g., water or air) discharged from the embodiment's fluid reservoir (e.g., water or air) and into an effluent collector (e.g., a tank that receives water discharged from a water reservoir or the atmosphere that receives compressed air discharged from a compressed air chamber) back into the reservoir, thereby adding fluid to the reservoir while simultaneously increasing the total electrical load on the generator and increasing the resulting resistive torque imparted to the turbine. Such an embodiment amplifies the slowing of fluid outflow from its reservoir by adding the power consumed by the pump to the power consumed by the electrical load, while simultaneously recapturing some of the energy otherwise wasted through the powering of the pump by using the pump to return fluid to the reservoir.

Figure 3:
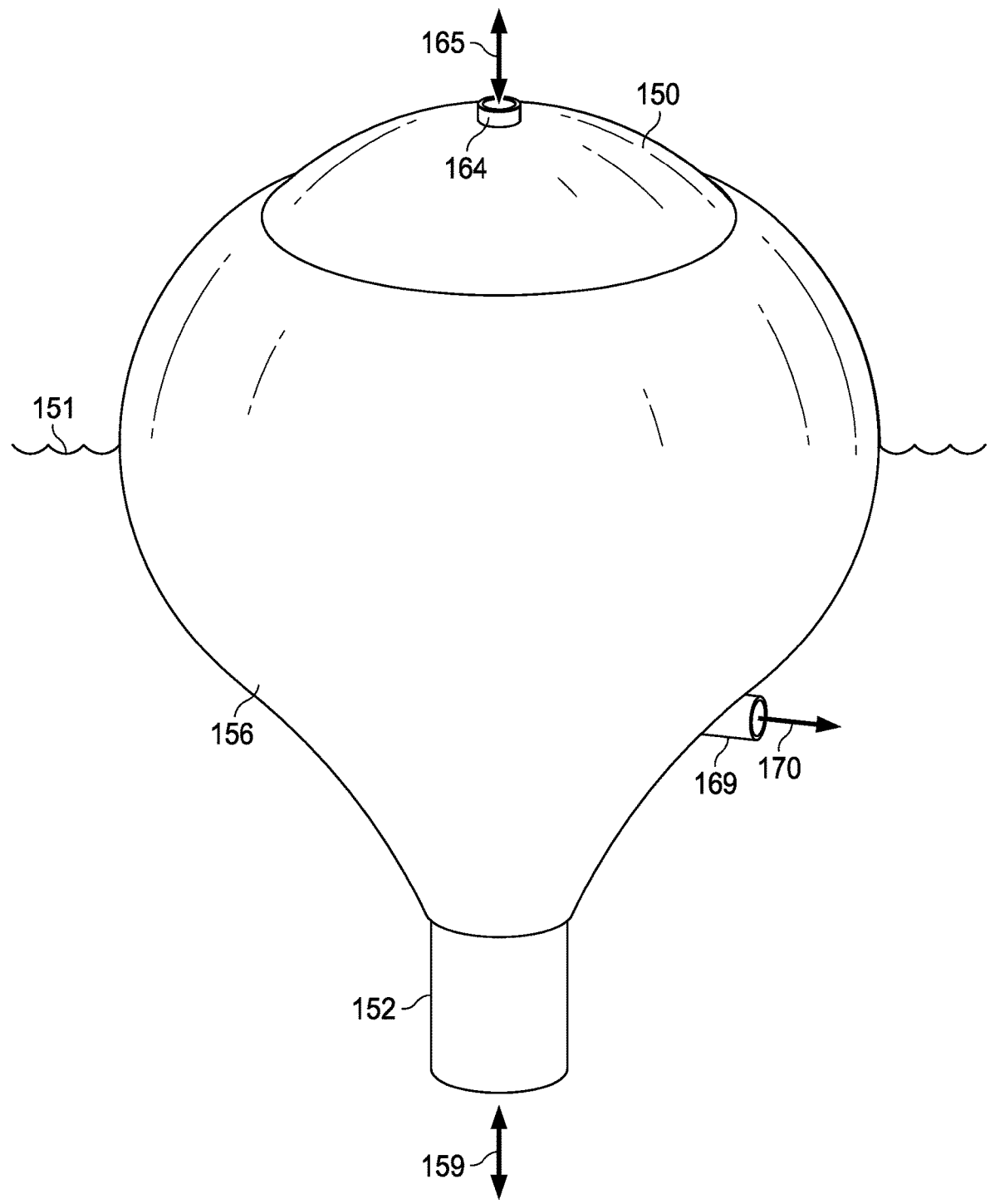
FIG. 3 is a perspective view of a second embodiment of the present invention.

FIG. 3 shows a side perspective view of an embodiment of the present disclosure. The embodiment 150 floats adjacent to an upper surface 151 of a body of water over which waves tend to pass and/or propagate. The embodiment includes, incorporates, and/or utilizes, an approximately spherical hollow water reservoir 150. It also includes, incorporates, and/or utilizes, a nominally vertical inertial water tube 152 having upper and lower mouths (not visible) through which fluids may freely flow.

In response to wave motion adjacent to an upper surface 151 of the body of water on which the embodiment floats, water moves 159 into and out of the embodiment's inertial water tube 152 via its lower mouth. And, occasionally and/or periodically a portion of that water is ejected from the upper mouth (not visible) of the inertial water tube and into a water reservoir (not visible) within the hollow interior (not visible) of the bulbous upper portion 150 of the embodiment. In response to ejections of water from the inertial water tube into the water reservoir, air above the water reservoir flows 165 out of the embodiment through aperture 164. Similarly, ejections of water from the inertial water tube generate a relatively consistent flow of water 170 from the water reservoir back to the body of water 151 through effluent pipe 169.

A surrounding mass of buoyant material 156 provides buoyancy to the embodiment and tends to lift a portion of the water reservoir inside the hollow interior of the bulbous upper portion 150 of the embodiment above the mean level of the surface 151 of the water on which the embodiment floats. In response to the elevation of a portion of the water reservoir above the mean water level 151 of the water outside the embodiment, a portion of the water within the water reservoir tends to flow 170 out of effluent pipe 169, thereby returning to the body of water 151, in response to the higher total pressure of the water at the inlet of the effluent pipe, relative to the total pressure of the water at the outlet. As water flows 170 out of the embodiment through effluent pipe 169 it flows through a water turbine (not visible) causing it to rotate, and, via a turbine shaft (not visible), to transmit rotational energy to a generator (not visible) which responds by generating electrical power.

The rate at which water is ejected into the embodiment's water reservoir (not visible) tends to be greater when the embodiment is buffeted by energetic waves and tends to be lower when the embodiment is buffeted by less energetic waves. The rate at which water is ejected into the embodiment's water reservoir is variable and alters in response to alterations in the wave climate to which the embodiment is subjected.

However, the rate at which water is released from the embodiment's water reservoir may, at least to an extent and with upper and lower limiting rates, be controlled, adjusted, altered, and/or regulated. The rate at which water flows from the water reservoir to the body of water 151 on which the embodiment floats is hindered, slowed, inhibited, and/or reduced, by the obstruction offered to that flow by the water turbine (not visible) within the effluent pipe 169, e.g. by that turbine instituting a pressure drop across itself. The water turbine imparts energy to the generator (not visible) through a turbine shaft (not visible), and, in reciprocal fashion, the generator imparts to the turbine shaft, and the water turbine to which it is connected, a resistive torque. The amount of resistive torque that the generator applies to the water turbine is related to the amount of, and/or degree to which, electrical power produced by the generator is consumed by an electrically connected load.

Figure 4:
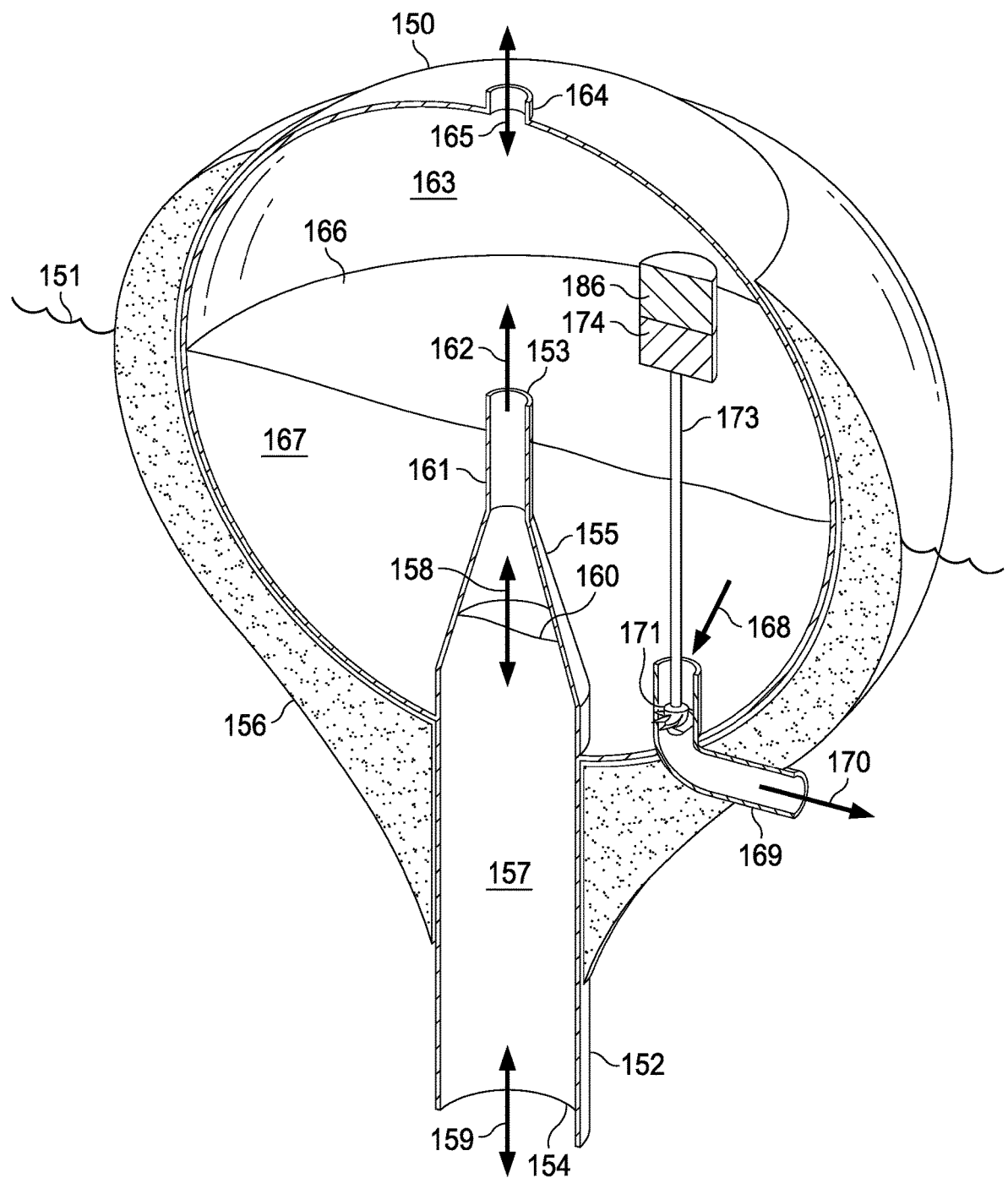
FIG. 4 is a perspective side sectional view of the embodiment of FIG. 3.
Figure 5:
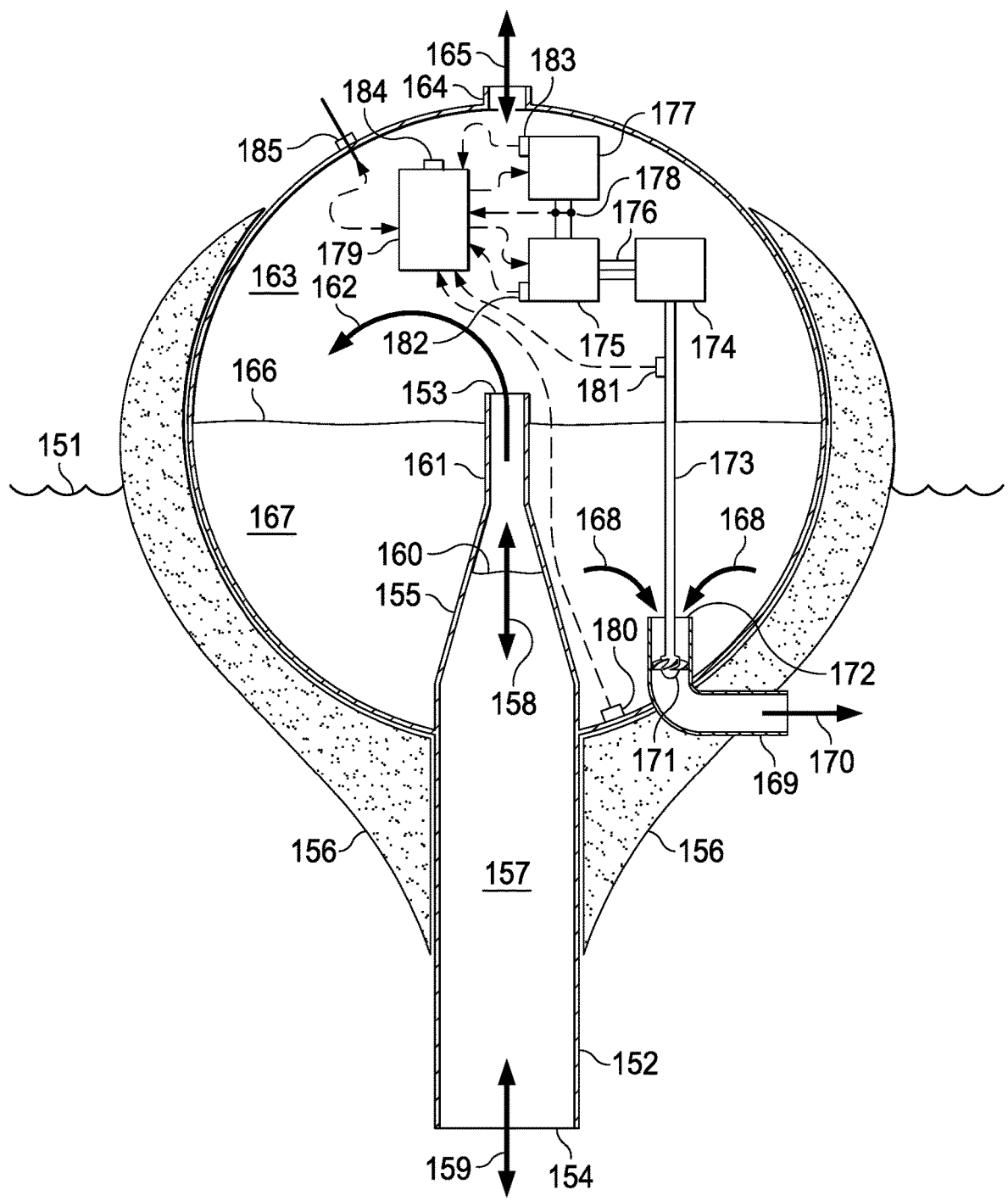
FIG. 5 is a side sectional view of the embodiment of FIG. 3.

The embodiment illustrated in FIGS. 3-5 alters the rate at which generator-produced electrical energy is consumed by an electrical load (not visible) within the embodiment, and in particular digital circuits thereof, thereby altering the amount of resistive torque that the generator imposes on the water turbine (not visible). Through this control of the resistance imparted by the generator to the water turbine, and, in turn, this control of the resistance imparted by the water turbine to the flow 170 of water out of the water reservoir into the body of water 151 through the effluent pipe 169, the embodiment is able to adjust its rate of electrical power generation in a manner that permits it to: (1) maximize the efficiency of fluid power capture by the turbine by tuning the turbine torque and RPM to the current level and pressure head of water in the reservoir, (2) increase or decrease the pressure drop imposed by the turbine to create lesser or greater thrust from the turbine effluent, (3) stabilize the amount of electrical power generation, e.g., so that a steady amount of electrical power is available to the electrical load, and/or (4) achieve other goals as may be desired.

FIG. 4 shows a perspective sectional view of the same embodiment of the present disclosure that is illustrated in FIG. 3. The section plane is vertical and passes through, and/or includes, a nominally vertical longitudinal axis of the embodiment about which the embodiment manifests approximate radial symmetry.

The embodiment 150 floats adjacent to an upper surface 151 of a body of water over which waves pass. And as the embodiment moves up and down in response to passing waves, an upper surface 160 of water 157 within its nominally vertical inertial water tube 152, 155, 161 tends to move 158 up and down relative to that inertial water tube. The inertial water tube is open-ended and is characterized by, and/or includes, upper 153 and lower 154 apertures and/or mouths, positioned at nominally upper and lower ends of the inertial water tube. Occasionally, water 157 oscillating 158 within the inertial water tube flows upward with enough force, speed, momentum, and/or energy, to reach and flow out 162 of the upper inertial-water-tube mouth 153, thereafter tending to be deposited, trapped, captured, contained, and/or collected, within a lower portion 167 of the hollow interior 163, 167 of the upper 150 bulbous, approximately spherical portion of the embodiment, thereby constituting, creating, forming, and/or augmenting, a water reservoir 167 in the lower portion of the hollow interior of the upper portion of the embodiment.

As water 157 oscillates 158 within the inertial water tube an upper portion of that water will occasionally move upward within a constricted, constricted, and/or narrowing, section 155 of the inertial water tube. As upward flowing water collides with the inner surfaces of the constricted portion 155 of the inertial water tube, it manifests a Venturi effect in which a portion of the static pressure of the up flowing water is converted to additional upward speed, thereby tending to accelerate the upward flow of water toward the upper mouth 153 of the inertial water tube 152, 155, 161 and tending to promote the ejection of portions of water from that upper mouth into the water reservoir 167. The cross-sectional area of the upper mouth is less than the cross-sectional area of the lower mouth, and the reduction in cross-sectional areas is the result of a constriction 155, and/or constricted region, portion, and/or segment, within an upper portion of the tube.

On average, the upper surface 166 of the water 167 stored within the embodiment's water reservoir 150 is higher than the upper surface 151 (especially a resting upper surface) of the body of water on which the embodiment floats. Therefore, there tends to be a net gravitational, hydraulic, and/or head, pressure between the water within the water reservoir and the water outside the embodiment that tends to force, compel, and/or drive, the water within the water reservoir to flow out of the water reservoir and back into the body of water 151 on which the embodiment floats.

Water trapped within the water reservoir 167 in the hollow interior of the upper portion 150 of the embodiment, flows 170 out, and/or back, to the body of water 151 on which the embodiment floats, and from which the water ejected 162 from the upper mouth 153 of the inertial water tube 161 and added to the water reservoir originated, through an effluent pipe 169, tube, channel, conduit, and/or duct. Water within the embodiment's water reservoir 167 flows 168 into the effluent pipe 169 through a proximate mouth, and/or a mouth positioned within the water reservoir. It then flows out 170 of the effluent pipe and back into the surrounding body of water 151, through a distal mouth, and/or a mouth positioned within the body of water 151. As it flows through effluent pipe 169, water 167 from the interior of the embodiment flows through, interacts with, energizes, and causes to rotate, a water turbine 171 positioned within the effluent pipe (note that the blades of the runner of turbine 171 are not shown/resolved in this figure, but should nonetheless be understood to be present). Rotations of the water turbine 171 cause an operatively connected turbine shaft 173 to rotate, which in turn transmits rotational kinetic energy and/or torque to a generator 174 operatively connected to the turbine shaft 173, and via the turbine shaft to the water turbine 171, thereby causing the generator to produce electrical power, voltage, and/or current.

As water flows 162 into and flows 168,170 out of the hollow interior 163, 167 of the upper portion 150 of the embodiment, and as the mean, resting, and/or average level and/or height of the surface 166 of that water reservoir 167 moves up and down in response to changes in the volume of water therein, the pressure of the air 163 inside the embodiment's hollow interior, and above the reservoir of water 167 trapped therein, equilibrates through the passage 165 of air through an aperture 164 that fluidly connects the interior 163 of the embodiment and the atmosphere outside the embodiment and above the surface 151 of the body of water on which the embodiment floats.

The embodiment is partially shrouded in a buoyant material 156, including, but not limited to, polyurethane, and low-density syntactic foams, the buoyancy of which at least partially supports, through displacement of water 151, the weight of the embodiment, by decreasing the average density of the embodiment and/or by increasing the embodiment's displacement in the body of water, thereby tending to lower the embodiment's waterline, and reduce its draft.

An embodiment similar to the one illustrated in FIGS. 3 and 4 includes a sealed chamber 156 comprised of an outer surface of rigid material, including, but not limited to, steel, carbon fiber, fiberglass, roto-molded high-density polyethylene (HDPE), and recycled plastic, and an inner void, bounded by that outer surface and the outer wall 150 of the upper portion of the embodiment and the inertial water tube, and filled with a gas, e.g., nitrogen, and/or a buoyant fluid, e.g., vegetable oil.

The electrical power generated by the embodiment's generator 174 in response to the outflow of water through the effluent pipe 169, and through the water turbine therein, is conditioned (e.g., has its voltage adjusted to a near constant level and/or value) and is then utilized by, and/or applied to, an electrical load (e.g., an electrical circuit which might include one or more CPUs) by components, circuits, modules, and/or subsystems, (not visible) that are contained within an electrical processing module 186 positioned proximate to the generator 174 (e.g., rigidly mounted atop the generator). Also included within the electrical processing module 186 is a load manager (not visible) which alters the rate at which the electrical load consumes the electrical power provided, transmitted, and/or applied to it by the power conditioner within the electrical processing module, e.g. by adjusting up and down the clock frequencies of CPUs of the electrical load, or by using any of the other methods or approaches described earlier in this disclosure.

When the load manager (not visible) increases the rate at which the electrical load consumes energy produced by the generator 174, then the resistive torque applied by the generator to the water turbine 171 (via the turbine shaft 173), and/or imparted to the water turbine by the generator, is increased. In the event that said increase in resistive torque coincides with an increase in pressure head available in the reservoir, then the RPM of the turbine will tend to remain roughly constant or else increase less than it would have if no increase in resistive torque had been manifested. In the event that said increase in resistive torque does not coincide with an increase in pressure head available in the reservoir, then the RPM of the turbine will tend to decrease. In either event, an increase in resistive torque can be expected to increase the pressure drop imposed by the turbine. As the generator 174 draws more energy from the turbine shaft and water turbine, the water turbine must, if it is able, draw more energy from the out flowing water 170. If the generator attempts to draw from the water turbine more energy than is available in the out flowing water, then the water turbine may slow or stop rotating.

When the load manager (not visible) decreases the rate at which the electrical load consumes energy produced by the generator 174, then the resistive torque applied by the generator to the water turbine 171 (via the turbine shaft 173), and/or imparted to the water turbine by the generator, is decreased. This has the effect of decreasing the pressure drop across the turbine and can increase the rate at which water is able to flow into 168 and out of 170 the effluent pipe 169. As the generator 174 draws less energy from the turbine shaft and water turbine, the water turbine reduces the degree to which it obstructs that out flow. If the generator does not draw any energy from the water turbine, then the water turbine may free spin and/or run away, which can damage the water turbine, the shaft, and other components of the power take off assembly.

The rate at which water is added to the water reservoir 167 depends, at least in part, on the energy of the waves buffeting and/or driving the embodiment at the surface 151 of the body of water. Powerful waves tend to add water to the water reservoir at a high rate. Feeble waves tend to add water to the water reservoir at a low rate. Among the factors that the load manager evaluates in some embodiments in order to determine the rate at which the electrical load (not visible) will consume energy produced by the generator 174, is the current pressure inside the reservoir. The load manager in some embodiments nominally adjusts the rate of energy consumption by the electrical load so as to be higher when a higher pressure is available inside the water reservoir and lower when a lower pressure is available inside the water reservoir.

The embodiment's load manager (located within the electrical processing module 186) alters the amount of electrical power consumed by the electrical load so as to adjust the amount of resistive torque and power manifested by the water turbine, thereby: (1) in some embodiments instantaneously optimizing and/or maximizing the amount of electrical power available to power the electrical load; and (2) in some embodiments increasing or decreasing the rate of water outflow from the water reservoir to a degree that results in a suboptimal and/or submaximal level of electrical power production by the generator, but achieves other goals of the system such as an increased or decreased rate of water discharge. In some embodiments, the load manager adjusts the amount of electrical power consumed by the electrical load by altering the clock frequency of CPUs included in the electrical load. In some embodiments, the load manager adjusts the amount of electrical power consumed by the electrical load by altering the clock frequency of Bitcoin-mining ASICs included in the electrical load. In some embodiments, the load manager adjusts the amount of electrical power consumed by the electrical load by altering the clock frequency of GPUs included in the electrical load. In some embodiments, the load manager adjusts the amount of electrical power consumed by the electrical load by turning off Bitcoin-mining ASICs included in the electrical load. In some embodiments, the load manager adjusts the amount of electrical power consumed by the electrical load by instructing processing units included in the electrical load to perform tasks using fewer cores. In some embodiments, the load manager adjusts the amount of electrical power consumed by the electrical load by sending an instruction received by an operating system kernel running on a computer included in the electrical load, said message whose receipt by the operating system kernel results in the operating system kernel adjusting a schedule of program execution on said computer included in the electrical load.

Other embodiments similar to the one illustrated in FIG. 4 are characterized by a variety of bulbous upper hull 150 shapes, and corresponding bulbous water/air reservoir shapes, including, but not limited to: ellipsoidal, cubical, cuboidal, conical, frustoconical, cylindrical, toroidal, rectangular prismatic, square pyramidal, and "geodesic-spherical."

Other embodiments similar to the one illustrated in FIG. 4 are characterized by constrictions: of different relative and absolute positions and/or locations along the lengths of their respective inertial water tubes; of differing ratios of cross-sectional areas of their lower, e.g., 154, and upper, e.g., 153, portions; of differing internal angles characterizing the rate (per unit tube length) at which they constrict. Other embodiments similar to the one illustrated in FIG. 4 have constrictions that are characterized by a variety of included angles (i.e., angularity of the frustoconical portion 155 of the tube wall that achieves the reduction in cross-sectional area).

An embodiment similar to the one illustrated in FIG. 4 does not have a cylindrical portion at the upper end of its vertical tube, i.e., the upper mouth of its vertical tube is also the upper mouth and/or end of the frustoconical and/or constricted portion of its vertical tube. An embodiment similar to the one illustrated in FIG. 4 has an inertial water tube wherein the entire tube is tapered and/or constricted, and which lacks any portion manifesting a constant and/or unchanging cross-sectional area.

An embodiment similar to the one illustrated in FIG. 4 does not have a cylindrical portion at the lower end of its vertical tube, i.e., the lower mouth of its vertical tube is also the lower mouth and/or end of the frustoconical and/or constricted portion of its vertical tube.

An embodiment similar to the one illustrated in FIG. 4 does not have a cylindrical portion at either the upper or lower end of its vertical tube, i.e., the upper and lower mouths of its vertical tube are also the upper and lower mouths and/or ends of the frustoconical and/or constricted portion of its vertical tube.

An embodiment similar to the one illustrated in FIG. 4 has an inertial water tube that has a curved longitudinal and/or flow axis (as opposed to the approximately linear flow-axis manifested by the embodiment illustrated in FIG. 4).

An embodiment similar to the one illustrated in FIG. 4 has a vertical tube that does not have a constriction and/or constricted portion. Its vertical tube is characterized by approximately constant cross-sectional area along the length of its vertical tube.

The absolute and the relative positions of the components, elements, and/or parts, of the embodiment illustrated in FIG. 4 represent one possible architecture, arrangement, and/or design. However, other embodiments of the present disclosure will have such components, elements, and/or parts, located, attached, affixed, and/or connected, to other different absolute and the relative positions.

For example, the scope of the present disclosure includes embodiments wherein the effluent pipe is of different shape, diameter, length, height (relative to the surface 151 of the body of water), height (relative to the upper mouth 153 of the inertial water tube 161), radial displacement (from a nominally vertical axis of approximate radial symmetry of the inertial water tube); orientation (e.g., directing effluent water and/or producing thrust with any degree of tangent to the longitudinal axis of the embodiment).

For example, the scope of the present disclosure includes embodiments wherein the generator 174 is of different shape, size, position (relative to the nominal surface 166 of the water reservoir 167), degree of submergence (some fully submerged, some partially, and some (as in FIG. 4) not at all submerged). The present disclosure includes embodiments in which the generator is positioned outside the outer surface of the embodiment, and/or within the body of water 151 into which the effluent water flows.

The present disclosure includes embodiments that incorporate, include, and/or utilize, an air pump in place and/or in addition to an aperture 164 so that the embodiment can fully, or at least partially, regulate the pressure of the air within the air pocket 163.

The present disclosure includes embodiments in which buoyancy is achieved through all manner of buoyant materials, including those comprised and/or incorporating gases, liquids, and solids. The present disclosure includes embodiments in which the buoyancy is achieved through the positioning, and/or distribution, of buoyant materials and/or elements at any position on, at, within, and/or attached or affixed to, the embodiment, including, but not limited to, positions: inside the hollow interior 163/167 of the upper portion 150 of the embodiment; inside the inertial water tube 152, 155, 161; at an outer surface of the upper portion 150 of the embodiment; and/or at an outer portion of the inertial water tube 152, 155, 161.

The present disclosure includes embodiments in which an upper mouth 153 of the inertial water tube is at any relative or absolute height above the bottom of the hollow interior 163/167 of the upper portion 150 of the embodiment, and/or at any relative or absolute height above a nominal resting upper surface 166 of the water reservoir 167 (including both above and below that upper surface).

The present disclosure includes embodiments in which an electrical processing module 186 is positioned at any location within the hollow interior 163/167 of the upper portion 150 of the embodiment (including locations submerged within the water reservoir 167); any location inside the inertial water tube 152, 155, 161; any location adjacent to an outer surface of the upper portion 150 of the embodiment; and/or any location adjacent to an outer portion of the inertial water tube 152, 155, 161; and/or any other location within and/or adjacent to any other part, portion, surface, and/or piece, of the embodiment.

The present disclosure includes embodiments in which the circuits, components, pieces, modules, systems, and/or parts, of which the electrical processing module 186 is comprised are distributed at a variety of positions and/or locations within the embodiment, and/or adjacent to an outer surface of the embodiment.

FIG. 5 shows a schematic view of the same vertical sectional view of the embodiment of the present disclosure that is illustrated in FIG. 4. In the illustration provided in FIG. 5, some, but not necessarily all, of the components, circuits, modules, and/or subsystems of the electrical processing module (186 in FIG. 4) illustrated in FIG. 4 have been expanded in a schematic fashion so as to better illustrate their interconnections and operation. The modules 175, 177, and 179 illustrated in FIG. 5 are found within the electrical processing module (186 in FIG. 4). However, these modules, and their interconnections, are expanded in FIG. 5 so as to clarify their role in the combined electrical circuit that characterizes the electrical processing module. Also shown in FIG. 5, and not shown in FIG. 4, are a variety of sensors, electrical wires, and an antenna 185.

In FIG. 5, dashed lines indicate an electrical or optical connection through which encoded data tends to be transmitted and/or exchanged, often with an arrowed end to indicate the primary and/or predominant and/or conceptual direction of data flow and/or transmission (i.e., the arrow tends to point to the recipient of the data therethrough transmitted). By contrast, solid lines indicate an electrical or optical connection through which energy, e.g., electrical voltage, current, and power, tends to be transmitted, shared, and/or distributed.

The embodiment 150 comprises three principle structural elements: an approximately spherical vessel 150 that acts as a water reservoir; a nominally vertical tube 152, 155, 161 that is open at its nominally upper and lower ends; and a jacket 156, casing, covering, layer, and/or partial envelope, of a buoyant material, e.g., structural polyurethane foam.

As the embodiment is moved up and down by waves passing across the surface 151 of the body of water on, in, and/or adjacent to, which the embodiment floats, then water 157 within the nominally vertical inertial water tube 152, 155, 161 tends to move up and down relative to the inertial water tube, often moving out of phase with the movements of the embodiment, thereby causing water to move 159 in and out of the inertial water tube's lower mouth 154, as well as causing the upper surface 160 of the water 157 within the inertial water tube to move up and down relative to the inertial water tube and relative to the inertial water tube's upper mouth 153. Occasionally, the upper surface 160 of the water 157 within the inertial water tube rises high enough that a portion of that water is ejected 162 from the upper mouth 153 of the inertial water tube 161, and is deposited within the embodiment's water reservoir 167, thereby tending to add to the volume of water within the water reservoir and tending to raise the upper surface 166 of that water.

While water is occasionally, and/or periodically, added to the embodiment's water reservoir 167 as a result of ejections 162 of water from the upper mouth 153 of the embodiment's inertial water tube 152, 155, 161, water within the water reservoir 167 also flows 168 into the embodiment's effluent pipe 169 through the effluent pipe's upper, proximal, internal, and/or inner mouth 172. Water flowing into and through the effluent pipe 169 engages, energizes, and/or rotates, a water turbine 171 positioned therein (whose runner, again, is not fully resolved in this figure, but should be understood to contain the typical features of a turbine runner, e.g. a Kaplan turbine runner), after which the effluent of the water turbine flows 170 back into the body of water 151 from which it was originally captured, through the effluent pipe's lower, distal, external, and/or outer mouth.

Movements in the upper surface 160 of the water 157 within the embodiment's inertial water tube, as well as changes in the volume of water within the embodiment's water reservoir 167, are facilitated by the ability of air to move 165 freely between the air pocket 163 above the water reservoir 167 and the atmosphere outside the embodiment.

Rotations of the water turbine 171, e.g., caused by the outflow of water 168, 170 through the effluent pipe 169, cause the water turbine's operably-connected turbine shaft 173 to rotate. And, rotations of the turbine shaft 173 transmit mechanical energy to the operably-connected generator 174 thereby causing that generator to produce electrical power. The electrical power (e.g., 3-phase alternating electrical power) produced by generator 174 is transmitted to a power conditioning module 175 through an electrically conductive cable (e.g., through three wires at 176). The conditioned power (e.g., approximately 220-volt direct-current electrical power), and/or set of conditioned powers (e.g., direct-current electrical power at 12, 5, and 3 volts), produced by the power conditioning module 175 is transmitted to an electrical load 177 through an electrically conductive cable (e.g., through two wires at 178).

The electrical load contains at least one and typically a plurality of digital circuit(s) that requires electrical power conforming to a relatively narrow range of voltages. The power conditioning module 175 transmits conditioned electrical power to the electrical load at one or more voltages that satisfy the requirements of the digital circuit.

In one embodiment, power conditioning module 175 includes an inverter in series with a buck converter, the combination being configured to: (1) convert AC electricity exhibiting a relatively high peak voltage to DC electricity exhibiting a relatively low peak voltage, and (2) maintain this DC electricity at a relatively constant DC voltage (e.g. 24 volts) regardless of the peak or root-mean-square voltage of the AC electricity.

Generator 174 can be a permanent magnet synchronous generator, an induction (asynchronous) generator, a wound rotor synchronous generator, etc., and/or any other mechanism, device, machine, and/or apparatus, that produces electrical energy in response to an input of mechanical energy from a shaft.

In one embodiment, power conditioning module 175 includes an inverter configured to monitor the bus voltage on the bus defined by the wires at 178 and alter its switching frequency and other operational characteristics to maintain a constant voltage at that bus.

A load manager 179 adjusts, alters, changes, controls, regulates, manipulates, and/or sets, various operational characteristics, attributes, behaviors, and/or parameters, of the electrical load 177 and/or the power conditioning module 175. The load manager can include a computer running software adapted for performing the above described functions, or it can include integrated circuits running firmware adapted for performing the above described functions.

The load manager sets operational characteristics of the electrical load and/or the power conditioning module by generating, altering, adjusting, and/or controlling, signals or attributes that can include, but are not limited to, the following:

- by adjusting, altering, changing, controlling, manipulating, and/or setting, reference voltages, e.g., to zero or ground, to +5 volts, and/or to other values;
- by adjusting, altering, changing, controlling, manipulating, and/or setting, the frequencies, voltages, and/or duty cycles, of pulse-width modulation signals;
- by adjusting, altering, changing, controlling, manipulating, and/or setting, the clock frequency and/or core voltage of a central-processing unit (CPU), graphics-processing unit (GPU), tensor-processing unit (TPU), application-specific integrated circuit (ASIC), and/or other digital circuit;
- by adjusting, altering, changing, controlling, manipulating, and/or setting, the amount and/or proportion of compute cycles that a digital circuit, e.g., a CPU, GPU, TPU, and/or ASIC, will spend processing "no-operation" or "no-op" commands, or will spend invoking or executing an "idle" thread;
- by adjusting, altering, changing, controlling, manipulating, and/or setting, the amount and/or proportion of compute cycles that a digital circuit, e.g., a CPU, GPU, TPU, and/or ASIC, will spend resetting the program counter to its last and/or a preset, specific, or constant, value (e.g., rather than advancing the program counter to allow program execution), thereby effectively stalling program execution at a particular part and/or point of a program's execution;
- by adjusting, altering, changing, controlling, manipulating, and/or setting, a control element of a linear voltage regulator;
- by adjusting, altering, changing, controlling, manipulating, and/or setting, a resistor's resistance in an active voltage regulator;
- by adjusting, altering, changing, controlling, manipulating, and/or setting, a switching frequency, switching pattern, and/or switching duty cycle, of one of a buck switching converter and a boost switching regulator;
- by adjusting, altering, changing, controlling, manipulating, and/or setting, a parameter, command, input value, setting, and/or signal, to a control circuit that controls the switching points manifested by a switching regulator; and/or
- by adjusting, altering, changing, controlling, manipulating, and/or setting, a parameter, command, input value, setting, and/or signal, to a microprocessor controlled variable transformer of a voltage stabilization circuit.

The embodiment's load manager 179 adjusts, alters, changes, regulates, controls, manipulates, and/or sets, various operational characteristics, attributes, behaviors, and/or parameters, of the electrical load 177 and/or the power conditioning module 175 in response to signals received from a set of sensors including, but not limited to, the following:

- a pressure sensor 180 that sends (via a cable, wire, conductor, optical fiber, and/or other connector indicated by the dashed line connecting the pressure sensor 180 to the load manager 179) to the load manager signals, digital data, analog values, voltages, currents, and/or other information, that allows the load manager to determine, or to at least estimate, the pressure felt by sensor 180 and/or the depth of the sensor 180 below the surface 166 of the water within the water reservoir 167;

an rpm (rate of rotation) sensor 181 that sends (via a cable, wire, conductor, optical fiber, and/or other connector indicated by the dashed line connecting the torque and rpm sensor 181 to the load manager 179) to the load manager signals, digital data, analog values, voltages, currents, and/or other information, that allows the load manager to determine, or to at least estimate, at least one of the rate at which the turbine shaft 173 is rotating and the torque under which it is being rotated, e.g., the resistive torque imparted to the turbine shaft by the generator 174;

a voltage and/or current sensor 178 that sends (via a cable, wire, conductor, optical fiber, and/or other connector indicated by the dashed line connecting the voltage and current sensor 178 to the load manager 179) to the load manager signals, digital data, analog values, voltages, currents, and/or other information, that allows the load manager to determine, or to at least estimate, the amount of electrical power being transmitted to, and/or consumed by, the electrical load 177, the voltage across the wires at 178 through which the electrical load receives electrical power from the power conditioning module 175, and/or the amount of current flowing through the wires at 178 through which the electrical load receives electrical power from the power conditioning module;

a temperature and vibration sensor 182 that sends (via a cable, wire, conductor, optical fiber, and/or other connector indicated by the dashed line connecting the temperature and vibration sensor 182 to the load manager 179) to the load manager signals, digital data, analog values, voltages, currents, and/or other information, that allows the load manager to determine, or to at least estimate, the temperature, vibrations, and/or other information indicative of the operational condition and/or state of the power conditioning module 175, e.g., if the power conditioning module is overheating;

a temperature and vibration sensor 183 that sends (via a cable, wire, conductor, optical fiber, and/or other connector indicated by the dashed line connecting the temperature and vibration sensor 183 to the load manager 179) to the load manager signals, digital data, analog values, voltages, currents, and/or other information, that allows the load manager to determine, or to at least estimate, the temperature, vibrations, and/or other information indicative of the operational condition and/or state of the electrical load 177, e.g., if the electrical load is overheating, and/or if constituent parts of the electrical load (if the electrical load is comprised of differentiated and/or independently controlled circuits) are overheating;

an accelerometer, gyroscope, and compass sensor 184 that sends to the load manager signals, digital data, analog values, voltages, currents, and/or other information, that allows the load manager to determine, or to at least estimate, the movements and orientation of the embodiment, as well as to estimate the height and periods of the waves that drive the embodiment; and, a radio transceiver (transmitter and receiver) 185 that sends (via a cable, wire, conductor, optical fiber, and/or other connector indicated by the dashed line connecting the radio transceiver 185 to the load manager 179) to the load manager electromagnetic, electrical, analog, and/or digitized signals that it receives from remote transmitters, e.g., from a satellite, and that receives from the load manager electromagnetic, electrical, analog, and/or digitized signals, encoding data that it transmits to a remote receiver, e.g., a satellite, specified by the load manager, e.g., at a frequency specified by the load manager.

An embodiment similar to the one illustrated in FIGS. 3-5, comprises, includes, incorporates, and/or utilizes, a machine-learning circuit within its load manager 179 in order to more rapidly and/or more accurately adjust its respective electrical load 177 and/or power conditioning module 175 in response to: a changing wave environment; changing power needs of the electrical load (e.g., while executing a complex computational task); changing characteristics of wave motions detected by the load manager's accelerometer; information the load manager receives from a remote transmitter via the radio transceiver 185 about the immediate and anticipated wave climates to which the embodiment will be subjected; etc.

An embodiment similar to the one illustrated in FIGS. 3-5, comprises, includes, incorporates, and/or utilizes, an artificial-intelligence circuit within its load manager 179 in order to more rapidly and/or more accurately adjust its respective electrical load 177 and/or power conditioning module 175.

An embodiment similar to the one illustrated in FIGS. 3-5, comprises, includes, incorporates, and/or utilizes, within its load manager 179 a lookup table, in which it logs current sensor readings and/or other data available to it as well as its alterations to the electrical load 177 and/or to the power conditioning module 175, and then matches current sensor readings and/or other data to past entries within the lookup table in order to evaluate and/or predict the possible effects, outcomes, results, and/or consequences, of each potential alteration to the electrical load and/or to the power conditioning module, thereby enabling the load manager to select and/or customize a set of alterations most likely to achieve a desirable, advantageous, and/or useful outcome and/or result.

An embodiment similar to the one illustrated in FIGS. 3-5, comprises, includes, incorporates, and/or utilizes, within its load manager 179 a pre-populated lookup table, whereby it matches current sensor readings and/or other data to pre-populated entries within the lookup table in order to evaluate and/or predict the possible effects, outcomes, results, and/or consequences, of each potential alteration to the electrical load and/or to the power conditioning module, thereby enabling the load manager to select and/or customize a set of alterations most likely to achieve a desirable, advantageous, and/or useful outcome and/or result.

Embodiments similar to the one illustrated in FIGS. 3-5, comprise, include, incorporate, and/or utilize, a variety of power conditioning modules 175, power conditioning circuits, power conditioning technologies, power converter types (e.g., buck and boost), etc. The scope of the present disclosure includes embodiments comprising, including, incorporating, and/or utilizing, any and all types, varieties, designs, and categories of power conditioning modules.

Embodiments similar to the one illustrated in FIGS. 3-5, comprise, include, incorporate, and/or utilize, a variety of generators and types of generators 174, including, but not limited to: permanent-magnet synchronous generators, alternators, and homopolar generators. The scope of the present disclosure includes embodiments comprising, including, incorporating, and/or utilizing, any and all types, varieties, designs, and categories of generators.

Embodiments similar to the one illustrated in FIGS. 3-5, comprise, include, incorporate, and/or utilize, a variety of water turbines and types of water turbines 171, including, but not limited to: Kaplan turbines, Francis turbines, axial-flow turbines, and cross-axial flow turbines. The scope of the present disclosure includes embodiments comprising, including, incorporating, and/or utilizing, any and all types, varieties, designs, and categories of water turbines.

An embodiment similar to the one illustrated in FIGS. 3-5, comprises, includes, incorporates, and/or utilizes, two effluent pipes 169, each with a respective water turbine 171, a respective turbine shaft 173, a respective generator 174, a respective power conditioning module 175, a respective electrical load 177, and a respective load manager 179. However, this embodiment also includes a navigation manager which controls, adjusts, alters, manipulates, and/or overrides (when needed), both load managers such that the rate of water effluence out of each of the two effluent pipes is made different thereby creating a differential rate of effluence between the effluent pipes. This embodiment's two effluent pipes are configured so as to provide the embodiment with parallel (e.g., forward) thrust when their respective rates of effluence are equal, and to cause the embodiment to turn and/or be steered by the embodiment when the respective rates of effluence of the two effluent pipes are not equal.

Figure 6:
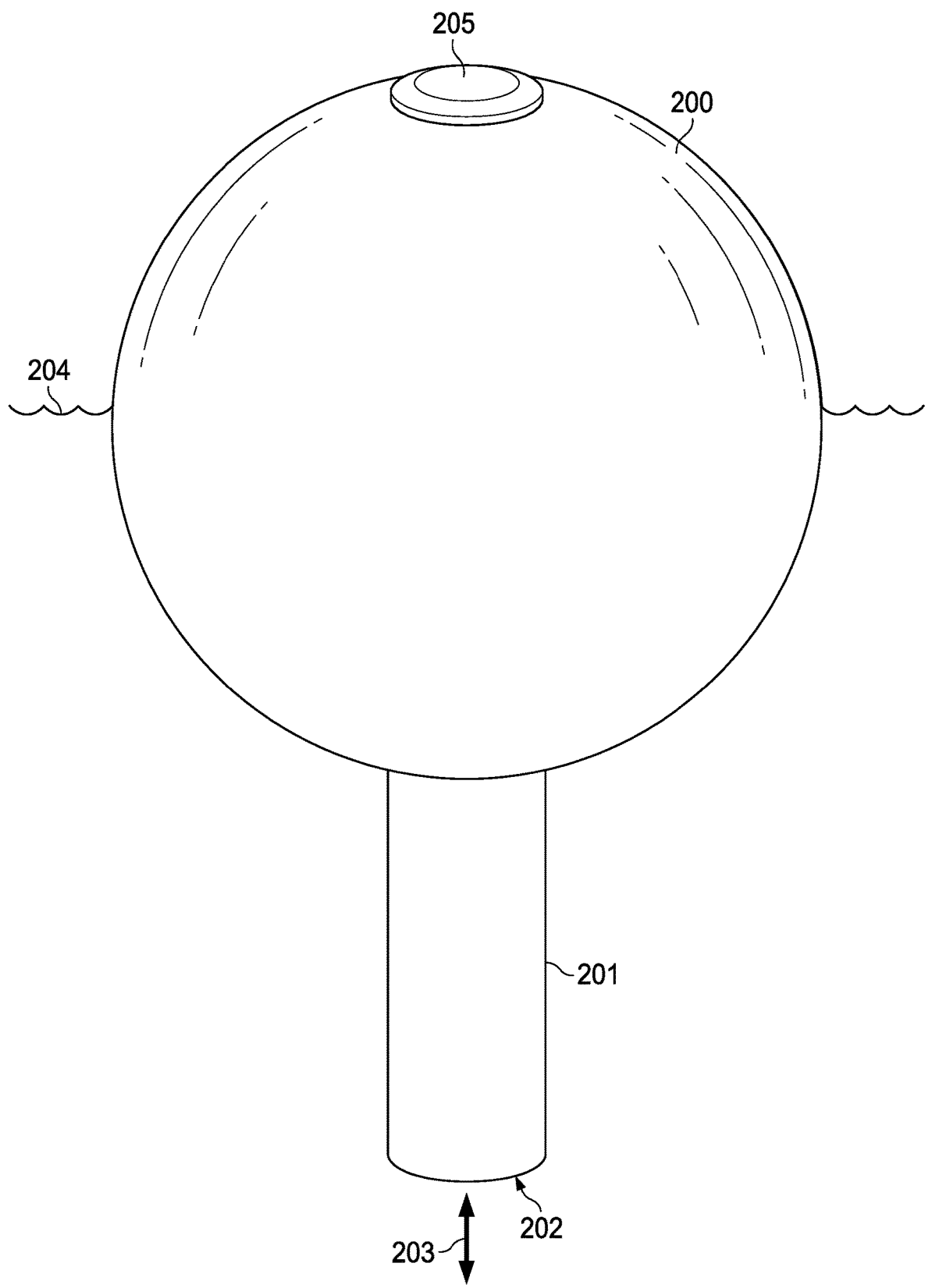
FIG. 6 is a perspective view of a third embodiment of the present invention.

FIG. 6 shows a side perspective view of an embodiment of the present disclosure. This embodiment is similar in many respects to the one illustrated in FIGS. 3-5. Unlike the embodiment illustrated in FIGS. 3-5, the embodiment illustrated in FIGS. 6-13 has no aperture (164 in FIGS. 3-5) in its upper most hull or wall which would allow air to move freely between the interior of the embodiment, e.g., between the embodiment's air pocket, and the atmosphere outside the embodiment. The air pocket within the embodiment illustrated in FIGS. 6-13 is trapped within the interior of the embodiment and is nominally pressurized to a pressure greater than that of the atmosphere outside the embodiment, to provide the motive force responsible for driving water through the turbines. And, unlike the embodiment illustrated in FIGS. 3-5, the embodiment illustrated in FIGS. 6-13 has two effluent pipes (not visible) instead of one. The pair of effluent pipes in the embodiment illustrated in FIGS. 6-13 allow this embodiment to turn as well as propel itself forward, using effluent from said effluent pipes to provide such thrust, thereby facilitating its ability to steer a course and self-navigate.

The embodiment illustrated in FIG. 6 comprises a nominally upper approximately spherical hollow buoy portion 200 and a fluidly connected nominally lower approximately cylindrical hollow tubular water-tube portion 201 characterized by a water-tube mouth 202 or aperture at its bottommost end through which water flows 203 into and out from the interior of the water tube 201.

The embodiment 200 floats adjacent to an upper surface 204 of a body of water over which waves pass. Attached and/or connected to an upper portion of the embodiment's buoy 200 is a radio and/or electromagnetic communications module, array, and/or antenna 205. In an embodiment of the present disclosure similar to the one illustrated in FIGS. 6-13, antenna 205 is a phased array antenna.

Figure 7:
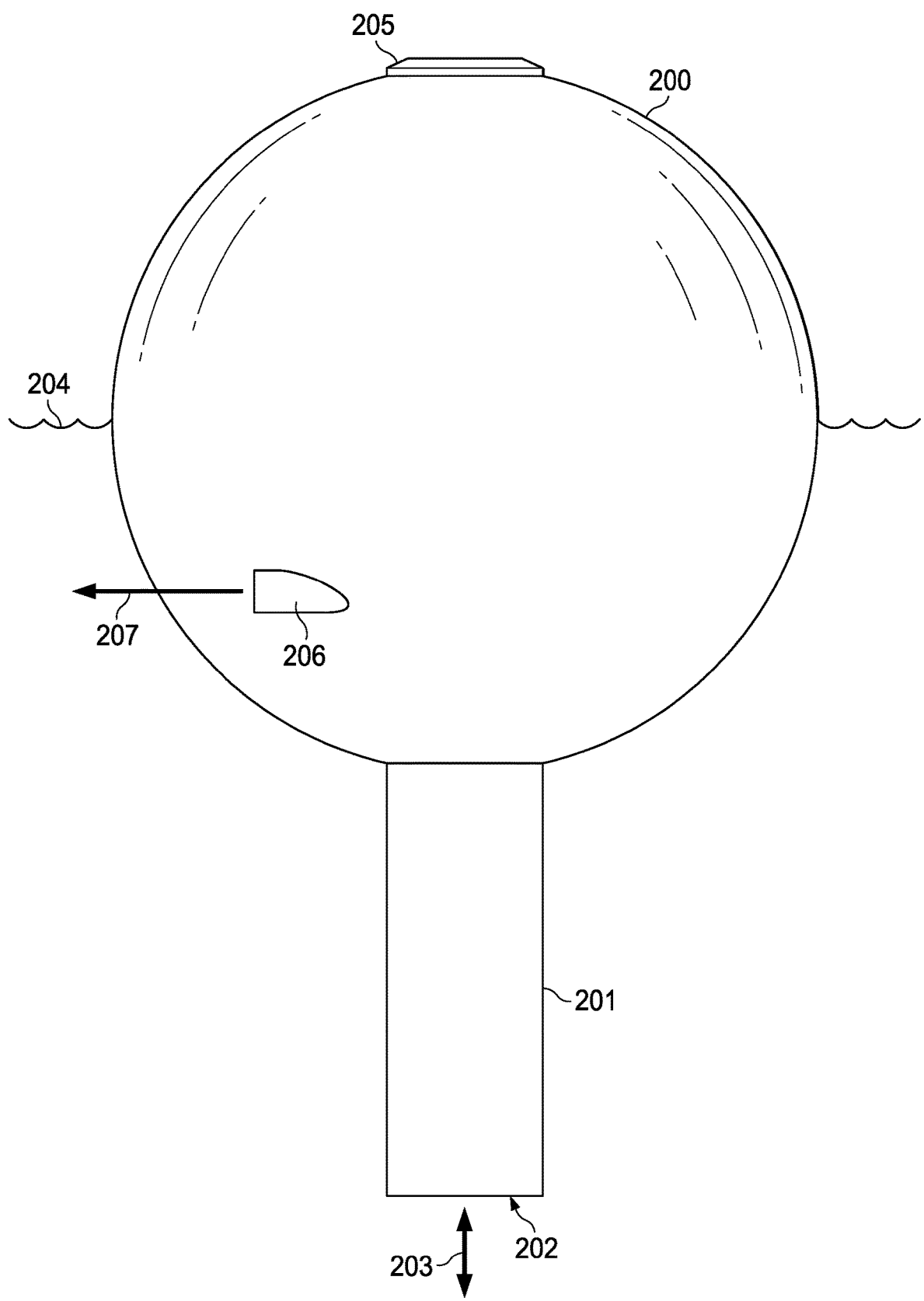
FIG. 7 is a side view of the embodiment of FIG. 6.

FIG. 7 shows a right and/or starboard side view of the same embodiment of the present disclosure that is illustrated in FIG. 6. Unlike the embodiment illustrated in FIGS. 3-5, the embodiment illustrated in FIGS. 6 and 7 incorporates, utilizes, and/or includes, two effluent pipes (one of which is visible in FIG. 7) and two respective water turbines (not visible) positioned within those respective effluent pipes. Shown in FIG. 7 is the distal and/or external end of one 206 of the embodiment's pair of effluent pipes and water is flowing 207 out of the effluent pipe and into the body of water 204 on which the embodiment floats—thereby tending to generate a propulsive thrust which tends to move the embodiment 200 to the right (with respect to the embodiment orientation illustrated in FIG. 7).

Figure 8:
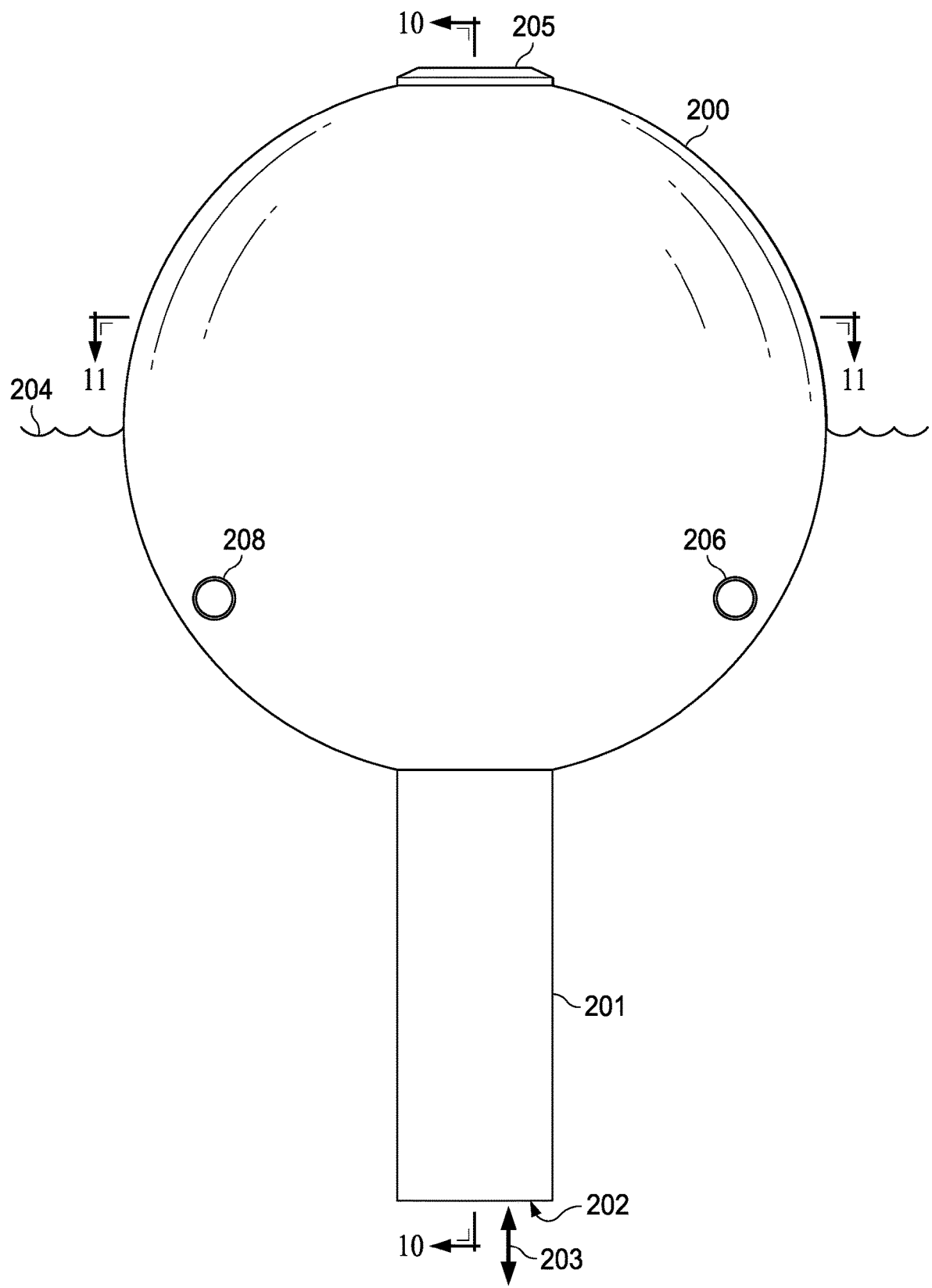
FIG. 8 is another side view of the embodiment of FIG. 6.

FIG. 8 shows a back and/or aft side view of the same embodiment of the present disclosure that is illustrated in FIGS. 6 and 7. Both of the embodiment's effluent pipes 206 and 208 are visible in the illustration. Water flowing out of the pair of effluent pipes at equal rates of flow will tend to propel the embodiment forward (i.e., into the page with respect to the embodiment orientation illustrated in FIG. 8). However, because each effluent pipe applies a force that is at least partially tangential to, and/or laterally offset from, the embodiment's nominally vertical longitudinal axis of approximate radial symmetry (i.e., a vertical line at the center of the embodiment illustration of FIG. 8, and creating bilateral symmetry with respect to that illustration), an unequal rate of flow out of the pair of effluent pipes will tend to create a turning torque which will tend to cause the embodiment to rotate about its approximately vertical longitudinal axis of approximate radial symmetry. The regulation, alteration, control, and/or manipulation of the relative rates at which water flows out of effluent pipes and/or tubes 206 and 208 allows the embodiment to steer itself (by utilizing unequal rates of flow) and to propel itself forward (typically by utilizing approximately equal rates of flow).

Figure 9:
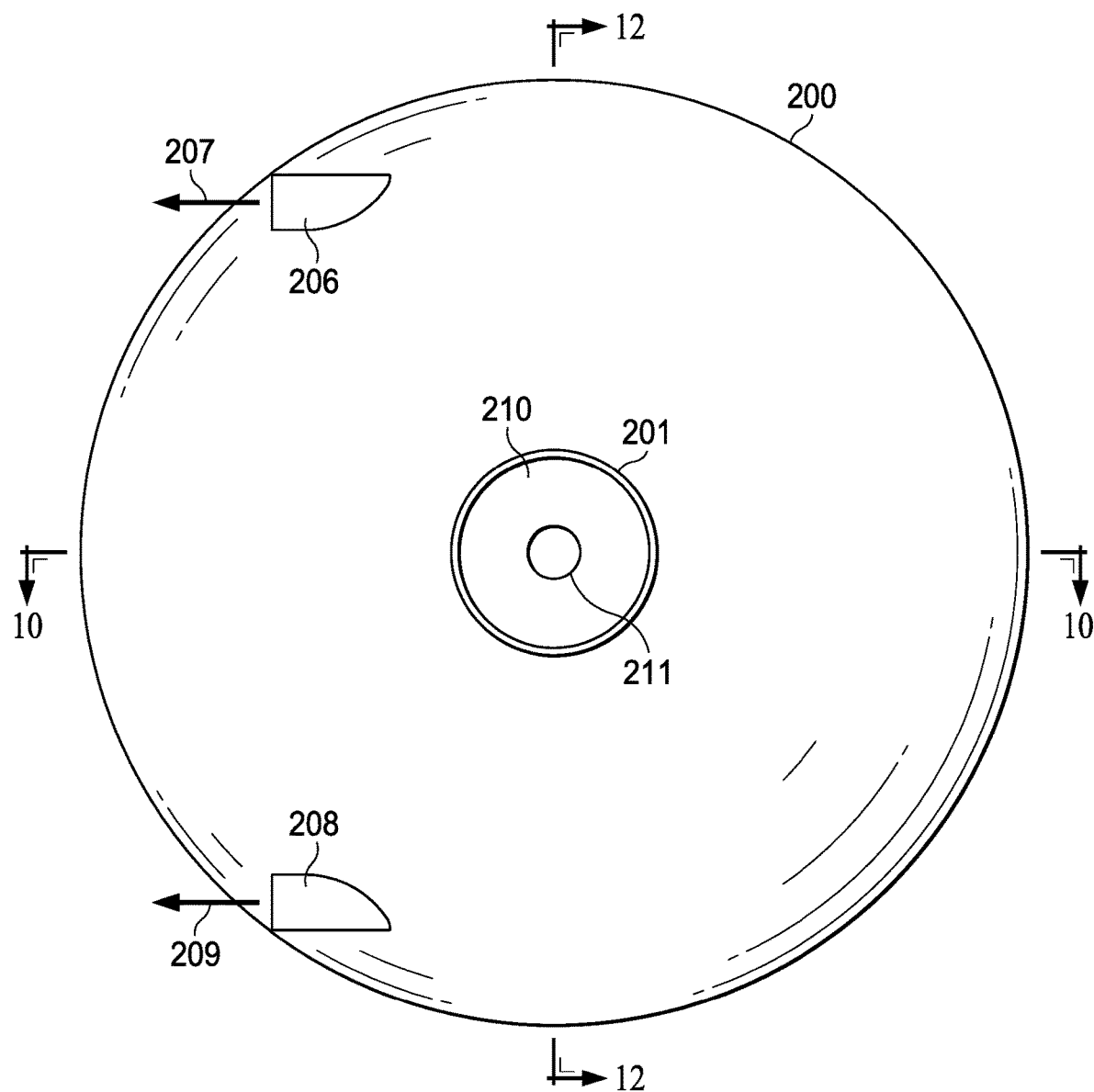
FIG. 9 is a bottom-up view of the embodiment of FIG. 6.

FIG. 9 shows a bottom-up view of the same embodiment of the present disclosure that is illustrated in FIGS. 6-8. The approximately equivalent outflows 207 and 209 of water illustrated in FIG. 9 would tend to NOT impart a turning torque to the embodiment 200 and would instead tend to propel the embodiment along a linear course to the right (with respect to the embodiment orientation illustrated in FIG. 9). The embodiment's inertial water tube 201 includes, incorporates, and/or utilizes, a constriction 210, and at the uppermost (and/or with respect to the embodiment orientation illustrated in FIG. 9, the distal) end of the inertial water tube 201 is an upper mouth 211 through which water is periodically and/or occasionally ejected from the inertial water tube as a result of wave-induced oscillations of the water constrained within the inertial water tube. Water so ejected tends to be captured, trapped, collected, and/or accumulated, within a hollow interior of the upper 200, bulbous and/or approximately spherical portion of the embodiment.

Figure 10:
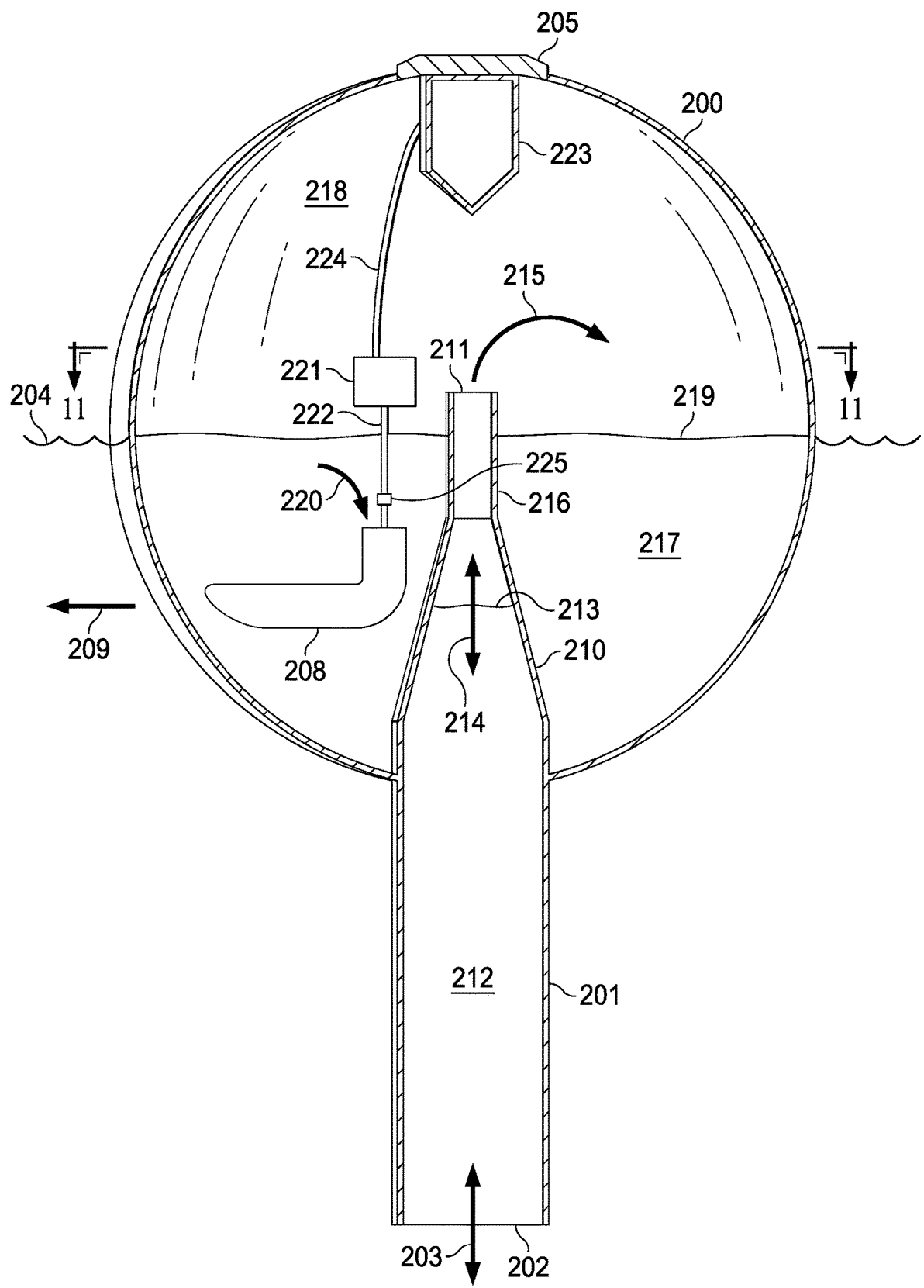
FIG. 10 is a perspective side sectional view of the embodiment of FIG. 6.

FIG. 10 shows a side sectional view of the same embodiment of the current disclosure that is illustrated in FIGS. 6-9, where the section is taken along the section line 10-10 as specified in FIGS. 8 and 9. As the embodiment 200 moves up and down at the surface 204 of the body of water on which it floats, water is free to flow 203 into and out of the bottommost mouth 202 of the embodiment's inertial water tube 201 thereby permitting and/or facilitating the approximately longitudinal and/or vertical oscillation of the water 212 within the inertial water tube. A bottommost portion 201, section, part, and/or end of the inertial water tube 201 is approximately cylindrical and has an approximately constant cross-sectional area. However, a medial portion 210, section, and/or part of the inertial water tube is constricted and becomes more narrow with respect to upwelling, up flowing, and/or upward-moving, water 212. An uppermost portion 216, section, part, and/or end, of the inertial water tube is similar to the bottommost cylindrical portion 201 in that it is also approximately cylindrical and also has an approximately constant cross-sectional area. However, the cross-sectional area of the uppermost cylindrical portion 216 is smaller and/or lesser than the cross-sectional area of the bottommost cylindrical portion 201 due to the narrowing of the inertial water tube within the medial section 210.

As the water 212 within the inertial water tube 201 oscillates up and down, an upper surface 213 of that water 212 moves 214 up and down. As it oscillates, the water 212 within the inertial water tube, and an upper surface 213 of that water, periodically moves upward and toward the upper mouth 211 of the inertial water tube. And, as it does so, the water tends to collide with the narrowing surface, and/or diminishing cross-sectional area, of the constricted portion 210 of the inertial water tube. Occasionally and/or periodically, the water that so rises within the inertial water tube does so with enough energy, momentum, force, and/or speed, that its collision with, and/or passage through, the constricted portion 210 of the inertial water tube results in a portion of that water 212 being ejected 215 from an upper mouth 211 of the inertial water tube. Such ejected water 215 tends to be captured by, trapped within, and/or added to, the water reservoir 217 located in a bottommost portion of the embodiment's hollow buoy 200.

Trapped, contained, and/or sealed above the water reservoir 217 within the hollow buoy 200 is a pocket 218 of compressed gas, e.g., air. When water 215 is ejected from the upper mouth 211 of the inertial water tube 216, that water falls onto the surface 219 of the water reservoir 217 and is thus added to the water within the water reservoir, thereby tending to increase the volume of that water. Such increases in the volume of the water reservoir 217 are offset through a reduction in the volume of the air within the air pocket 218 above the water reservoir and a concomitant increase in the pressure of the air within that air pocket. Conversely, when water flows 220 into, through, and out of 209 the embodiment's effluent pipes, e.g., 208, the volume of the water reservoir 217 tends to decrease, which tends to result in a concomitant increase in the volume of the air pocket 218 and a concomitant decrease in the pressure of the air within that air pocket.

The illustrated device has many elements in common with a hydraulic accumulator, e.g., it pumps a fluid (seawater) into a chamber where the added fluid increases the pressure of a gas trapped therein. The potential energy of the compressed gas is then released when the fluid is discharged from the chamber, in this case through a water turbine (not visible inside effluent pipe 208). Thus, a portion of the energy of water injected by the inertial water tube 216 into the water reservoir 217 of the hollow buoy of the embodiment 200 is subsequently captured by the embodiment's water turbines as that water flows out of the water reservoir under pressure, and a portion of that water-turbine captured energy is converted into electrical power by a water-turbine-specific generator, e.g., 221, operably connected to its respective water turbine by a respective turbine shaft, e.g., 222.

A portion of the electrical power generated by each of the embodiment's two generators, e.g., 221, is transmitted to the embodiment's electrical processing module 223 by generator-specific energy transmission cables, e.g., 224. Each energy transmission cable includes electrical conductors, and transmits energy from a respective generator, e.g., 221, to the embodiment's electrical processing module 223 as electrical power, voltage, and/or current. The electrical processing module 223 monitors, tracks, detects, and/or measures, the rotational speed and torque of each turbine shaft, e.g., 222, through the signals, readings, and/or data, provided by turbine-shaft-specific sensors, e.g., 225, operably connected to each turbine shaft 222.

Figure 11:
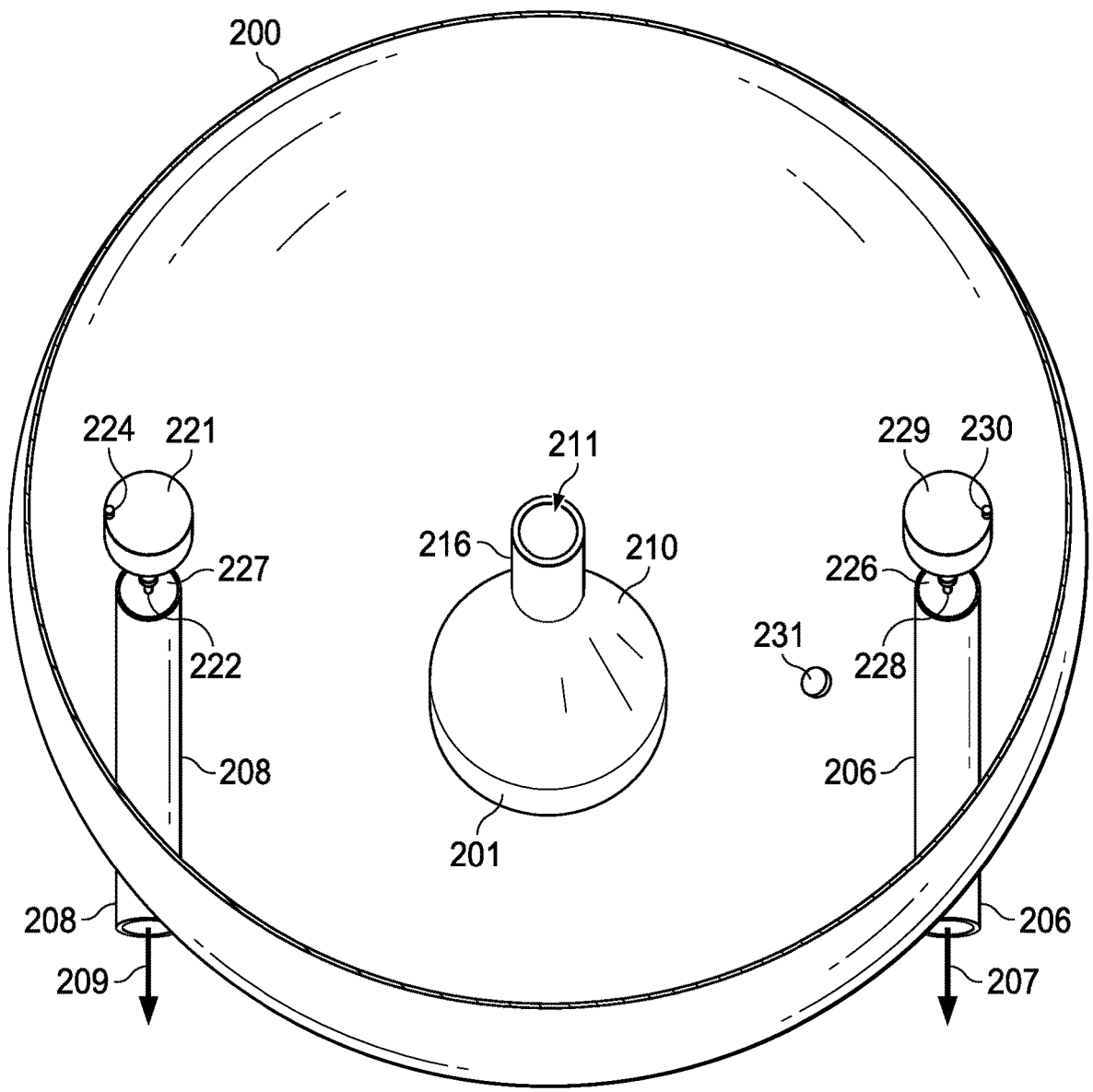
FIG. 11 is a perspective top-down sectional view of the embodiment of FIG. 6.

FIG. 11 shows a top-down sectional view of the same embodiment of the current disclosure that is illustrated in FIGS. 6-10, wherein the section is taken along the section line 11-11 specified in FIGS. 8 and 10. In response to wave-induced oscillations of water entrained, constrained, contained, and/or flowing within, its hollow open-ended inertial water tube 201, water is periodically, and/or occasionally, ejected 215 from the upper mouth 211 of the cylindrical upper portion 216 of the inertial water tube, at least in part due to an increase in the speed and/or kinetic energy of an upper portion of the water flowing upward within the inertial water tube that results from the collision of that water with the constricting, narrowing, and/or frustoconical walls, surfaces, and/or diminishing cross-sectional areas characteristic of the middle portion 210 of the inertial water tube. Such ejected water is added to the water reservoir (217 in FIG. 10) that is positioned, and/or accumulates in, a lowermost portion of the hollow interior of the hollow buoy 200.

Water within the embodiment's water reservoir (217 in FIG. 10) is pressurized, at least in part, due to the pressure of the gas, e.g., air, also trapped within the buoy 200 within an air pocket (218 in FIG. 10) at an uppermost portion of the hollow interior of the buoy 200. A portion of the pressurized water within the embodiment's water reservoir (217 in FIG. 10) tends to flow 207 and 209 out of the buoy through either of two respective effluent pipes, 206 and 208, and through respective water turbines 226 and 227 therein. (Note that the illustrated water turbines do not include illustrations of the blades thereof. However, the illustrated water-turbine "disks" are intended to represent water turbines, such as Kaplan and/or propeller turbines.)

Water flowing out of the buoy 200 and through the water turbines 226 and 227 tends to impart energy, e.g., rotational kinetic energy, to those water turbines, which, in turn, impart portions of that rotational kinetic energy to respective turbine shafts 228 and 222. Energetic rotations of the turbine shafts 228 and 222 tend to energize respective generators 229 and 221 which are operably connected to respective turbine shafts 228 and 222, and therethrough to respective water turbines 226 and 227. The energized generators 229 and 221 tend to produce electrical power which is transmitted to the embodiment's electrical processing module (223 in FIG. 10) via respective energy transmission cables 230 and 224.

Attached to a lower portion of an interior surface of the hollow buoy 200, e.g., which would nominally be submerged beneath the embodiment's water reservoir (217 in FIG. 10) is a sensor 231 that monitors, tracks, detects, and/or measures, the pressure and temperature of the water, or of a portion of the water proximate to the sensor, within the water reservoir, and transmits to the embodiment's electrical processing module (223 in FIG. 10) signals, readings, and/or data, generated, produced, and/or emitted by the sensor.

Figure 12:
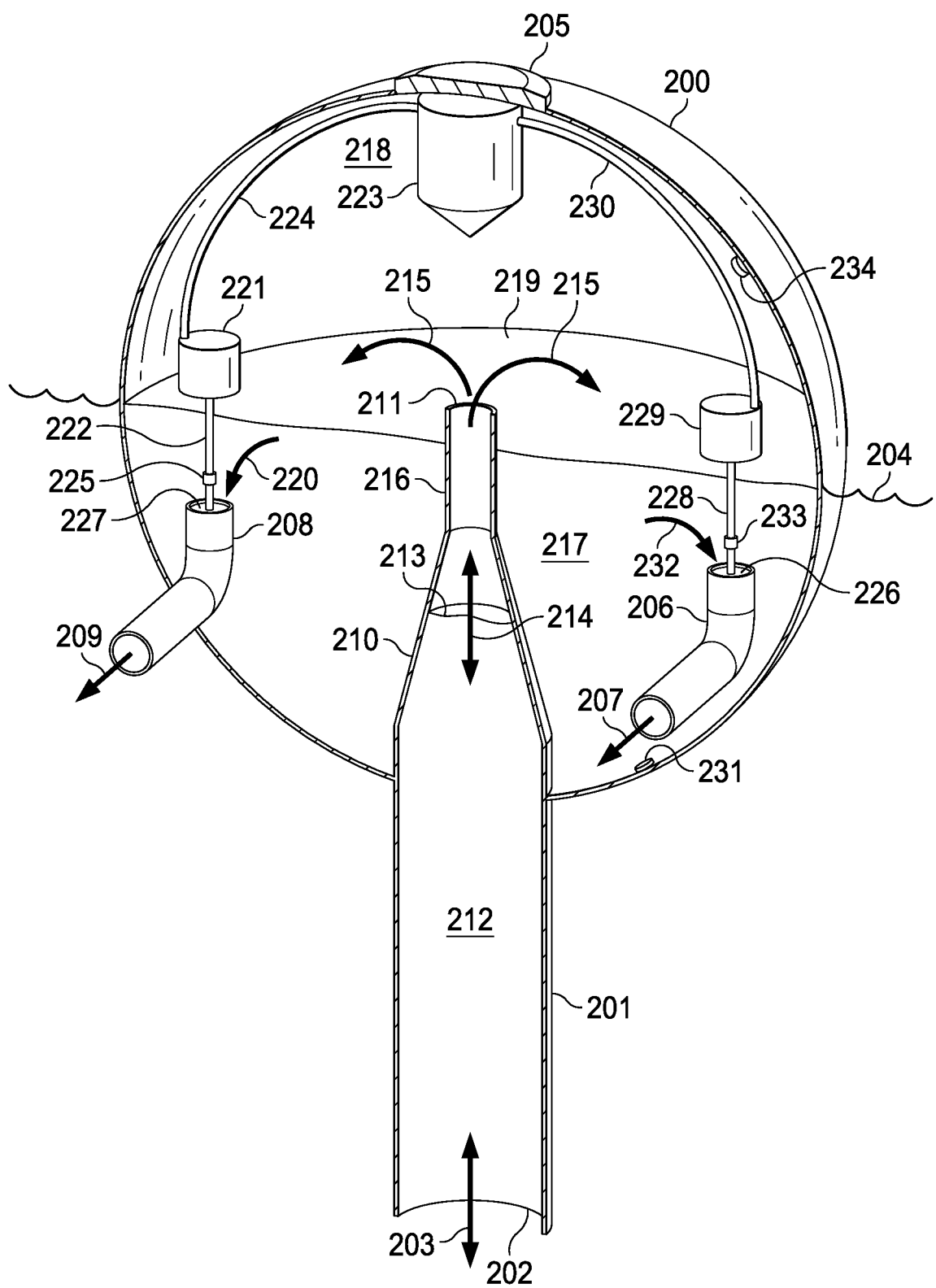
FIG. 12 is a perspective side sectional view of the embodiment of FIG. 6.

FIG. 12 shows a side sectional view of the same embodiment of the current disclosure that is illustrated in FIGS. 6-11, wherein the section is taken along the section line 12-12 specified in FIG. 9. In the sectional view illustrated in FIG. 12, the section has been limited to the hollow buoy 200, the inertial water tube 201, 210, 216, and the radio antenna 205. The other components, e.g., the effluent tubes 206 and 208, the water turbines 226 and 227, the turbine shafts 228 and 222, the generators 229 and 221, the energy transmission cables 230 and 224, and the electrical processing module 223, have not been sectioned in order to facilitate the description of the embodiment's structure and operation which are provided below.

As the embodiment moves up and down, in response to waves passing across the surface 204 of the body of water on which the embodiment floats, water 212 within the embodiment's inertial water tube 201, 210, 216 moves 214 up and down as does an upper surface 213 of that water. An upward flow of water rising through the inertial water tube is partially obstructed by a constricted portion 210 of the inertial water tube. The constriction tends to increase the upward speed of the water's upward flow, occasionally and/or periodically increasing the water's speed sufficiently to cause a portion of that water to escape 215, flow out of, and/or be ejected by, the upper mouth, aperture, and/or orifice 211 of the inertial water tube. Water so escaped tends to be added to the water reservoir 217 nominally located at a bottom portion of the interior of the hollow buoy 200. Each addition of water to the water reservoir tends to increase the volume of the water reservoir while decreasing the volume of the complementary air pocket 218 nominally above the water reservoir. Such decreases in the volume of the air pocket tend to cause the pressure of the air, or other gas, therein to increase. Increases in the pressure of the embodiment's air pocket 218 tends to have two effects on the operation of the embodiment.

Firstly, increases in the pressure of the embodiment's air pocket 218 tends to cause water to more rapidly flow 232 and 220 into the interior and/or proximal mouth, aperture, and/or orifice of each of the embodiment's respective effluent pipes 206 and 208, thereafter flowing through the respective water turbines 226 and 227, and then flowing 207 and 209 out of the exterior and/or distal mouth, aperture, and/or orifice of each of the embodiment's respective effluent pipes. The more rapid flow of water through the water turbines will tend to increase the energy imparted to them by the flow, tending to result in the generation of greater amounts of electrical power.

Secondly, increases in the pressure of the embodiment's air pocket 218 tends to cause the air within the air pocket to push down more forcefully against the upper surface 213 of the water 212 within the inertial water tube 201, 210, 216 thereby causing the resting, average, and/or nominal level of that upper surface to move downward and/or to move away from the upper mouth 211 of the inertial water tube 216. With respect to waves of a given energy, period, and/or height, the frequency and/or rates at which water is ejected from the upper mouth 211 of the inertial water tube will tend to decrease as the upper surface 213 of the water 212 within the inertial water tube 201, 210, 216 moves away (on average) from the upper mouth.

By contrast, if water 217 from the water reservoir flows out 207 and 209 more quickly than water is ejected from the upper mouth 211 of the inertial water tube 216 to replace it, then the volume of the water reservoir will tend to decrease, and the pressure of the gas within the air pocket 218 will tend to decrease. Decreases in the pressure of the embodiment's air pocket 218 will, in contrast to the effects of increases in the pressure of the air pocket, tend to have two alternate, contrary, and/or opposing effects on the operation of the embodiment. Firstly, the rate at which water flows 207 and 209 out of the embodiment will tend to decrease, as will the energy extracted by the respective water turbines 226 and 227, and the electrical power generated by the respective generators, in response to the slowed flow. Secondly, the reduced gas pressure will tend to result in an elevation, and/or a raising, of the resting, average, and/or nominal level of the upper surface 213 of the water within the inertial water tube 216, thereby tending to bring that surface closer to the upper mouth 211 of the inertial water tube. As a result of its increased proximity to the upper mouth 211 of the inertial water tube, oscillations of water 212 within the inertial water tube (with respect to waves of a given energy, period, and/or height) will tend to more often result in ejections of water from that upper mouth, and/or in the ejection of water from the upper mouth at a greater average rate of flow.

Because of these two behavioral consequences, reactions, and/or effects, that result from changes in the volume of the water reservoir 217, and the correlated changes in the pressure of the gas within the air pocket 218, the embodiment tends to enjoy a natural stability, and to naturally moderate its capture of water from the inertial water tube, and its capture of energy from the waves responsible for the embodiment's movement. As the energy of the waves impinging upon the embodiment increases, the rate at which water flows out of the water reservoir increases, as does the amount of energy produced by the generators. As the energy of the waves impinging upon the embodiment decreases, the rate at which water flows out of the water reservoir decreases, as does the amount of energy produced by the generators.

At least a portion of the energy transmitted by the generators 229 and 221 to the electrical processing module 223 through the respective energy transmission cables 230 and 224 is consumed by and/or within the electrical processing module. Sensor 231 generates, and transmits to the electrical processing module 223, signals, readings, and/or data, which permit the electrical processing module, and/or subsystems therein, to determine the pressure and temperature of the water, or at least of a portion of the water, within the embodiment's water reservoir 217. Sensor 234 generates, and transmits to the electrical processing module 223, signals, readings, and/or data, which permit the electrical processing module, and/or subsystems therein, to determine the pressure and temperature of the gas, e.g., air, or at least of a portion of the gas, within the embodiment's air pocket 218. Each turbine shaft 228 and 222 is operably connected to a respective sensor 233 and 225 that generates, and transmits to the electrical processing module 223, signals, readings, and/or data, which permit the electrical processing module, and/or subsystems therein, to determine the rotational speed, rpm, and torque, of the respective turbine shafts.

Figure 13:
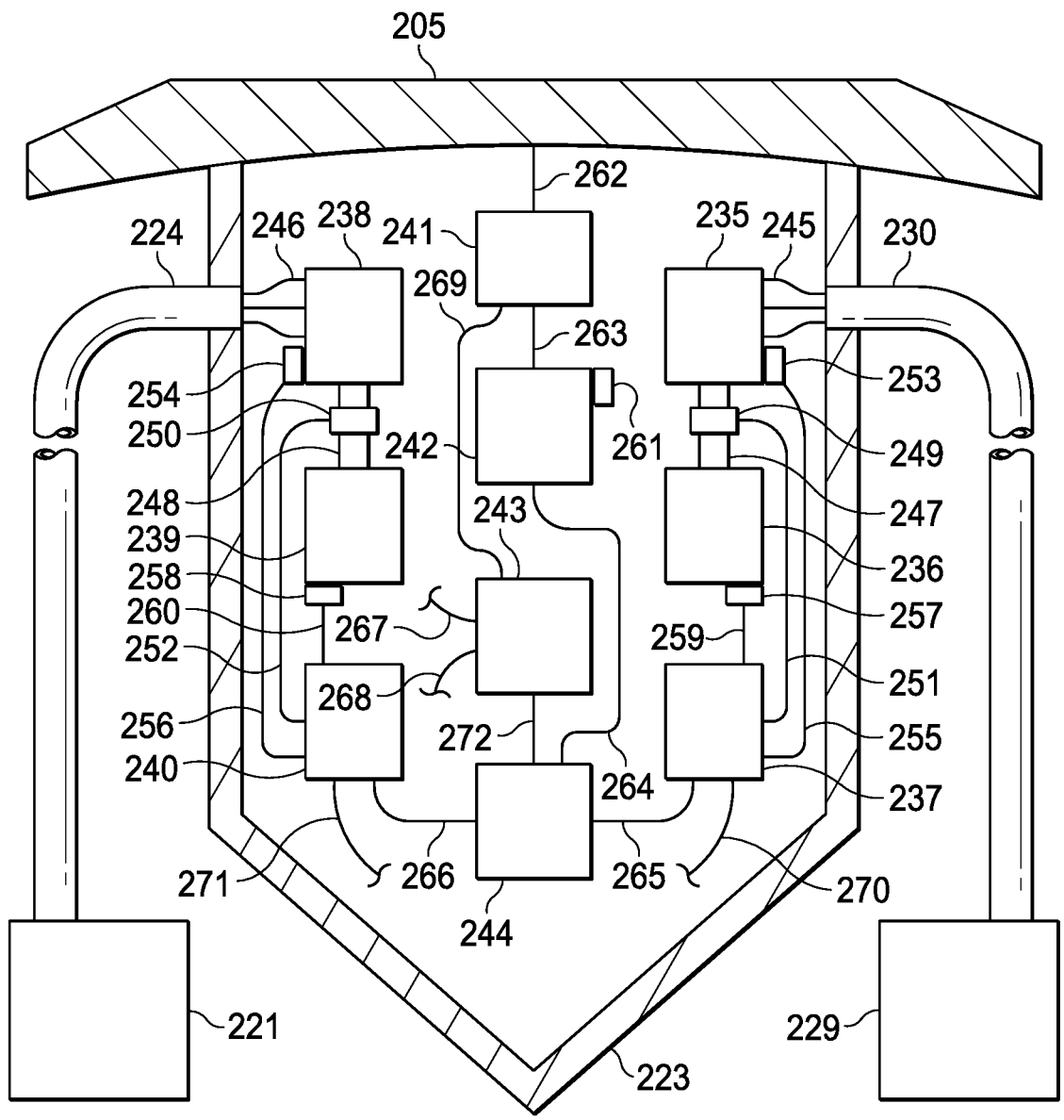
FIG. 13 is a side sectional view of the electrical processing module of the embodiment of FIG. 6.

FIG. 13 shows a close-up side sectional view of the energy generating and consumption portion of the same embodiment of the current disclosure that is illustrated in FIGS. 6-12, where the section is taken along the section line 12-12 specified in FIG. 9. In the sectional view illustrated in FIG. 12, the section has been limited to the electrical processing module 223, the radio antenna 205, the two energy transmission cables 230 and 224, and their respective generators 229 and 221.

In the illustration provided in FIG. 13, some, but not necessarily all, of the components, circuits, modules, and/or subsystems comprising the electrical processing module (223 in FIGS. 10 and 12) have been expanded in a schematic fashion so as to better illustrate their interconnections and operation. The modules 235-244 illustrated in FIG. 13 are found, positioned, and/or incorporated, within the electrical processing module 223. However, these modules, and their interconnections, are expanded in the illustration of FIG. 13 so as to clarify their role in the combined electrical circuit(s) that characterize(s) the electrical processing module. Also shown and/or referenced in FIG. 13 are a variety of sensors, and corresponding electrical, optical, data, signal, and/or communication cables and/or wires. All of the cables and/or wires illustrated within FIG. 13 are represented as solid lines (unlike the case with FIGS. 2 and 5, where dashed lines represented cables and/or wires primarily transmitting control and/or sensor signals, and solid lines represented cables and/or wires primarily transmitting electrical energy and/or power). Neither do the lines in FIG. 13 utilize arrows to indicate the primary direction and/or recipient of each control and/or sensor signal.

As explained in reference to FIGS. 10-12, water flows out of the water reservoir (217 in FIGS. 10 and 12) positioned within the embodiment's hollow buoy (200 in FIGS. 10-12) through effluent pipes (206 and 208 in FIG. 12) and the water turbines (226 and 227 in FIG. 12) positioned therein. The flow-induced rotations of those water turbines tend to cause those water turbines to rotate, thereby also causing each water turbine's respective turbine shaft (228 and 222 in FIG. 12) to rotate. The rotations of the turbine shafts transmit rotational kinetic energy to each turbine shaft's respective operably connected generator (229 and 221 in FIGS. 12 and 13), thereby tending to cause those generators to produce electrical power. The generators 229 and 221 of the illustrated embodiment are three-phase generators which produce three-phase alternating current electrical power, at least a portion of which is transmitted by each generator to the electrical processing module 223 via and/or through respective energy transmission cables 230 and 224. Each energy transmission cable of the illustrated embodiment contains three electrically isolated component energy transmission cables, e.g., 245 and 246.

Electrical power transmitted by the generators to the electrical processing module 223 via and/or through respective energy transmission cables 230 and 224 is received by respective power conditioning modules 235 and 238 via three separate cable-specific and/or cable-component electrical conductors, e.g., 245 and 246. The power conditioning modules tend to alter the voltage, frequency, current, and/or other attributes and/or characteristics of the "raw" electrical power produced by the generators 229 and 221 and received by the respective power conditioning modules through respective energy transmission cables 230 and 224. The power conditioning modules of the embodiment illustrated in FIG. 13 tend to consume the raw generator-produced three-phase electrical power and produce direct-current (DC) electrical power that is characterized by a relative narrow range of voltages, if not a particular and/or specific voltage.

With respect to the embodiment illustrated in FIG. 13, the "conditioned electrical power" produced by the power conditioning modules 235 and 238 is transmitted, via respective "load energy transmission cables," comprised of two, e.g., 247 and 248, isolated electrical conductors each, to respective electrical loads 236 and 239. Each electrical load 236 and 239 contains a digital circuit that requires electrical power that conforms to a relatively narrow range of voltages. Each respective power conditioning module 235 and 238 transmits suitably conditioned electrical power to its respective electrical load at one or more voltages (e.g., the transmission of additional voltages requiring that the respective load energy transmission cables possess, include, incorporate, and/or utilize a greater number of isolated electrical conductors than the two mentioned earlier).

Load managers 237 and 240 adjust, alter, change, control, manipulate, and/or set, various operational characteristics, attributes, behaviors, and/or parameters, of their respective electrical loads 236 and 239, and of the respective power conditioning modules 235 and 238. Each load manager can include a computer running software adapted and/or configured to perform the below described functions, or it can include integrated circuits running firmware adapted and/or configured to perform the below described functions. Each load manager can set the various operational characteristics of its respective electrical load and its respective power conditioning module by generating, altering, and/or controlling, signals which include, but are not limited to, the following:

by adjusting, altering, changing, controlling, manipulating, and/or setting, reference voltages, e.g., to zero or ground, to +5 volts, and/or to other values;

by adjusting, altering, changing, controlling, manipulating, and/or setting, the frequencies, voltages, and/or duty cycles, of pulse-width modulation signals;

by adjusting, altering, changing, controlling, manipulating, and/or setting, the clock frequency and/or core voltage of a central-processing unit (CPU), graphics-processing unit (GPU), tensor-processing unit (TPU), application-specific integrated circuit (ASIC), and/or other digital circuit;

by adjusting, altering, changing, controlling, manipulating, and/or setting, the amount and/or proportion of compute cycles that a digital circuit, e.g., a CPU, GPU, TPU, and/or ASIC, will spend processing "no-operation" or "no-op" commands, or will spend invoking or executing an "idle" thread;

by adjusting, altering, changing, controlling, manipulating, and/or setting, the amount and/or proportion of compute cycles that a digital circuit, e.g., a CPU, GPU, TPU, and/or ASIC, will spend resetting the program counter to a specific value or to the last value (e.g., rather than advancing the program counter to allow program execution), thereby effectively stalling program execution at a particular part of, and/or point in, a program's execution;

by adjusting, altering, changing, controlling, manipulating, and/or setting, a control element of a linear voltage regulator;

by adjusting, altering, changing, controlling, manipulating, and/or setting, a resistor's resistance in an active voltage regulator;

by adjusting, altering, changing, controlling, manipulating, and/or setting, a switching frequency, switching pattern, and/or switching duty cycle, of one of a buck switching converter and a boost switching regulator;

by adjusting, altering, changing, controlling, manipulating, and/or setting, a parameter, command, input value, setting, and/or signal, to a control circuit that controls the switching points manifested by a switching regulator; and/or by adjusting, altering, changing, controlling, manipulating, and/or setting, a parameter, command, input value, setting, and/or signal, to a microprocessor controlled variable transformer of a voltage stabilization circuit.

Each of the embodiment's load managers 237 and 240 adjusts, alters, changes, controls, manipulates, and/or sets, various operational characteristics, attributes, behaviors, and/or parameters, of their respective electrical loads 236 and 239 and/or of their respective power conditioning modules 235 and 238 in response, at least in part, to signals received from a set of sensors including, but not limited to, the following:

a pair of torque and rpm (rate of rotation) sensors (233 and 225 in FIG. 12) that send (via respective cables 270 and 271, wires, conductors, optical fibers, and/or other connectors) to the respective load managers 237 and 240 signals, digital data, analog values, voltages, currents, and/or other information, that allows the respective load managers to determine, or to at least estimate, the rate at which the respective turbine shafts (228 and 222 in FIGS. 11 and 12) which are operably and/or rigidly connected to each of the embodiment's respective water turbines (226 and 227 in FIGS. 11 and 12) are rotating and the torque under which each of those respective turbine shafts is being rotated by its respective water turbine and/or the torque by which the turning of each of those respective turbine shafts is being resisted by its respective generator (229 and 221 of FIGS. 11 and 12);

a pair of voltage and/or current sensors 249 and 250 each of which sends (via respective cables 251 and 252, wires, conductors, optical fibers, and/or other connectors) to each of the respective load managers 237 and 240 signals, digital data, analog values, voltages, currents, and/or other information, that allows each respective load manager to determine, or to at least estimate, the amount of conditioned electrical power being transmitted to, and/or consumed by, each of the respective electrical loads 236 and 239. Each voltage and/or current sensor measures and reports to its respective load manager the voltage across the wires, e.g., 247 and 248, of each respective load energy transmission cable, as well as the current flowing through those wires;

a pair of temperature and vibration sensors 253 and 254 each of which sends (via a respective cable 255 and 256, wire, conductor, optical fiber, and/or other connector) to the respective load manager 237 and 240 signals, digital data, analog values, voltages, currents, and/or other information, that allows each respective load manager to determine, or to at least estimate, the temperature, vibrations, and/or other operational information indicative of the state, condition, and/or reliability, of each respective power conditioning module 235 and 238, e.g., if either respective power conditioning module is overheating; and, a pair of temperature and vibration sensors 257 and 258 each of which sends (via a respective cable 259 and 260, wire, conductor, optical fiber, and/or other connector) to its respective load manager 237 and 240 signals, digital data, analog values, voltages, currents, and/or other information, that allows each respective load manager to determine, or to at least estimate, the temperature, vibrations, and/or other operational information indicative of the state, condition, and/or reliability, of each respective electrical load 236 and 239, e.g., if either respective electrical load, and/or any of their constituent parts and/or sub-loads (if the electrical load is comprised of differentiated and/or independently controlled circuits) is overheating;

A radio transceiver (transmitter and receiver) 205, which, in the embodiment and/or device configuration illustrated in FIGS. 6-13 is a phased array transceiver, communicates, sends to, transmits to, exchanges with, and/or shares with (via a cable 262, wire, conductor, optical fiber, and/or other connector) the communications manager 241 electromagnetic, electrical, analog, optical, and/or digitized signals, or correlated, transcribed, interpreted, and/or processed, analogues, alternates, and/or variations, of such signals, that it receives from remote transmitters, e.g., from a satellite. The radio transceiver 205 also receives from the communications manager 241 electromagnetic, electrical, analog, optical, and/or digitized signals, and/or processed, analogues, alternates, and/or variations, of such signals, which tend to encode data which the communications manager then transmits, via cable 262 and radio transceiver 205, to a remote receiver, e.g., a satellite, specified (e.g., through the specification of a transmission frequency) by the communications manager.

The communications manager 241 sends data to, and receives data from, the navigation manager 242 via a cable 263, wire, conductor, optical fiber, and/or other connector. The data that the communications manager transmits to, and/or receives from, the navigation manager includes, but is not limited to: geospatial coordinates (e.g., to which the embodiment is to transit, cruise, and/or propel itself, or at which it is presently located), contemporaneous and/or forecast environmental data (e.g., wind directions and speeds, ocean current directions and speeds, wave heights, directions, wavelengths, and temperatures of air and/or water), and contemporaneous and/or forecast passage of submerged, floating, flying, and/or orbiting objects (e.g., ships, planes, satellites, icebergs, and debris).

The navigation manager 242 receives signals, digital data, analog values, voltages, currents, and/or other information, from an accelerometer, gyroscope, and compass sensor 261 that allows the navigation manager to determine, or to at least estimate, the movements and orientation of the embodiment, as well as the height and periods of the waves that drive the embodiment.

The navigation manager 242 sends data to, and receives data from, the effluent flow regulation manager 244 via a cable 264, wire, conductor, optical fiber, and/or other connector. The navigation manager transmits to the effluent flow regulation manager data that includes, but is not limited to: current angular orientation of the embodiment, e.g., navigational course with respect to magnetic and/or true north, about a nominal vertical longitudinal axis of rotation, a preferred, advantageous, and/or required: angular orientation of the embodiment, rate of change in angular orientation, forward speed, and/or degree, magnitude, and/or level, of differential, delta, and/or net, effluent-generated thrust produced by the embodiment's two effluent pipes 206 and 208.

The effluent flow regulation manager 244 sends data to, and receives data from, the load managers 237 and 240 via load-manager-specific cables 265 and 266, wires, conductors, optical fibers, and/or other connectors. The effluent flow regulation manager 244 receives from the load managers 237 and 240 data that includes, but is not limited to: the current torque and rate of rotation (rpm) of each respective load-manager-specific water turbine shaft 228 and 222, as well as the magnitude, amount, and/or level, of electrical power consumption by each respective electrical load 236 and 239 that is controlled by each respective load manager 237 and 240.

The effluent flow regulation manager 244 transmits to the load manager 237 data that includes, but is not limited to: a preferred, advantageous, and/or required, torque and rate of rotation (rpm) of water turbine shaft 228. Likewise, the effluent flow regulation manager 244 transmits to the load manager 240 data that includes, but is not limited to: a preferred, advantageous, and/or required, torque and rate of rotation (rpm) of water turbine shaft 222.

The effluent flow regulation manager 244 sends instructions, data, requests, and/or signals, to the load manager 237 that alters, controls, regulates, changes, and/or modifies, the magnitude of the electrical load 236 through which the load manager 237 indirectly alters, controls, regulates, changes, and/or modifies, the resistive torque and rpm of the water turbine 226 which in turn alters, controls, regulates, changes, and/or modifies, the rate at which water flows out of "starboard" effluent pipe 206, and thereby alters, controls, regulates, changes, and/or modifies, the amount of thrust generated by the starboard effluent pipe 206.

The effluent flow regulation manager 244 sends instructions, data, requests, and/or signals, to the load manager 240 that alters, controls, regulates, changes, and/or modifies, the magnitude of the electrical load 239 through which the load manager 240 indirectly alters, controls, regulates, changes, and/or modifies, the resistive torque and rpm of the water turbine 227, which in turn alters, controls, regulates, changes, and/or modifies, the rate at which water flows out of "port" effluent pipe 208, and thereby alters, controls, regulates, changes, and/or modifies, the amount of thrust generated by the port effluent pipe 208.

By adjusting, controlling, and/or regulating, the amount of resistive torque which the port and starboard load managers 240 and 237 indirectly apply to their respective port and starboard water turbines 227 and 226, through their respective adjustments, controls, and/or regulations, of the port and starboard electrical loads 239 and 236, the effluent flow regulation manager 244 indirectly adjusts, controls, alters, regulates, changes, and/or modifies, the amount of net turning torque that the combined effluent flows 209 and 207 (flowing out from the port and starboard effluent pipes 208 and 206) imparts to the embodiment, thereby tending to cause the embodiment to rotate about a nominally vertical longitudinal axis of rotation when the net effluent-induced torque is nonzero.

For example, if the navigation manager 242 determines that it is advantageous, useful, and/or necessary, to turn to port (i.e., in a counter-clockwise direction with respect to a top-down perspective), then it sends to the effluent flow regulation manager 244 a signal indicating the utility or need to turn to port.

In order to achieve a turn to port, the effluent flow regulation manager 244 sends to port load manager 240 a signal indicating the utility or need to decrease the rate at which water flows out of port effluent pipe 208. If possible, the port load manager 240 will increase the amount of electrical power consumed by the electrical load 239, thereby causing the respective generator 238 to resist, to an increased degree, the turning of the respective shaft 222 and water turbine 227, thereby inhibiting the flow of water out of effluent pipe 208. If the port load manager succeeds in increasing the amount of electrical power consumed by electrical load 239, then it signals the port load manager 240 of that result. If the port load manager is not able to increase the amount of electrical power consumed by electrical load 239, then it signals to port load manager 240 its failure.

In order to achieve a turn to port, the effluent flow regulation manager sends to starboard load manager 237 a signal indicating the utility or need to increase the rate at which water flows out of starboard effluent pipe 206. If possible, the starboard load manager 237 will decrease the amount of electrical power consumed by the electrical load 236, thereby causing the respective generator 235 to resist, to a reduced degree, the turning of the respective shaft 228 and water turbine 226, thereby facilitating the increased flow of water out of effluent pipe 206. If the starboard load manager succeeds in decreasing the amount of electrical power consumed by electrical load 236, then it signals the starboard load manager 237 of that result. If the starboard load manager is not able to decrease the amount of electrical power consumed by electrical load 236, then it signals to starboard load manager 237 its failure.

Through a combination of decreasing the rate at which water flows out of port effluent pipe 208, and increasing the rate at which water flows out of starboard effluent pipe 206, or both, the effluent flow regulation manager 244 will attempt to create and/or orchestrate a differential and/or net flow of water out of the port and starboard effluent pipes that will tend to achieve a turn to port as requested and/or specified by the navigation manager 242.

Similarly, if the navigation manager 242 determines that it is advantageous, useful, and/or necessary, to turn to starboard (i.e., in a clockwise direction with respect to a top-down perspective), then it sends to the effluent flow regulation manager 244 a signal indicating the utility or need to turn to starboard. And, through a combination of increasing the rate at which water flows out of port effluent pipe 208, decreasing the rate at which water flows out of starboard effluent pipe 206, or both, the effluent flow regulation manager 244 will attempt to create and/or orchestrate a differential and/or net flow of water out of the port and starboard effluent pipes that will tend to achieve a turn to starboard as requested and/or specified by the navigation manager 242.

When the navigation manager 242 determines that it is advantageous, useful, and/or necessary, to move along a straight forward course, in the direction in which the embodiment is already oriented, steering, and/or cruising, then it sends to the effluent flow regulation manager 244 a signal indicating the utility or need to steer a straight course moving the embodiment straight ahead. And, by causing water to flow out of the port and starboard effluent pipes 208 and 206 at the same rate, the effluent flow regulation manager and the respective port and starboard load managers 240 and 237 will typically cause the respective port and starboard electrical loads 239 and 236 to be of equal magnitudes, thereby causing the torque and rpm of the respective port and starboard turbine shafts 222 and 228 and water turbines 227 and 226 to be approximately equal, which will tend to result in an equal rate of flow from the port and starboard effluent pipes.

The reservoir manager 243 receives from a water pressure sensor (231 in FIGS. 11 and 12) (via a cable 267, wire, conductor, optical fiber, and/or other connector) signals, digital data, analog values, voltages, currents, and/or other information, that allow the reservoir manager to determine, or to at least estimate, the depth of the pressure sensor below the surface (219 in FIGS. 10 and 12) of the water within the embodiment's water reservoir (217 in FIGS. 10 and 12) and thereby to determine, or to at least estimate, the volume of water within the water reservoir.

The reservoir manager 243 receives from an air pressure sensor (234 in FIGS. 11 and 12) (via a cable 268, wire, conductor, optical fiber, and/or other connector) signals, digital data, analog values, voltages, currents, and/or other information, that allow the reservoir manager to determine, or to at least estimate, the pressure of the gas, e.g., the pressure of the air, within the air pocket (218 in FIGS. 10 and 12) above the embodiment's water reservoir (217 in FIGS. 10 and 12) and to thereby determine, or to at least estimate, in conjunction with an estimate of the volume of the water reservoir suggested by the pressure indicated by the water pressure sensor (231 in FIGS. 10 and 12) the volume and mass of gas, e.g., of air, within the air pocket.

The reservoir manager 243 receives from the communications manager 241 (via a cable 269, wire, conductor, optical fiber, and/or other connector) data that includes, but is not limited to: forecasts of weather, wave heights, wave periods, sea states, and surface sea temperatures, which the communications manager has received from a remote transmitter. The reservoir manager uses this information to estimate the amounts of energy that will be available to, and/or thrust upon, the embodiment in the future in concert with its harvesting of wave energy. If the reservoir manager determines that the future availability of wave energy to the embodiment will be limited, restricted, suboptimal, and/or deficient, or, by contrast, if the reservoir manager determines that the embodiment may be exposed to excessive amounts of wave energy in the future, then the reservoir manager so informs and/or signals the effluent flow regulation manager 244.

In response to a signal from the reservoir manager 243 (via a cable 272, wire, conductor, optical fiber, and/or other connector) indicating a need to preserve the potential energy captured within, and/or provided by, the embodiment's water reservoir (217 in FIGS. 10 and 12), the effluent flow regulation manager 244 will, when possible, decrease the rate at which water flows out of both effluent pipes 206 and 208 so as to reduce the loss of water from the water reservoir in anticipation of a potential future shortage.

In response to a signal from the reservoir manager 243 indicating a need to reduce the volume of water within the embodiment's water reservoir (217 in FIGS. 10 and 12), the effluent flow regulation manager 244 will, when possible, increase the rate at which water flows out of both effluent pipes 206 and 208 so as to increase the rate at which water is removed from the water reservoir in anticipation of a potential surge in the rate at which water will be deposited into the water reservoir.

The embodiment illustrated in FIGS. 6-13 is one example of many possible examples, and all variations in the embodiment's design, constitution, configuration, and/or attributes, are included within the scope of the present disclosure. The functional decomposition of the functionality illustrated schematically in FIG. 13, and discussed with respect to FIG. 13, can be illustrated in multiple ways. The component functionalities illustrated and discussed in relation to FIG. 13 could be combined, further decomposed, augmented, and/or otherwise altered, by embodiments within the scope of the present disclosure. The architecture illustrated in FIG. 13 is primarily provided for the purpose of instruction, illustration, and explanation, and is not a limitation of the present disclosure.

An embodiment similar to the one illustrated in FIGS. 6-13, utilizes, incorporates, and/or includes, a single load manager, e.g., 240, instead of the two, port- and starboard-specific load managers 240 and 237 illustrated in FIG. 13. The single load manager manages, controls, alters, adjusts, and/or regulates, each of the electrical loads 239 and 236 so as to achieve any degree of differential thrust and/or rate of effluence specified and/or requested by the effluent flow regulation manager 244, and/or any increase or decrease in the volume of the embodiment's water reservoir specified and/or requested by the reservoir manager 243.

An embodiment similar to the one illustrated in FIGS. 6-13, comprises, includes, incorporates, and/or utilizes, a machine-learning circuit within its load managers 237 and 240 in order to more rapidly and/or more accurately adjust their respective electrical loads 236 and 239 and/or power conditioning modules 235 and 238, in response to: a changing wave environment; changing power needs of the electrical load (e.g., while executing a complex computational task); changing characteristics of wave motions detected by the load manager's accelerometer; information the load manager receives from a remote transmitter via the radio transceiver 185 about the immediate and anticipated wave climates to which the embodiment will be subjected; a need to alter the embodiment's course and/or turn the embodiment; a need to alter the embodiment's cruising speed; etc.

An embodiment similar to the one illustrated in FIGS. 6-13, comprises, includes, incorporates, and/or utilizes, an artificial-intelligence circuit within its load managers 237 and 240 in order to more rapidly and/or more accurately adjust their respective electrical loads 236 and 239 and/or power conditioning modules 235 and 238.

An embodiment similar to the one illustrated in FIGS. 6-13, comprises, includes, incorporates, and/or utilizes, within each of its load managers 237 and 240 a lookup table, in which it logs current sensor readings and/or other data available to it as well as its alterations to its respective electrical load 236 or 239 and/or to its respective power conditioning module 235 or 238, and then matches current sensor readings and/or other data to past entries within the lookup table in order to evaluate and/or predict the possible effects, outcomes, results, and/or consequences, of each potential alteration to its respective electrical load and/or to its respective power conditioning module, thereby enabling each load manager to select and/or customize a set of alterations most likely to achieve a desirable, advantageous, and/or useful outcome and/or result.

Embodiments similar to the one illustrated in FIGS. 6-13, comprise, include, incorporate, and/or utilize, a variety of power conditioning modules 235 and 238, power conditioning circuits, power conditioning technologies, power converter types (e.g., buck and boost), etc. The scope of the present disclosure includes embodiments comprising, including, incorporating, and/or utilizing, any and all types, varieties, designs, and categories of power conditioning modules, circuits, technologies, designs, types, and/or architectures.

Embodiments similar to the one illustrated in FIGS. 6-13, comprise, include, incorporate, and/or utilize, a variety of generators and types of generators 221 and 229, including, but not limited to: permanent-magnet synchronous generators, alternators, and homopolar generators. The scope of the present disclosure includes embodiments comprising, including, incorporating, and/or utilizing, any and all types, varieties, designs, and categories of generators.

Embodiments similar to the one illustrated in FIGS. 6-13, comprise, include, incorporate, and/or utilize, a variety of water turbines and types of water turbines 226 and 227, including, but not limited to: Kaplan turbines, Francis turbines, axial-flow turbines, and cross-axial flow turbines. The scope of the present disclosure includes embodiments comprising, including, incorporating, and/or utilizing, any and all types, varieties, designs, and categories of water turbines.

An embodiment similar to the one illustrated in FIGS. 6-13, comprises, includes, incorporates, and/or utilizes, a plurality of effluent pipes, e.g., 206, each with a respective water turbine, e.g., 226, a respective turbine shaft, e.g., 228, a respective generator, e.g., 229, a respective power conditioning module, e.g., 235, a respective electrical load, e.g., 236, and a respective load manager, e.g., 237.

Such an embodiment also comprises, includes, incorporates, and/or utilizes, navigation managers, e.g., 242, and effluent flow regulation managers, e.g., 244, which control, adjust, alter, manipulate, and/or override (when needed), the respective load managers, e.g., 237, such that the rate of water effluence out of each of the plurality of effluent pipes is made to differ such that a differential rate of effluence is created between the plurality of effluent pipes. The rate, magnitude, direction, and/or efficiency, with which this embodiment's course is altered, turned, adjusted, and/or controlled, through the manifestation of differential rates of effluence among the plurality of effluent pipes depends, at least in part on the positions and orientations of those effluent pipes within the embodiment.

An embodiment similar to the one illustrated in FIGS. 6-13, comprises, includes, incorporates, and/or utilizes, effluent pipes 206 and 208 of differing pipe diameters and/or distal-apertures and/or proximal-apertures of different relative and/or absolute cross-sectional areas. The scope of the present disclosure includes embodiments having any number of effluent pipes, as well as those of two or more effluent pipes in which the diameters and/or cross-sectional areas of the respective effluent pipes and/or distal apertures are unequal.

An embodiment similar to the one illustrated in FIGS. 6-13, comprises, includes, incorporates, and/or utilizes, at least one effluent pipe from which water exits the embodiment at a level and/or height typically, nominally, and/or with respect to a resting body of water 204, above the mean or resting surface of the body of water, e.g., the effluent is projected into the atmosphere outside the embodiment.

The embodiment illustrated in FIGS. 6-13 comprises, includes, incorporates, and/or utilizes, a bi-directional air pump (not shown). If the reservoir manager 243 detects that the pressure of the gas within the embodiment's air pocket is too low, e.g., as a result of sensor signals received from air pressure sensor 234, then the reservoir manager 243 signals to the air pump to draw additional air from the atmosphere outside the embodiment into the embodiment's air pocket, thereby tending to increase the pressure of the gas within the air pocket. If the reservoir manager 243 detects that the pressure of the gas within the embodiment's air pocket is too great, e.g., as a result of sensor signals received from air pressure sensor 234, then the reservoir manager 243 signals to the air pump to pump and/or release air from the embodiment's air pocket to the atmosphere outside the embodiment, thereby tending to reduce the pressure of the gas within the air pocket.

Embodiments of the present disclosure include those that utilize water turbines to create, generate, and/or produce, alternate forms of energy, including, but not limited to, the creation of: optical energy; pressurized hydraulic fluid; pressurized water; and pressurized air. Embodiments of the present disclosure include those that utilize the pressurized water within the embodiment's water reservoir directly to perform useful work.

Figure 14:
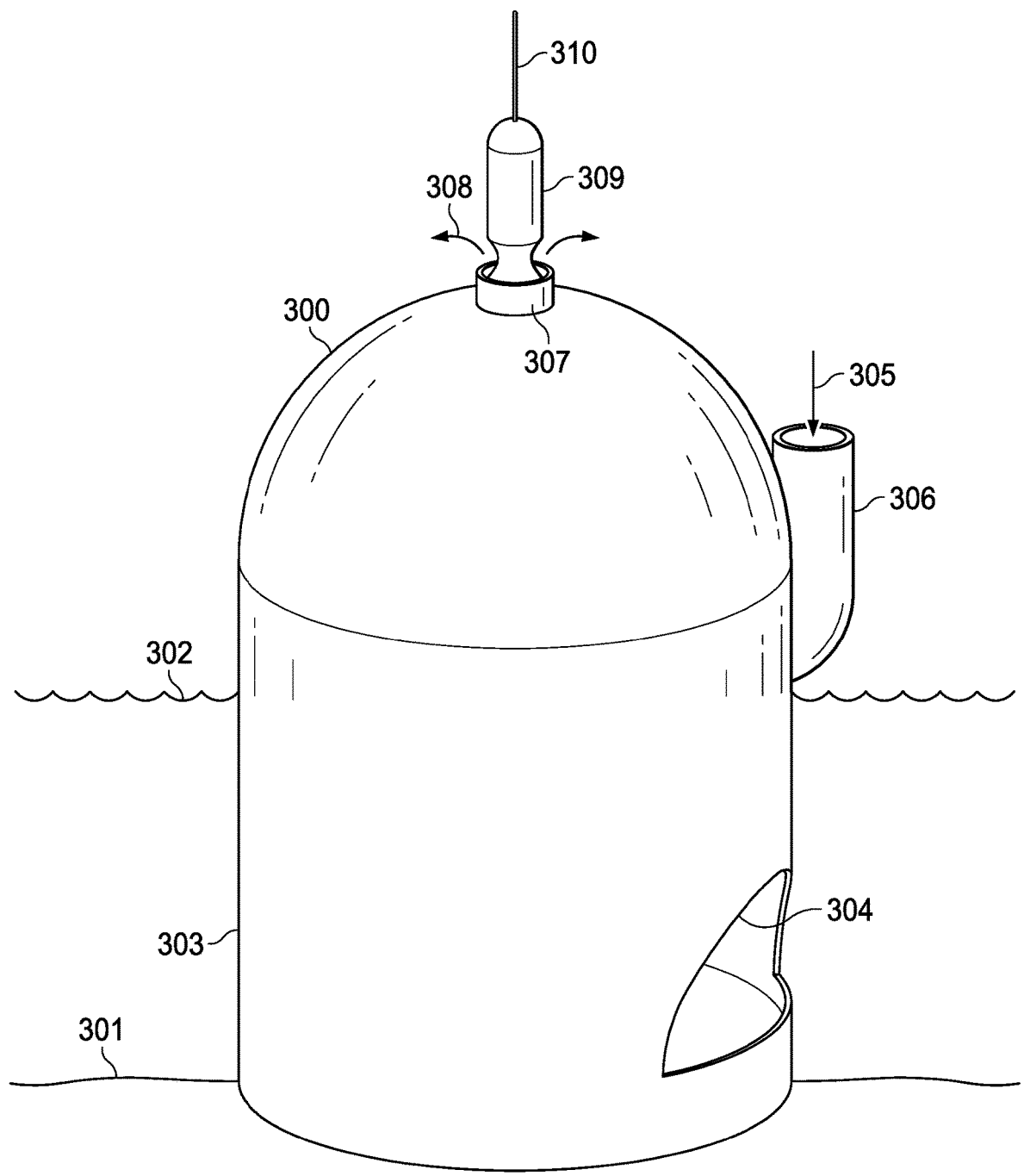
FIG. 14 is a perspective view of a fourth embodiment of the present invention.

FIG. 14 shows a side perspective view of an embodiment of the present disclosure. The embodiment 300 rests upon a seafloor 301 over which lies a body of water and across an upper surface 302 of which tend to pass waves. The embodiment comprises a hollow shell or wall characterized by an approximately cylindrical bottom portion 303 and an upper approximately hemispherical portion 300.

An interior of the embodiment comprises two cavities. A first cavity (not visible) is fluidly connected to the surrounding body of water 302 by an aperture 304. As the depth of the water 302 increases as a consequence of the passage of a wave crest and decreases as a consequence of the passage of a wave trough, the volume of water, and the height of that water, within the first cavity increases and decreases, respectively. Decreases in the height of the water within the first cavity tends to cause atmospheric air to be drawn 305 to be drawn into, and to be trapped within an upper portion of, the first cavity through an air intake pipe 306.

Conversely, increases in the height of the water within the first cavity tends to cause air trapped within an upper portion of the first cavity to be compressed and to flow into a fluidly connected second cavity (not visible) within the interior of the embodiment. Pressurized air is trapped within the second cavity may only exit that cavity through an air turbine effluent channel 307 wherein is positioned an air turbine (not visible) through which the exiting pressurized air must flow, thereby imparting rotational kinetic energy to an operably connected generator positioned within an electronics compartment 309 mounted atop the embodiment's upper hemispherical wall 300. After flowing through and energizing the embodiment's air turbine, the pressurized air flows 308 back into the atmosphere from which it was taken.

Mounted atop the electronics compartment 309 is an antenna 310 through which the embodiment receives computational tasks and input data, and from which the embodiment transmits computational results, output data, and operational status data.

Figure 15:
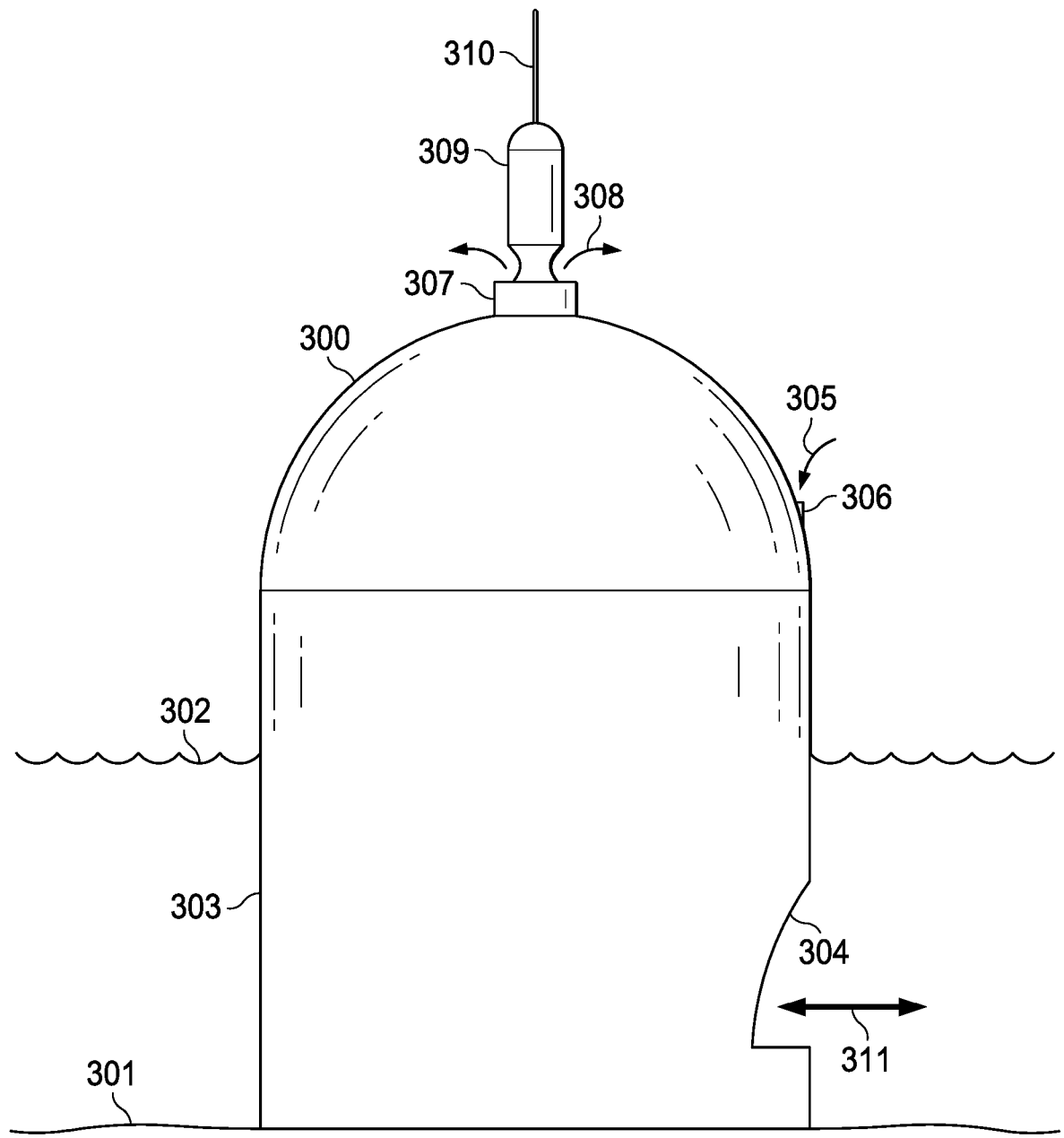
FIG. 15 is a side view of the embodiment of FIG. 14.
Figure 16:
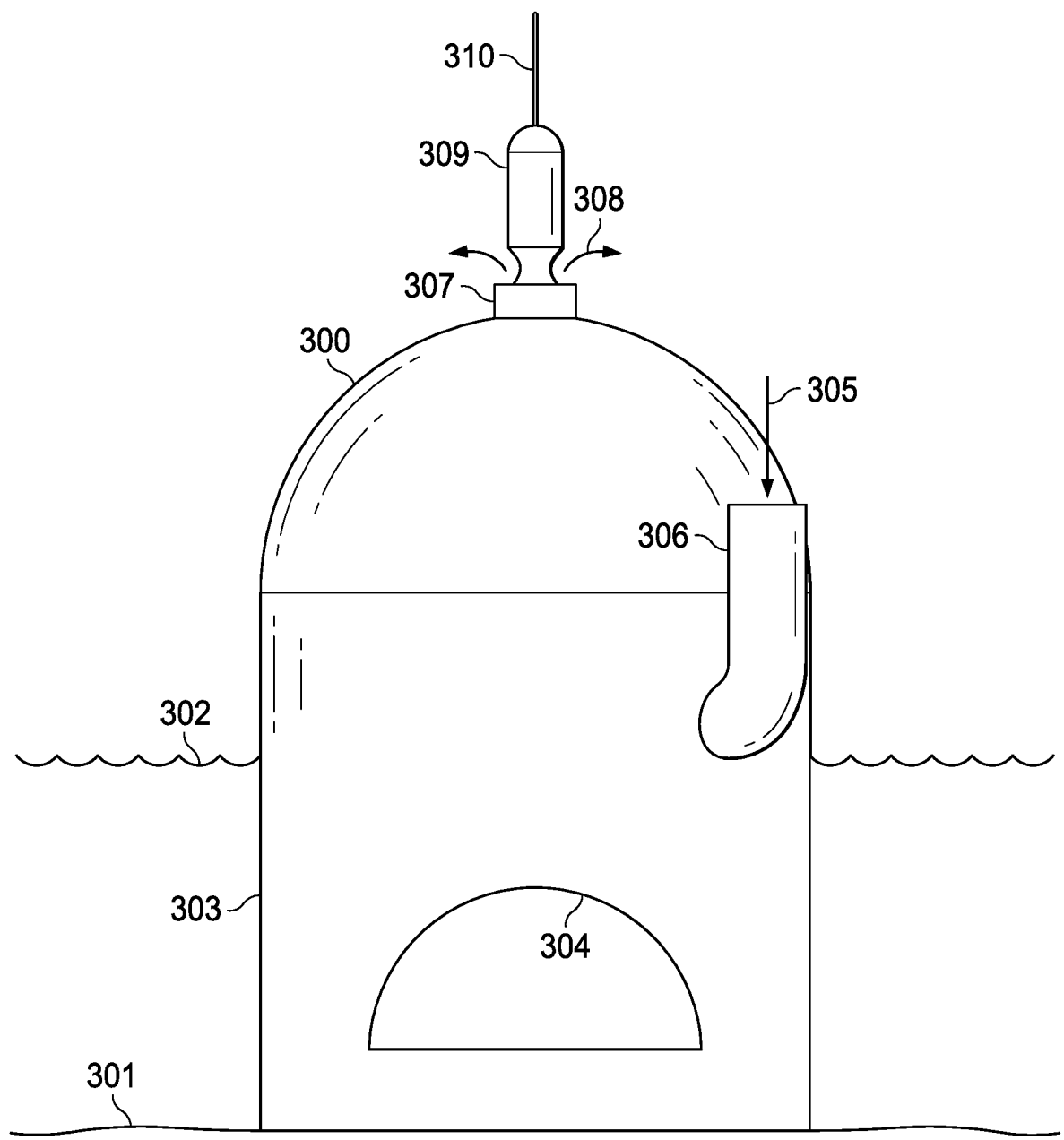
FIG. 16 is another side view of the embodiment of FIG. 14.

FIG. 15 shows a side view of the same embodiment of the present disclosure that is illustrated in FIG. 14. As changes in the depth of the water 302 drive water to flow 311 in and out of the first cavity (not visible). When water flows out of the first cavity, a first one-way valve (not visible) allows air to flow 305 into and through an air intake pipe 306 and into the first cavity. When water flows into the first cavity, a second one-way valve (not visible) allows air compressed within the first cavity to flow into the second cavity and therefrom to flow 308 into and through air turbine effluent channel 307, and the air turbine positioned therein, and therethrough to flow 308 out of the air turbine effluent channel, and out of the second cavity, flowing back to the atmosphere outside and/or above the embodiment. FIG. 16 shows a side view of the same embodiment of the present disclosure that is illustrated in FIGS. 14 and 15.

Figure 17:
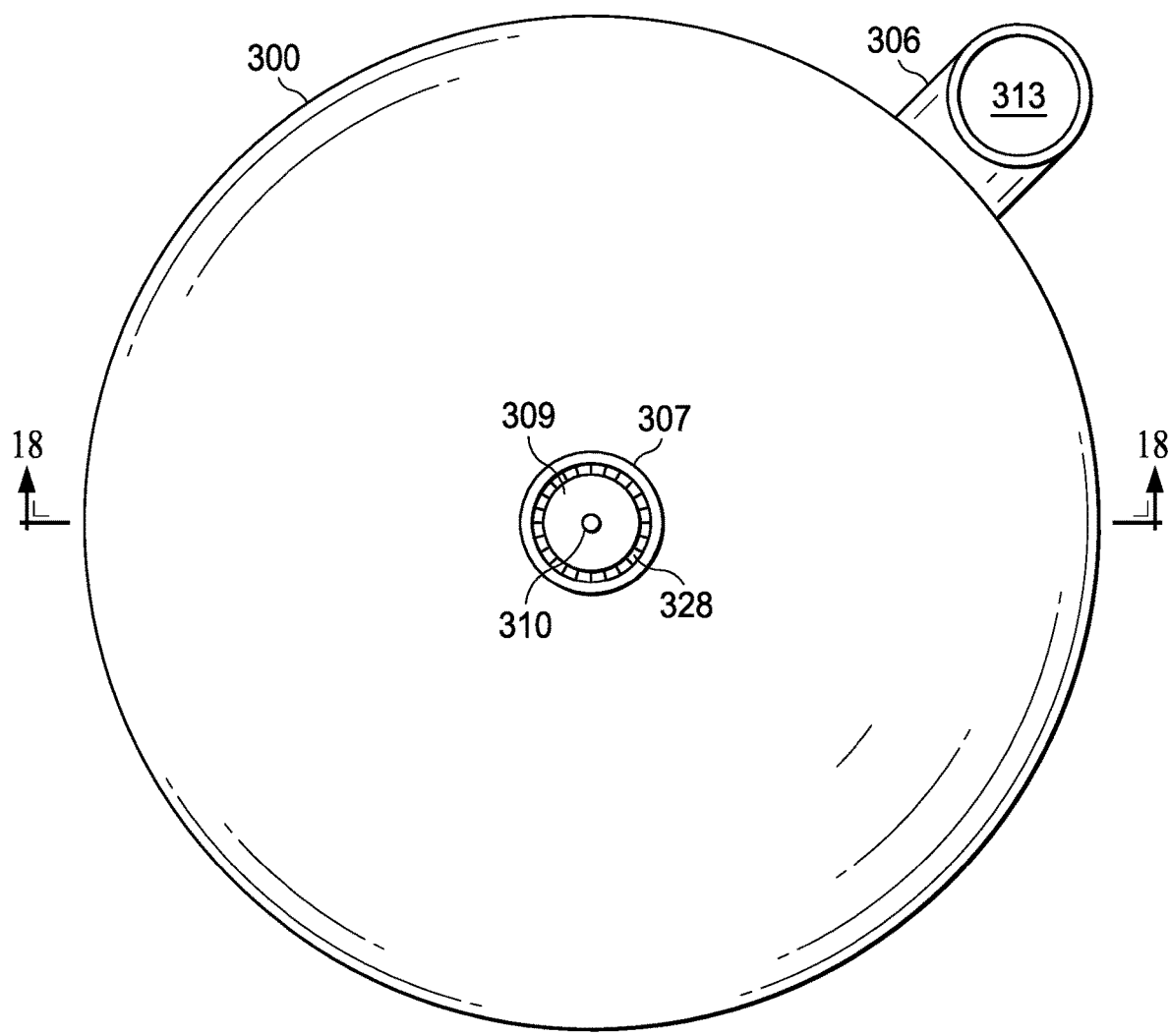
FIG. 17 is a top-down view of the embodiment of FIG. 14.
Figure 18:
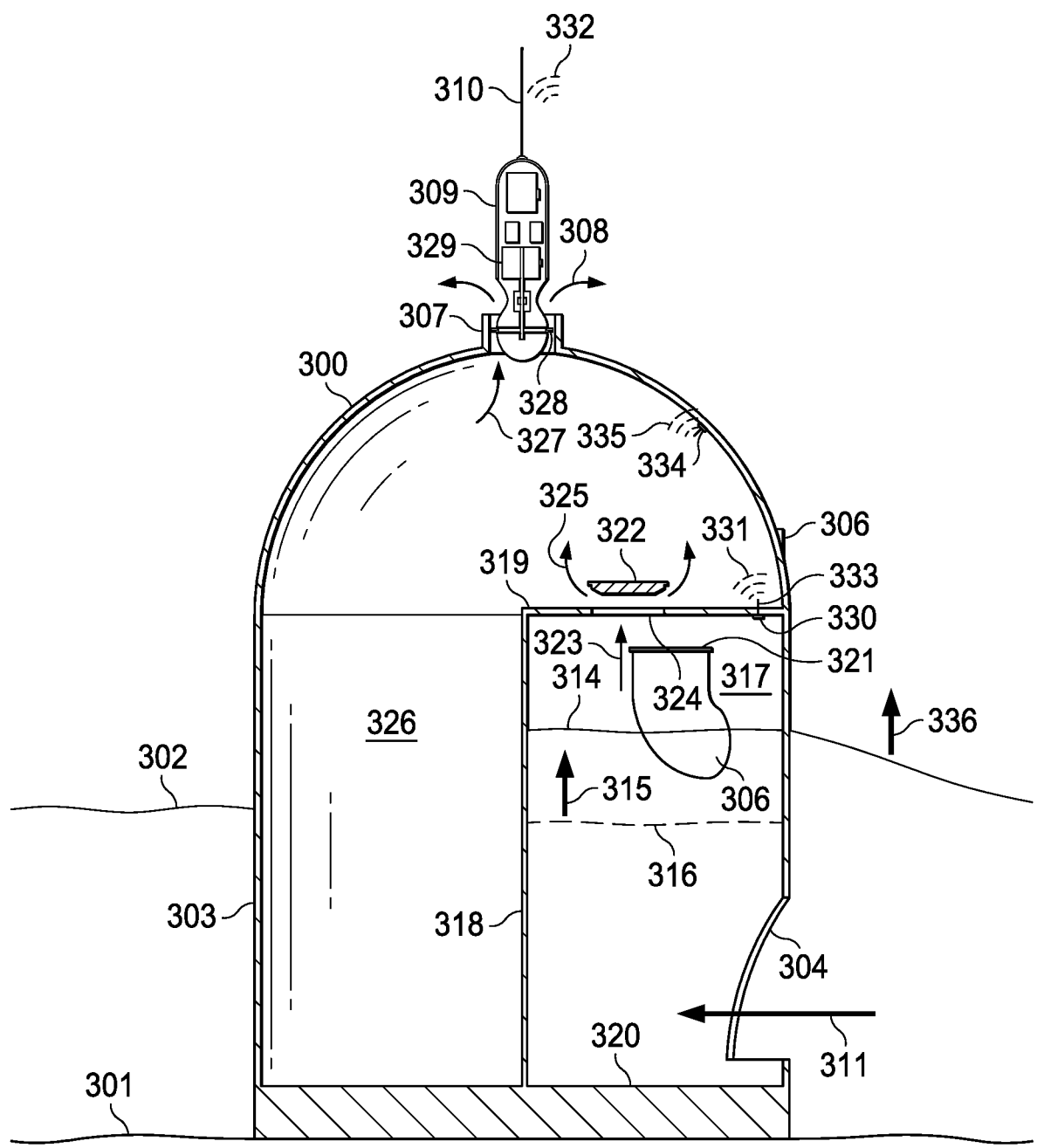
FIG. 18 is a side sectional view of the embodiment of FIG. 14.

FIG. 17 shows a top-down view of the same embodiment of the present disclosure that is illustrated in FIGS. 14-16. Visible within the air turbine effluent channel 307 and concentric with the electronics compartment 309 is the embodiment's air turbine 312. And, visible is the aperture and corresponding channel 313 through which air is drawn from the atmosphere into the first cavity (not visible). FIG. 18 shows a side sectional view of the same embodiment of the current disclosure that is illustrated in FIGS. 14-17, where the section is taken along the section line 18-18 as specified in FIG. 17.

In response to the approach and/or passing wave crest across the surface 302 of the body of water surrounding the embodiment 300, as the surface 302 of the water outside the aperture 304 rises 336, a water level 314 within the embodiment's first cavity rises 315 from a lower level 316, thereby compressing a pocket of air 317 trapped within an upper portion of the first cavity. The rising of the water level 314 is driven by an ingress 311 of water into the first cavity 317 through an aperture 304 positioned below a surface 302 of the water 302 surrounding the embodiment. The first cavity is defined, in part, by internal walls 318 and 319, and in part by a portion of an outer cylindrical wall 303 and a base and/or foundational wall 320.

In response to a reduction in the pressure of the air within the air pocket 317, air is able to flow from the atmosphere into the air pocket through air intake pipe 306 due to a raising and/or opening of the first one-way valve 321. However, in the embodiment configuration and/or state illustrated in FIG. 18, when the level 314 of the water within the first cavity is rising, the pressure of the air within the air pocket 317 is increased to be greater than that of the atmosphere outside the embodiment, and, as a result, the first one-way valve 321 is closed and/or shut, thereby excluding a flow of air from the air pocket 317 of the first cavity to the atmosphere.

As the level 314 of the water within the first cavity 317 rises, the pressure of the air within the air pocket trapped therein increases causing the second one-way valve 322 to open thereby allowing pressurized air from the air pocket 317 to flow 323 into and through an aperture 324 positioned within the upper wall 319 of the first cavity. Air flowing 325 through aperture 324 and into the second cavity 326 increases the pressure of the air trapped therein.

Pressurized air with the second cavity 326 flows 327 into the air turbine effluent channel 307 thereby flowing through and energizing the air turbine 328 positioned therein. Rotations of the air turbine cause the operably connected generator 329 to produce electrical power.

A first-cavity air pressure sensor 330 detects and/or measures the pressure of the air within the air pocket 317 trapped at an upper end of the first cavity. The sensor's pressure readings are transmitted 331/332 to, and received by, the embodiment's antenna 310. Fluctuations in the pressure of the air within the air pocket 317 cause a pressure-energized electrical power generation module within the first-cavity air pressure sensor 330 to generate electrical power which is stored, at least in part, within an energy storage module within that pressure sensor. The electrical energy generated and stored with the first-cavity air pressure sensor 330 is sufficient to permit it to measure the ambient air pressure and to transmit 331 those measured values from antenna 333 to antenna 310.

A second-cavity air pressure sensor 334 detects and/or measures the pressure of the air within the air trapped within the second cavity 326. The sensor's pressure readings are transmitted 335/332 to, and received by, the embodiment's antenna 310. Fluctuations in the pressure of the air within the second cavity 326 cause a pressure-energized electrical power generation module within the second-cavity air pressure sensor 334 to generate electrical power which is stored, at least in part, within an energy storage module within that pressure sensor. The electrical energy generated and stored with the second-cavity air pressure sensor 334 is sufficient to permit it to measure the ambient air pressure and to transmit 335 those measured values from its antenna to antenna 310.

Figure 19:
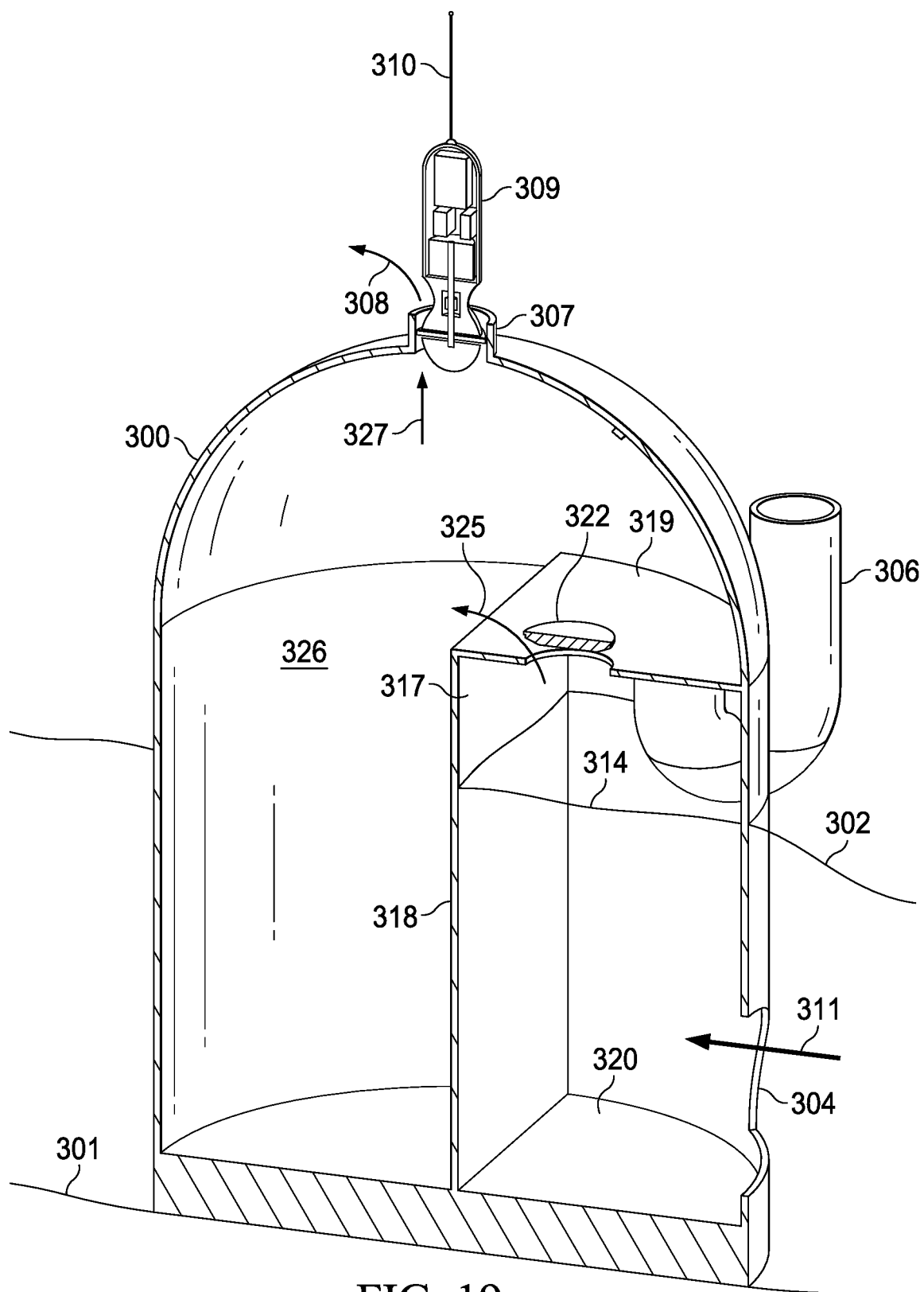
FIG. 19 is a perspective side sectional view of the embodiment of FIG. 14.
Figure 20:
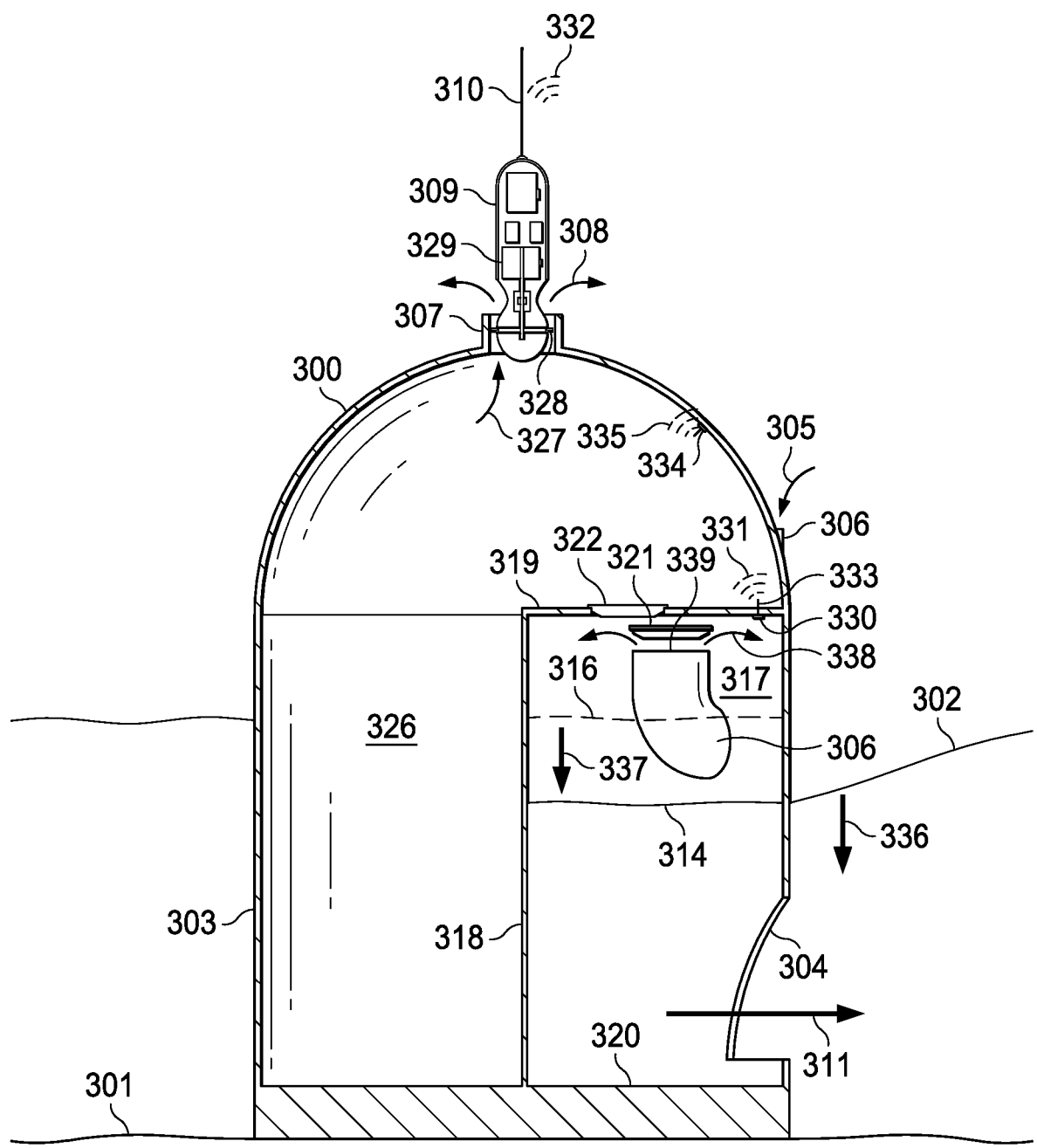
FIG. 20 is another side sectional view of the embodiment of FIG. 14.

FIG. 19 shows a perspective side sectional view of the same embodiment of the current disclosure that is illustrated in FIGS. 14-18, where the section is taken along the section line 18-18 as specified in FIG. 17. FIG. 19 provides a perspective view of the same sectional view illustrated in FIG. 18. FIG. 20 shows a side sectional view of the same embodiment of the current disclosure that is illustrated in FIGS. 14-19, where the section is taken along the section line 18-18 as specified in FIG. 17. Unlike the sectional view of FIGS. 18 and 19, the sectional view of FIG. 20 illustrates the configuration and/or state of the embodiment characteristic of its response to the approach of a wave trough across the surface 302 of the body of water in which the embodiment 300 is positioned.

As a wave trough approaches the embodiment, the surface and/or level of the water falls 336, and as it does so water flows 311 out of the embodiment's first cavity 317 thereby causing the level 314 of water therein to fall 337 from a prior level 316. As a consequence of the falling 337 of the level 314 of the water within the first cavity, the volume of the air pocket 317 therein increases causing the pressure of that air to decrease to a pressure below that of the atmosphere outside the embodiment. As a result of the sub-atmospheric pressure within the air pocket 317, air is drawn from the atmosphere and flows 305 into the air intake pipe 306. The air drawn into the air intake pipe flows therethrough and causes the first one-way valve 321 to open, thereby allowing air to flow 338 from the inner aperture 339 of the air intake pipe 306.

Pressurized air captured, trapped, and/or stored within the embodiment's second cavity 326 continues to flow 327 into the air turbine effluent channel 307 and through the air turbine 328 therein even when the first cavity is refreshing the air pocket 317 with new, additional, and/or supplemental, air drawn from the atmosphere during the approach and passage of a wave trough.

Figure 21:
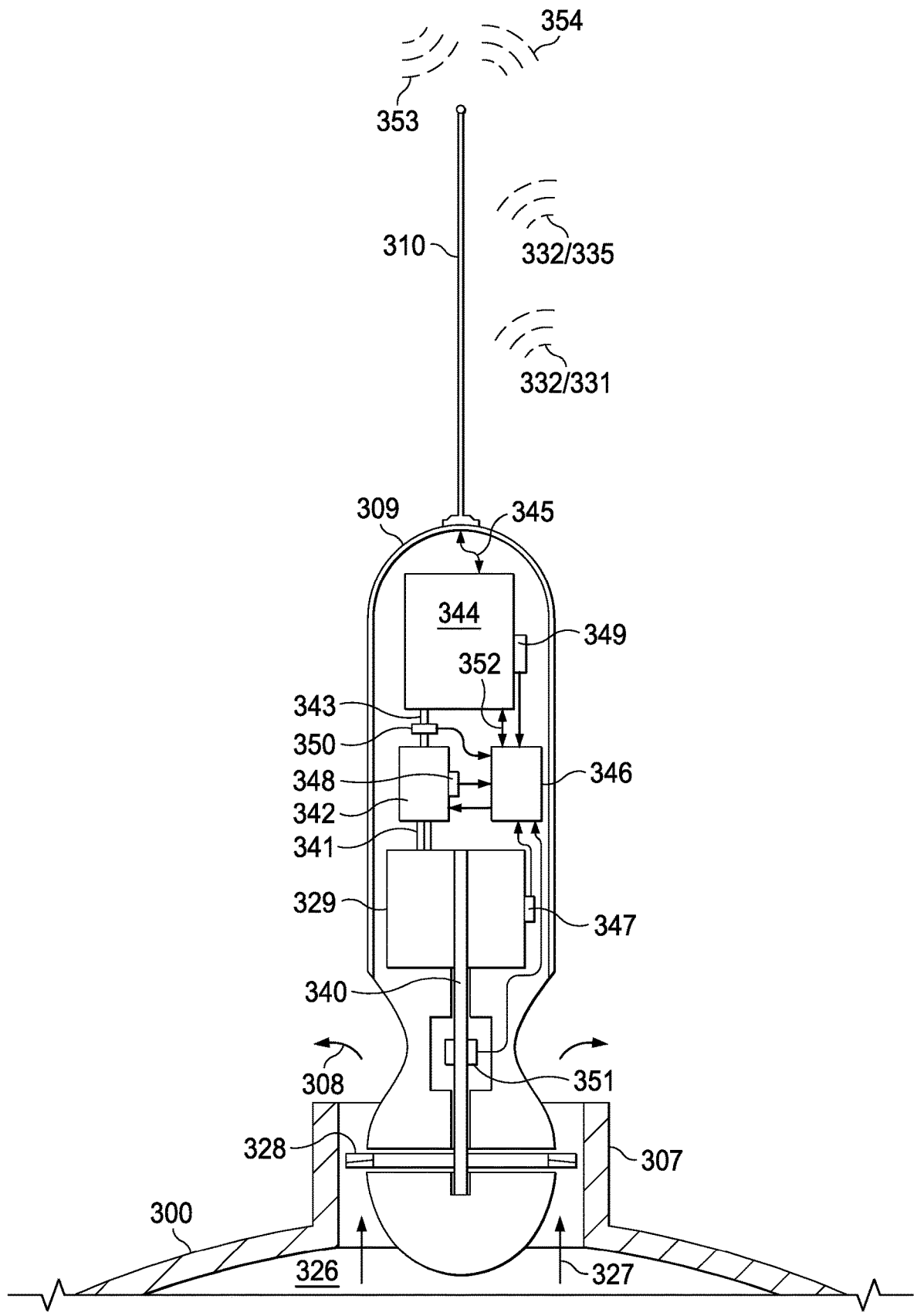
FIG. 21 is a close-up side sectional view of the electronics compartment of the embodiment of FIG. 14.

FIG. 21 shows a close-up side sectional view of the same embodiment of the current disclosure that is illustrated in FIGS. 14-20, where the section is taken along the section line 18-18 as specified in FIG. 17. FIG. 21 provides a close-up view of the embodiment's air turbine effluent channel 307, air turbine 328, electronics compartment 309, and antenna 310.

Pressurized air stored, trapped, captured, and/or present within the embodiment's second cavity 326 flows 327 into the air turbine effluent channel 307, and through the air turbine 328 therein causing the air turbine to rotate. Air escaping the air turbine effluent channel, after flowing through the air turbine, flows 308 into the atmosphere.

Rotations of the air turbine 328 cause a shaft 340 connected to the air turbine to rotate, which, in turn, communicates rotational kinetic energy to a generator 329 operably connected to the air turbine via the shaft, causing the generator to produce electrical power. An electrical power produced by the generator is transmitted, via electrical cables 341 to a power-conditioning circuit 342. The power-conditioning circuit includes, but is not limited to: an inverter, a buck converter, an actively controlled collection of switches (transistors), and other electrical circuit elements configured to convert alternating current of a first peak voltage to direct current of a second voltage and/or range of voltages.

Conditioned power output by the power-conditioning circuit 342 is transmitted, via electrical cables and/or electrical load bus 343, to the embodiment's electrical load 344. The electrical load is comprised of a variety of circuits, including, but not limited to: a plurality of computing and digital memory circuits, and a transceiver circuit that processes encoded electromagnetic signals received from, and transmitted via, antenna 310 via antenna cable 345.

A load management circuit 346 continually adjusts the amount of electrical power consumed by the embodiment's electrical load 344 so as to maximize the amount of electrical power that may be consumed by the embodiment's electrical load with respect to the maximum amount of rotational energy that may be produced by the air turbine 328. When the amount of electrical power consumed by the embodiment's electrical load is increased, so too is the amount of resistive torque which the generator applies to the shaft 340 and the air turbine increased. Conversely, when the amount of electrical power consumed by the embodiment's electrical load is decreased, so too is the amount of resistive torque which the generator applies to the shaft 340 and the air turbine decreased.

The amount of rotational energy that may be produced by the air turbine is maximized by maximizing the amount of resistive torque applied to the air turbine, i.e., by increasing and/or maintaining the resistive torque applied to the air turbine by the generator 329 to that amount of torque which the pressurized air flowing 327 out of the second cavity 326 is just able to overcome. Because the pressure of the air within the second cavity, as well as the rate at which it is replenished by the first cavity, is continually varying, the load management circuit must continually tune and/or adjust the amount of resistive torque applied by the generator to the air turbine 328 via the shaft 340.

In order to better adjust the amount of electrical power consumed by the electrical load 344, and thereby adjust the amount of resistive torque applied by the generator 329 to the air turbine 328, the load management circuit 346 monitors the pressure of the air within the first 317 and second 326 cavities by means of sensor signals 332/331 and 332/335 received at the antenna 310 and pre-processed by the transceiver circuit within the electrical load 344. The air-pressure encoding signals 332/331 and 332/335 received from the respective first- (330 in FIGS. 18 and 20) and second- (334 in FIGS. 18 and 20) air pressure sensors provide the load management circuit with data regarding the pressures of the air within the embodiment's first 317 and second 326 cavities. Also through its analysis and tracking of the changes in the pressure of the air within the first cavity, the load management circuit can calculate and/or estimate the period and height of the waves buffeting the embodiment, and therefore calculate and/or estimate the average energy of a current sea state, thereby permitting the load management circuit to estimate the current and future rates at which pressurized air is likely to be added to the second cavity.

In addition to maximizing the amount of electrical power than may be extracted from the pressurized air within the second cavity 326, the load management circuit 346 may adjust (e.g., reduce) the amount of electrical power consumed by the electrical load 344 and/or the amount of electrical power generated by the generator 329 and/or conditioned by the power-conditioning circuit 342, in response to problems, e.g., such as overheating and/or excessive vibration, detected within the generator via sensor 347, the power-conditioning circuit via sensor 348, and/or the electrical load via sensor 349.

The load management circuit 346 monitors the amount of conditioned electrical power transmitted by the power-conditioning circuit 342 to the electrical load 344 via electrical cables 343 by, with, and/or through a sensor 350. The load management circuit 346 monitors the rate at which the shaft 340 rotates, as well as the amount of resistive torque with which the air turbine resists the outflow 327 of air from within the embodiment's second cavity 326, by, with, and/or through a sensor 351. The load management circuit 346 receives encoded signals from the antenna 310 via the electrical load 344 via cable 352, said signals including, but not being limited to: pressure data related to the air pocket 317 within the first cavity, pressure data related to the air trapped within the second cavity 326, and forecasts of future sea conditions and/or other weather data received from remote sources.

The electrical load 344 receives computational tasks and input computational data via encoded signals 353 received by the embodiment's antenna 310 and transceiver (not shown and incorporated within the electrical load) and transmitted from remote stations, networks, antennas, satellites, and/or computing devices. Computing circuits, devices, networks, and/or modules, of which the electrical load is in part comprised execute computational tasks so received, using and/or consuming at least a portion of the conditioned electrical power provided to them by the power-conditioning circuit 342, to perform computational tasks and generate computational results. Computational results and output computational data are transmitted 354 via the embodiment's transceiver and antenna to remote stations, networks, antennas, satellites, and/or computing devices.

The load management circuit 346 adjusts attributes of the electrical load 344 so as to permit its continuous and uninterrupted operation, e.g., the processing of computational tasks received by the embodiment's antenna 310 and transceiver. The attributes of the electrical load adjusted, varied, and/or controlled, by the load management circuit include, but are not limited to: the clock frequencies and core voltages of CPUs included, incorporated, and/or operating within the electrical load; the "core voltage" of those CPUs; and the percentage of time that those CPUs spend performing "no-op" operations.

Typically, decreasing the clock speed and/or frequency of a digital computing circuit will tend to reduce its consumption of electrical power. Likewise, it is typically the case that increasing the clock speed and/or frequency of a digital computing circuit will tend to increase its consumption of electrical power (all else being equal).

Typically, decreasing the core voltage of a digital computing circuit will tend to reduce its consumption of electrical power. Likewise, it is typically the case that increasing the core voltage of a digital computing circuit will tend to increase its consumption of electrical power. It is also typically the case that there is a relationship between the clock frequency of a digital computing circuit and its core voltage, a relatively higher core voltage typically being required when a digital computing circuit is driven at a relatively higher clock frequency.

Digital computing circuits can typically be instructed, compelled, and/or caused, to divide, partition, and/or allocate, their time to more than a single task thereby enabling such circuits to process (or appear to process) more than a single task simultaneously. However, if one of those tasks is actually vacuous and does not cause the digital computing circuits to perform a large number of switching operations, for instance by receiving at the digital computing circuit a stream of "no operation" (or "no-op") commands, then the digital computing circuit will tend to reduce its consumption of electrical energy by approximately the same degree, percentage, division, and/or partition, as the digital computing circuit spends performing no-op operations.

Similarly, the operating systems that coordinate the processing executed and/or performed by digital computing circuits can be instructed to periodically execute, for a measured amount of time, a loop in which the program counter of a digital computing circuit (which tells the digital computing circuit which next instruction or command to process) is continually reset to its last active value, thereby causing program execution to pause, and thereby also causing electrical power consumption by the digital computing circuit to be reduced during such pauses. Similarly, the operating systems that coordinate the processing executed and/or performed by digital computing circuits can be instructed to execute the "idle," thread, during which time the central processing unit can be placed into a low-power mode until a hardware interrupt is received. Other means of causing a digital computing circuit to "idle" or "stall" for a period of time, consuming little power during that period, are also possible.

Both the alteration of the clock frequency of a digital computing circuit, and the regular introduction of intervals during which program execution on a digital computing circuit is effectively stalled (e.g., by sending no-op commands to the circuit and/or by pausing the incrementation of the circuit's program counter, or some other means), tend to permit programs being executed on, in, through, and/or with, the digital computing circuit to continue their normal execution pattern, and to arrive at the same conclusion, to produce the same result, and/or to effect the same action or change, albeit while requiring such program execution to proceed at a slower pace and require more time for completion.

The alteration of the clock frequency of a digital computing circuit tends to result in reductions in both the pace at which programs execute on the digital computing circuit, as well as the rate at which electrical energy is consumed by the digital computing circuit. The reductions in the pace of program execution and the rate of energy consumption will typically be related, though not exactly proportional. A program requiring a certain number of digital steps to complete will take longer if fewer steps are executed per unit time, and the rate at which electrical energy is consumed will likewise tend to be reduced.

Likewise, the alteration of the portion or percentage of time that a digital computing circuit spends processing "active" programmatic codes, data, and/or commands, versus the portion or percentage of time that it spends processing no-op commands and/or with a stalled program counter and/or "stalled" by some other mechanism, tends to also result in reductions in both the pace at which programs execute on the digital computing circuit, as well as in the rate at which electrical energy is consumed by the digital computing circuit. And, as tends to be true of the effects of alterations of the clock frequency on a digital computing circuit, alterations of the portion or percentage of time that a digital computing circuit spends processing "active" programmatic codes, data, and/or commands, will tend, at least to an approximate degree, to reduce to a similar degree both the pace of program execution and the rate of energy consumption.

The pressure of the air stored within the embodiment's second cavity 326 may vary over short time frames in response to the addition to the second cavity of volumes of air of different masses, and/or pressurized to different degrees, in response to the passage of individual waves. The pressure of the air stored within the embodiment's second cavity may vary over longer time frames in response to variations in the environment, that include, but are not limited to, variations: in the energies, significant wave heights, and/or dominant periods, of waves, and/or variations resulting from the effects of tidal variations in the mean depth of the water. Because of these variations in the pressure of the air (or other gases) trapped within the embodiment's second cavity, the maximal resistive torque manifested by the air turbine and/or its shaft that may be overcome by the outflow of air from the second cavity will vary.

If the resistive torque manifested by the air turbine and/or its shaft is too great with respect to the available pressure of the air within the second cavity, and/or with respect to the rate at which that pressurized air is replenished as a result of wave action at the embodiment, then the air turbine may stop rotating, causing electrical power production by the operably connected generator to cease.

On the other hand, if the resistive torque manifested by the air turbine and/or its shaft is less than that which the available pressure of the air within the second cavity, and/or that which the rate at which the pressurized air is replenished as a result of wave action at the embodiment, might otherwise overcome, then at least a portion of the potential energy available within the pressurized air within the second cavity 326 may be wasted.

The electrical load 344 of the disclosed embodiment comprises, at least in part, a plurality of digital computing circuits such as computer-processing units (CPUs), graphics-processing units (GPUs), application-specific integrated circuits (ASICs), tensor processing units (TPUs), etc., which process digital information in accordance with a certain clock frequency and/or in response to a clocking signal.

A large number of variations in the design, configuration, and/or behaviors, of embodiments similar to the one illustrated and disclosed in relation to FIGS. 14-21 will be obvious to those skilled, and all such variations are included within the scope of the present disclosure. Similarly, a large number of variations in the design, configuration, and/or behaviors, of embodiments similar to the ones illustrated and disclosed in relation to FIGS. 1-13 will be obvious to those skilled, and all such variations are included within the scope of the present disclosure.

Many varieties of embodiments have been disclosed as examples and illustrations of the present disclosure, and some of those embodiments incorporate features, components, elements, designs, and/or attributes, that are illustrated only for a single or very few of the embodiments. The scope of the present invention includes any and all combinations, recombinations, arrangements, variations, permutations, and alterations, of the features, components, elements, designs, and/or attributes, of the illustrated embodiments regardless of the relative numbers of illustrated embodiments for which those features, components, elements, designs, and/or attributes, were included.

We claim:

1. A flow regulation system for regulating a flow of a fluid from an intermittently augmented fluid reservoir, comprising:
   a fluid reservoir container;
   an effluent conduit through which fluid is discharged from the fluid reservoir container;
   a fluid turbine disposed in the effluent conduit;
   a generator operatively connected to the fluid turbine for converting mechanical energy of the fluid turbine to electrical energy;
   a power conditioning module electrically energized by the generator for altering voltage and current characteristics of electricity generated by the generator;
   an electrical load electrically energized by the power conditioning module via an electrical load bus, the electrical load mounted to the fluid reservoir container and including digital computing circuits; and
   a load manager configured to monitor an operational characteristic of the flow regulation system;
   wherein the load manager responds to a change in said operational characteristic by sending a signal to alter one of: (1) a clock frequency of the electrical load, (2) a mean rate of digital switching operations of the electrical load, and (3) a current draw of the electrical load;
   wherein an increase in the current draw of the electrical load causes an increase in the resistive torque of the generator, thereby inhibiting the rotation of the fluid turbine, for regulating a flow rate of discharge from the fluid reservoir container;
   wherein the flow regulation system is buoyant and floats adjacent to an upper surface of a body of water;
   wherein fluid is discharged from the flow regulation system via a first effluent conduit configured to discharge fluid in a first direction approximately parallel to the upper surface of the body of water; and wherein fluid discharged from the flow regulation system generates thrust to move the system across the upper surface of the body of water.

2. The flow regulation system of claim 1, wherein the load manager monitors a voltage of the electrical load bus.

3. The flow regulation system of claim 1, wherein the power conditioning module includes a rectifier configured to convert an alternating current to a direct current.

4. The flow regulation system of claim 1, wherein the flow regulation system is affixed to a solid.

5. The flow regulation system of claim 1, wherein fluid is discharged from the flow regulation system via a second effluent conduit configured to discharge fluid in a second direction approximately parallel to the upper surface of the body of water.

6. The flow regulation system of claim 5, wherein the first and second effluent conduits have disposed therein respective first and second fluid turbines, and wherein the first and second fluid turbines are operatively connected to respective first and second generators, and wherein said first and second generators energize respective first and second electrical loads, and wherein said first and second electrical loads are configured to receive signals to adjust: (1) a clock frequency of said electrical load, (2) a mean rate of digital switching operations of said electrical load, and (3) a current draw of said electrical load.

7. The flow regulation system of claim 6, wherein fluid flow through said first effluent conduit applies a torque to the flow regulation system than tends to turn the flow regulation system in a first turning direction, and the said fluid flow through said second effluent conduit applies a torque to the flow regulation system that tends to turn the flow regulation system in a second turning direction.

8. The flow regulation system of claim 7, further comprising a navigation manager to calculate one of: (1) a direction of movement, and (2) a speed of movement of the flow regulation system across the body of water.

9. The flow regulation system of claim 8, wherein the navigation manager commands a direction of movement of the flow regulation system.

10. The flow regulation system of claim 9, wherein the first load manager reduces a current draw of the first electrical load, thereby increasing a rate of fluid discharge from the first effluent conduit to increase a rate of turning of the flow regulation system.

* * * * *